(12) United States Patent
Di Paola et al.

(10) Patent No.: US 8,568,085 B2
(45) Date of Patent: Oct. 29, 2013

(54) HIGH PRESSURE TURBINE VANE COOLING HOLE DISTRUBUTION

(75) Inventors: Franco Di Paola, Montreal Nord (CA); Larry Lebel, Verchères (CA); François Doyon, Ste-Julie (CA)

(73) Assignee: Pratt & Whitney Canada Corp, Longueuil, Quebec (CA)

( * ) Notice: Subject to any disclaimer, the term of this patent is extended or adjusted under 35 U.S.C. 154(b) by 712 days.

(21) Appl. No.: 12/838,720

(22) Filed: Jul. 19, 2010

(65) Prior Publication Data

US 2012/0014809 A1  Jan. 19, 2012

(51) Int. Cl.
  *F03B 11/00* (2006.01)
  *F01D 5/14* (2006.01)
  *F04D 29/38* (2006.01)

(52) U.S. Cl.
  USPC ........................ 415/115; 416/97 R; 416/243

(58) Field of Classification Search
  USPC ........... 415/115, 116; 416/96 R, 97 R, 231 R, 416/243, DIG. 2
  See application file for complete search history.

(56) References Cited

U.S. PATENT DOCUMENTS

| | | | |
|---|---|---|---|
| 3,994,622 A | 11/1976 | Schultz et al. | |
| 4,601,638 A | 7/1986 | Hill et al. | |
| 4,753,575 A | 6/1988 | Levengood et al. | |
| 5,374,162 A | 12/1994 | Green | |
| 6,174,134 B1 | 1/2001 | Lee et al. | |
| 6,196,792 B1 | 3/2001 | Lee et al. | |
| 6,290,462 B1 | 9/2001 | Ishiguro et al. | |
| 6,318,960 B1 | 11/2001 | Kuwabara et al. | |
| 6,354,797 B1 | 3/2002 | Heyward et al. | |
| 6,398,489 B1 * | 6/2002 | Burdgick et al. | 415/115 |
| 6,514,037 B1 | 2/2003 | Danowski et al. | |
| 6,554,572 B2 | 4/2003 | Rinck et al. | |
| 6,607,355 B2 | 8/2003 | Cunha et al. | |
| 6,722,851 B1 * | 4/2004 | Brittingham et al. | 416/96 R |
| 6,832,897 B2 | 12/2004 | Urban | |
| 6,854,961 B2 | 2/2005 | Zhang et al. | |
| 6,868,675 B1 | 3/2005 | Kuhn et al. | |
| 6,893,210 B2 * | 5/2005 | Zhang et al. | 415/116 |
| 6,910,864 B2 | 6/2005 | Tomberg | |
| 6,910,868 B2 * | 6/2005 | Hyde et al. | 416/223 R |
| 6,923,623 B2 * | 8/2005 | Cleveland et al. | 416/97 R |
| 6,991,430 B2 * | 1/2006 | Stec et al. | 416/97 R |
| 6,994,520 B2 * | 2/2006 | Humanchuk et al. | 415/191 |
| 7,008,186 B2 | 3/2006 | Heeg et al. | |
| 7,086,829 B2 * | 8/2006 | Fuller et al. | 415/115 |
| 7,124,487 B2 | 10/2006 | Kuhn et al. | |
| 7,186,085 B2 | 3/2007 | Lee | |

(Continued)

OTHER PUBLICATIONS

U.S. Appl. No. 12/732,708, filed Mar. 26, 2010, Tsifourdarnis (Continued)

*Primary Examiner* — Edward Look
*Assistant Examiner* — Christopher J Hargitt
(74) *Attorney, Agent, or Firm* — Norton Rose Fulbright Canada

(57) ABSTRACT

A turbine vane for a gas turbine engine with an airfoil portion including a perimeter wall having first, second, third and fourth sets of cooling holes defined therethrough, including the holes numbered HA-1 to HA-13, HB-1 to HB-13, PA-1 to PA-9, and SA-1 to SA-3, respectively, and located such that a central axis thereof extends through the respective point 1 and point 2 having a nominal location in accordance with the X, Y, Z Cartesian coordinate values set forth in Table 3.

20 Claims, 9 Drawing Sheets

(56) References Cited

U.S. PATENT DOCUMENTS

| | | | |
|---|---|---|---|
| 7,249,934 B2 | 7/2007 | Palmer et al. | |
| 7,306,436 B2 * | 12/2007 | Girgis et al. | 416/223 A |
| 7,351,038 B2 | 4/2008 | Girgis et al. | |
| 7,354,249 B2 | 4/2008 | Girgis et al. | |
| 7,364,405 B2 | 4/2008 | Cunha et al. | |
| 7,367,779 B2 * | 5/2008 | Girgis et al. | 416/223 A |
| 7,402,026 B2 * | 7/2008 | Girgis et al. | 416/223 A |
| 7,478,994 B2 | 1/2009 | Cunha et al. | |
| 7,497,663 B2 * | 3/2009 | McRae et al. | 416/191 |
| 7,500,823 B2 | 3/2009 | Bolms et al. | |
| 7,506,512 B2 | 3/2009 | Schumacher et al. | |
| 7,520,726 B2 * | 4/2009 | Papple et al. | 416/223 R |
| 7,520,727 B2 * | 4/2009 | Sreekanth et al. | 416/223 R |
| 7,520,728 B2 * | 4/2009 | Sleiman et al. | 416/223 R |
| 7,524,170 B2 * | 4/2009 | Devangada et al. | 416/223 A |
| 7,534,091 B2 | 5/2009 | Ravanis et al. | |
| 7,537,432 B2 | 5/2009 | Marini et al. | |
| 7,537,433 B2 | 5/2009 | Girgis et al. | |
| 7,546,737 B2 | 6/2009 | Schumacher et al. | |
| 7,559,746 B2 | 7/2009 | Tsifourdaris et al. | |
| 7,559,747 B2 | 7/2009 | Mohan et al. | |
| 7,559,748 B2 | 7/2009 | Kidikian et al. | |
| 7,559,749 B2 | 7/2009 | Kidikian et al. | |
| 7,566,200 B2 * | 7/2009 | Marini et al. | 415/192 |
| 7,568,889 B2 | 8/2009 | Mohan et al. | |
| 7,568,890 B2 | 8/2009 | Findlay et al. | |
| 7,568,891 B2 | 8/2009 | Mohan et al. | |
| 7,611,326 B2 * | 11/2009 | Trindade et al. | 415/191 |
| 7,625,182 B2 * | 12/2009 | Mah et al. | 416/223 A |
| 7,625,183 B2 | 12/2009 | Tsifourdaris et al. | |
| 7,632,074 B2 * | 12/2009 | Ravanis et al. | 416/223 A |
| 2005/0079061 A1 | 4/2005 | Beddard | |
| 2008/0124219 A1 | 5/2008 | Kidikian et al. | |
| 2008/0317585 A1 | 12/2008 | Lee et al. | |
| 2009/0097982 A1 | 4/2009 | Saindon et al. | |
| 2009/0116967 A1 | 5/2009 | Sleiman et al. | |
| 2010/0008784 A1 | 1/2010 | Shafique et al. | |

OTHER PUBLICATIONS

U.S. Appl. No. 12/752,271, filed Apr. 1, 2010, Marini.
U.S. Appl. No. 12/752,404, filed Apr. 1, 2010, Tsifourdaris et al.
U.S. Appl. No. 12/749,841, filed Mar. 30, 2010, Tsifourdaris.
U.S. Appl. No. 12/766,329, filed Apr. 23, 2010, Marini et al.

* cited by examiner

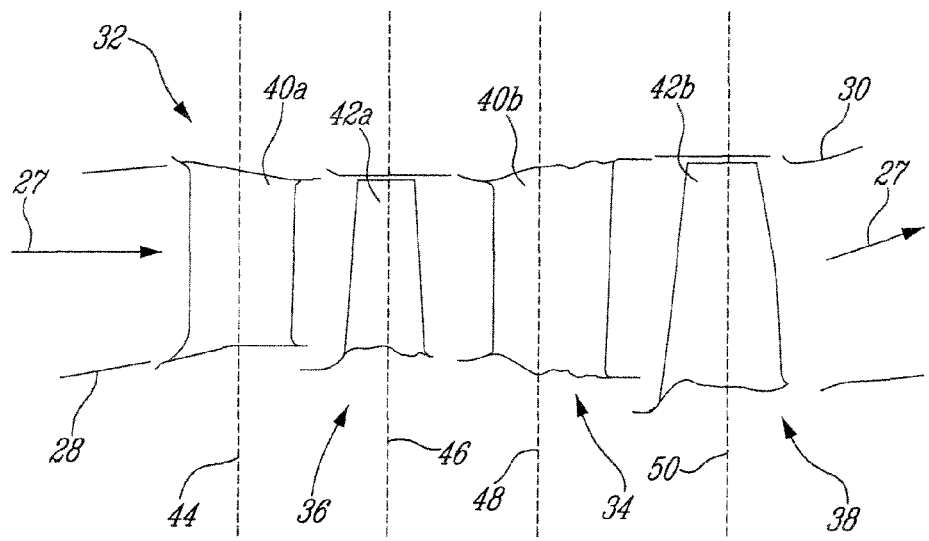

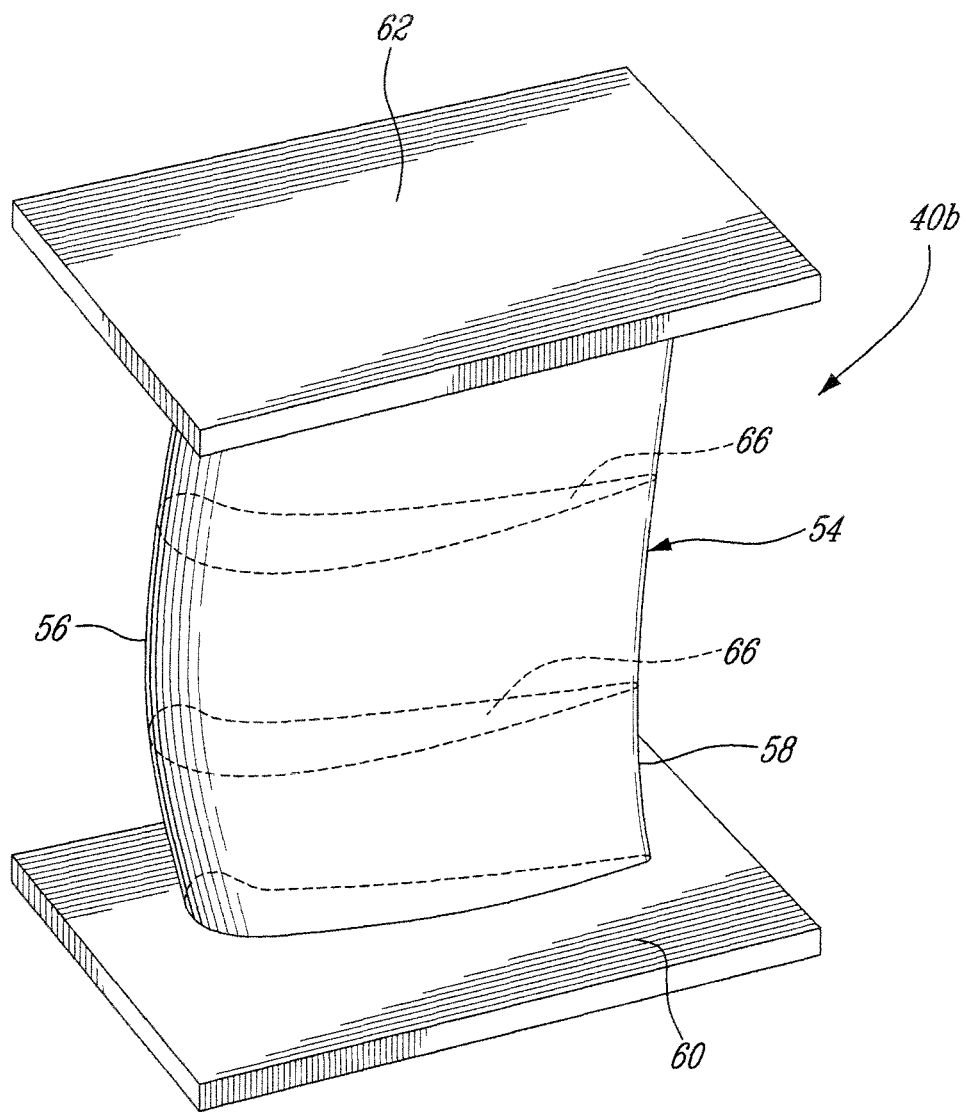

HIGH PRESSURE TURBINE VANE COOLING HOLE DISTRUBUTION

TECHNICAL FIELD

The application relates generally to a vane airfoil for a gas turbine engine and, more particularly, to a cooling hole distribution suited for use in the second stage vane assembly of a high pressure (HP) turbine.

BACKGROUND OF THE ART

Every stage of a gas turbine engine must meet a plurality of design criteria to assure the best possible overall engine efficiency. The design goals dictate specific thermal and mechanical requirements that must be met pertaining to heat loading, parts life and manufacturing, use of combustion gases, throat area, vectoring, the interaction between stages to name a few. The design criteria for each stage is constantly being re-evaluated and improved upon. The high pressure turbine is subject to harsh temperatures, and as such adequate cooling must be provided to the elements of the high pressure turbine, including the stator vanes. Therefore, improvements in airfoil cooling are sought.

SUMMARY

It is an object to provide an improved cooling hole distribution for a vane airfoil suited for use in a multistage HP turbine vane assembly.

In one aspect, there is provided a turbine vane for a gas turbine engine comprising an airfoil portion defined by a perimeter wall surrounding an enclosure, the perimeter wall having a plurality of cooling holes defined therethrough and providing fluid communication between the enclosure and a gaspath of the gas turbine engine, the plurality of cooling holes including first, second, third and fourth rows of holes, the first and second rows of holes extending at least substantially radially adjacent a leading edge of the airfoil portion, the third row of holes extending at least substantially radially on one side of the airfoil in proximity of a trailing edge thereof, and the fourth row of holes extending at least substantially radially on the opposed side of the airfoil in proximity of the leading edge, the first, second, third and fourth rows of holes including the holes numbered HA-1 to HA-13, HB-1 to HB-13, PA-1 to PA-9, and SA-1 to SA-3, respectively, and located such that a central axis thereof extends through the respective point 1 and point 2 having a nominal location in accordance with the X, Y, Z Cartesian coordinate values set forth in Table 3.

In another aspect, there is provided a turbine stator assembly for a gas turbine engine comprising a plurality of vanes, each vane having an airfoil portion defined by a perimeter wall enclosing a cooling cavity, the perimeter wall having a plurality of cooling holes defined therethrough and providing fluid communication between the cooling cavity and a gaspath of the gas turbine engine, the plurality of cooling holes including first, second, third and fourth sets of holes, the first and second sets of holes extending adjacent a leading edge of the airfoil portion, the third set of holes extending on one side of the airfoil in proximity of a trailing edge thereof, and the fourth set of holes extending on the opposed side of the airfoil in proximity of the leading edge, the first, second, third and fourth sets of holes including the holes numbered HA-1 to HA-13, HB-1 to HB-13, PA-1 to PA-9, and SA-1 to SA-3, respectively, each hole having a central axis extending through point 1 and point 2 located at least substantially in accordance with X, Y, Z Cartesian coordinate values set forth in Table 3.

In another aspect, there is provided a high pressure turbine vane an airfoil having a perimeter wall surrounding a cooling cavity, the perimeter wall having an outer surface lying substantially on the points of Table 2, the airfoil extending between platforms defined generally by at least some of the coordinate values given in Table 1, wherein a fillet radius is applied around the airfoil between the airfoil and platforms, the perimeter wall having a plurality of cooling holes defined therethrough in fluid communication with the cooling cavity, the plurality of cooling holes including first, second, third and fourth sets of holes including the holes numbered HA-1 to HA-13, HB-1 to HB-13, PA-1 to PA-9, and SA-1 to SA-3, respectively, and located such that a central axis thereof extends through the respective point 1 and point 2 having a nominal location in accordance with the X, Y, Z Cartesian coordinate values set forth in Table 3.

DESCRIPTION OF THE DRAWINGS

Reference is now made to the accompanying figures depicting aspects of the present invention, in which:

FIG. 2 is a schematic view of a gaspath of the gas turbine engine of FIG. 1, including a two-stage high pressure turbine;

FIG. 3 is a schematic view of a high pressure turbine (HPT) stage vane having a vane profile defined in accordance with an embodiment of the present invention;

DETAILED DESCRIPTION

Figure 1:
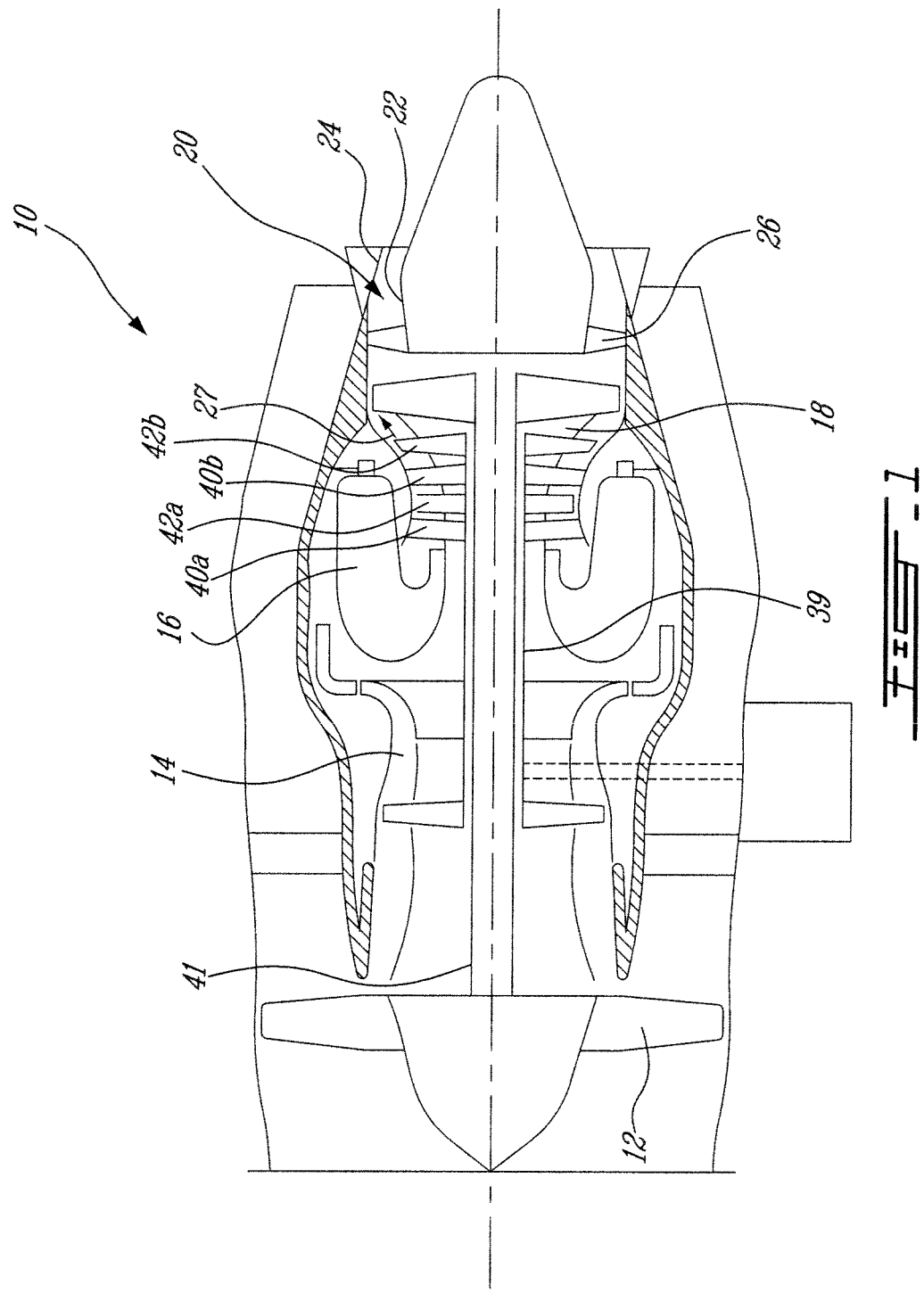
FIG. 1 is a schematic view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases to drive the fan, the compressor, and produce thrust.

The gas turbine engine 10 further includes a turbine exhaust duct 20 which is exemplified as including an annular core portion 22 and an annular outer portion 24 and a plurality of struts 26 circumferentially spaced apart, and radially extending between the inner and outer portions 22, 24.

FIG. 2 illustrates a portion of an annular hot gaspath, indicated by arrows 27 and defined by annular inner and outer walls 28 and 30 respectively, for directing the stream of hot combustion gases axially in an annular flow. The profile of the inner and outer walls 28 and 30 of the annular gaspath, "cold" (i.e. non-operating) coated conditions, is defined by the Cartesian coordinate values such as the ones given in Table 1 below. More particularly, the inner and outer gaspath walls 28 and 30 are defined with respect to mutually orthogonal x and z axes, as shown in FIG. 2. The x axis corresponds to the engine turbine rotor centerline 29. The radial distance of the inner and outer walls 28 and 30 from the engine turbine rotor centerline and, thus, from the x-axis at specific axial locations is measured along the z axis. The z values provide the inner and outer radius of the gas path at various axial locations therealong. The x and z coordinate values in Table 1 are distances given in inches from the point of origin O (see FIG. 2). It is understood that other units of dimensions may be used. The x and z values have in average a manufacturing tolerance of about ±0.030". The tolerance may account for such things as casting, coating, ceramic coating and/or other tolerances. It is also understood that the manufacturing tolerances of the gas path may vary along the length thereof.

The turbine section 18 has two high pressure turbine (HPT) stages located in the gaspath 27 downstream of the combustor 16. Referring to FIG. 2, the HPT stages each comprises a stator assembly 32, 34 and a rotor assembly 36, 38 having a plurality of circumferentially arranged vane 40a, 40b and blades 42a, 42b respectively. The vanes 40a,b and blades 420 are mounted in position along respective stacking lines 44-50, as identified in FIG. 2. The stacking lines 44-50 extend in the radial direction along the z axis at different axial locations. The stacking lines 44-50 define the axial location where the blades and vanes of each stage are mounted in the engine 10. More specifically, stacking line 44 located at x=0 corresponds to the first stage HPT vane 40a. The stacking line 48 of the second stage HP turbine vane 40b is located at x=2.728.

Table 1 provides gaspath definition from upstream to downstream of the second stage HP vane airfoil 40b.

TABLE 1

COLD COATED GASPATH DEFINITION

| INNER GASPATH | | OUTER GASPATH | |
|---|---|---|---|
| X | Z | X | Z |
| 1.323 | 6.513 | 1.352 | 7.976 |
| 1.474 | 6.455 | 1.496 | 7.976 |
| 1.633 | 6.442 | 1.639 | 7.976 |
| 1.790 | 6.423 | 1.783 | 7.976 |
| 1.996 | 6.393 | 1.927 | 7.976 |
| 2.306 | 6.443 | 2.018 | 7.980 |
| 2.599 | 6.341 | 2.263 | 7.932 |
| 2.894 | 6.320 | 2.505 | 7.997 |
| 2.948 | 6.296 | 2.749 | 8.055 |
| 3.185 | 6.262 | 2.998 | 8.055 |
| 3.434 | 6.246 | 3.238 | 8.105 |
| 3.686 | 6.246 | 3.483 | 8.124 |
| 3.812 | 5.998 | 3.735 | 8.127 |
| 3.855 | 6.037 | 3.771 | 8.152 |
| 3.980 | 6.204 | 3.921 | 8.152 |
| 4.174 | 6.223 | 4.070 | 8.152 |
| 4.378 | 6.184 | 4.219 | 8.152 |
| 4.587 | 6.178 | 4.368 | 8.152 |
|  |  | 4.518 | 8.152 |

More specifically, the stator assemblies 32, 34 each include the plurality of circumferentially distributed vanes 40a and 40b respectively which extend radially across the hot gaspath 27. FIG. 3 shows an example of a vane 40b of the second HPT stage. It can be seen that each vane 40b has an airfoil 54 having a leading edge 56 and a trailing edge 58, extending between inner vane platform 60 and outer vane platform 62.

The novel airfoil shape of each second stage HPT vane 40b is defined by a set of X-Y-Z points in space. This set of points represents a novel and unique solution to the target design criteria discussed above, and are well-adapted for use in a two-stage high pressure turbine design. The set of points are defined in a vane Cartesian coordinate system which has mutually orthogonal X, Y and Z axes. The X axis extends axially along the turbine rotor centerline 29, i.e., the rotary axis, when the vane is at nominal restagger. The positive X direction is axially towards the aft of the turbine engine 10. The Z axis extends along the HPT vane stacking line 48 of each respective vane 40b in a generally radial direction and intersects the X axis. The positive Z direction is radially outwardly toward the outer vane platform 62. The Y axis extends tangentially with the positive Y direction being in the direction of rotation of the rotor assembly 38. Therefore, the origin of the vane X, Y and Z axes is defined at the point of intersection of all three orthogonally-related axes: that is the point (0,0,0) at the intersection of the center of rotation of the turbine engine 10 (at nominal restagger) and the stacking line 48.

In a particular embodiment of the second stage HPT vane, the set of points which define the vane airfoil profile relative to the vane coordinate system are set out in Table 2 below as X, Y and Z Cartesian coordinate values. Particularly, the vane airfoil profile is defined by profile sections 66 at various locations along its height, the locations represented by Z values. It should be understood that the Z values do not represent an actual radial height along the airfoil 54 but are defined with respect to the engine center line. For example, if the vanes 40b are mounted about the stator assembly 34 at an angle with respect to the radial direction, then the Z values are not a true representation of the height of the airfoils of the vanes 40b. Furthermore, it is to be appreciated that, with respect to Table 2, Z values are not actually radial heights, per se, from the centerline but rather a height from a plane through the centerline—i.e. the sections in Table 2 are planar. The coordinate values are set forth in inches in Table 2 although other units of dimensions may be used when the values are appropriately converted.

Thus, at each Z distance, the X and Y coordinate values of the desired profile section 66 are defined at selected locations in a Z direction normal to the X, Y plane. The X and Y coordinates are given in distance dimensions, e.g. units of inches, and are joined smoothly, using appropriate curve-fitting techniques, at each Z location to form a smooth continuous airfoil cross-section. The vane airfoil profiles of the various surface locations between the distances Z are determined by smoothly connecting the adjacent profile sections 66 to one another to form the airfoil profile.

The coordinate values listed in Table 2 below represent the desired airfoil profiles in a "cold" non-operating coated condition, with, as mentioned above, the X axis corresponding to the turbine rotor centerline 29 for a vane at nominal stagger, the X axis being angled with respect to the turbine rotor centerline 29 for a restaggered vane by an angle corresponding to the restagger. However, the manufactured airfoil surface profile will be slightly different, as a result of manufacturing and applied coating tolerances. According to an embodiment of the present invention, the finished HPT vane is coated with a thermal protecting layer.

The Table 2 values are generated and shown to three decimal places for determining the profile of the HPT stage vane airfoil. However, as mentioned above, there are manufacturing tolerance issues to be addressed and, accordingly, the values for the profile given in Table 2 are for a theoretical airfoil. A profile tolerance of ±0.015 inches, measured perpendicularly to the airfoil surface is additive to the nominal values given in Table 2 below. The profile tolerance accounts for airfoil profile casting, coating and ceramic coating tolerances. The second stage HPT vane airfoil design functions well within these ranges of variation. The cold or room temperature profile (including coating) is given by the X, Y and Z coordinates for manufacturing purposes. It is understood that the airfoil may deform, within acceptable limits, once entering service.

The coordinate values given in Table 2 below provide the preferred nominal second stage HPT vane airfoil profile.

TABLE 2

|  | X | Y | Z |
|---|---|---|---|
| SECTION 1 | −0.390 | −0.371 | 5.882 |
|  | −0.388 | −0.375 | 5.882 |
|  | −0.385 | −0.378 | 5.882 |
|  | −0.382 | −0.382 | 5.882 |
|  | −0.379 | −0.385 | 5.882 |
|  | −0.376 | −0.389 | 5.882 |
|  | −0.374 | −0.392 | 5.882 |
|  | −0.371 | −0.395 | 5.882 |
|  | −0.368 | −0.398 | 5.882 |
|  | −0.364 | −0.402 | 5.882 |
|  | −0.361 | −0.405 | 5.882 |
|  | −0.345 | −0.419 | 5.882 |
|  | −0.327 | −0.432 | 5.882 |
|  | −0.308 | −0.444 | 5.882 |
|  | −0.288 | −0.453 | 5.882 |
|  | −0.267 | −0.460 | 5.882 |
|  | −0.245 | −0.465 | 5.882 |
|  | −0.223 | −0.468 | 5.882 |
|  | −0.201 | −0.468 | 5.882 |
|  | −0.179 | −0.465 | 5.882 |
|  | −0.157 | −0.461 | 5.882 |
|  | −0.136 | −0.454 | 5.882 |
|  | −0.116 | −0.446 | 5.882 |
|  | −0.096 | −0.435 | 5.882 |
|  | −0.078 | −0.423 | 5.882 |
|  | −0.060 | −0.410 | 5.882 |
|  | −0.044 | −0.395 | 5.882 |
|  | −0.028 | −0.379 | 5.882 |
|  | −0.013 | −0.363 | 5.882 |
|  | 0.001 | −0.346 | 5.882 |
|  | 0.015 | −0.328 | 5.882 |
|  | 0.028 | −0.311 | 5.882 |
|  | 0.041 | −0.293 | 5.882 |
|  | 0.054 | −0.275 | 5.882 |
|  | 0.067 | −0.257 | 5.882 |
|  | 0.080 | −0.239 | 5.882 |
|  | 0.092 | −0.221 | 5.882 |
|  | 0.105 | −0.202 | 5.882 |
|  | 0.117 | −0.184 | 5.882 |
|  | 0.130 | −0.166 | 5.882 |
|  | 0.142 | −0.147 | 5.882 |
|  | 0.155 | −0.129 | 5.882 |
|  | 0.167 | −0.111 | 5.882 |
|  | 0.179 | −0.092 | 5.882 |
|  | 0.192 | −0.074 | 5.882 |
|  | 0.204 | −0.055 | 5.882 |
|  | 0.216 | −0.037 | 5.882 |
|  | 0.228 | −0.018 | 5.882 |
|  | 0.240 | 0.001 | 5.882 |
|  | 0.252 | 0.019 | 5.882 |
|  | 0.263 | 0.038 | 5.882 |
|  | 0.275 | 0.057 | 5.882 |
|  | 0.286 | 0.076 | 5.882 |
|  | 0.297 | 0.095 | 5.882 |
|  | 0.309 | 0.114 | 5.882 |
|  | 0.319 | 0.134 | 5.882 |
|  | 0.330 | 0.153 | 5.882 |
|  | 0.341 | 0.172 | 5.882 |
|  | 0.351 | 0.192 | 5.882 |
|  | 0.361 | 0.212 | 5.882 |
|  | 0.371 | 0.231 | 5.882 |
|  | 0.381 | 0.251 | 5.882 |
|  | 0.391 | 0.271 | 5.882 |
|  | 0.400 | 0.291 | 5.882 |
|  | 0.409 | 0.311 | 5.882 |
|  | 0.418 | 0.332 | 5.882 |
|  | 0.427 | 0.352 | 5.882 |

TABLE 2-continued

| X | Y | Z |
|---|---|---|
| 0.436 | 0.372 | 5.882 |
| 0.444 | 0.393 | 5.882 |
| 0.453 | 0.413 | 5.882 |
| 0.461 | 0.434 | 5.882 |
| 0.469 | 0.455 | 5.882 |
| 0.477 | 0.475 | 5.882 |
| 0.484 | 0.496 | 5.882 |
| 0.492 | 0.517 | 5.882 |
| 0.499 | 0.538 | 5.882 |
| 0.506 | 0.559 | 5.882 |
| 0.513 | 0.580 | 5.882 |
| 0.519 | 0.601 | 5.882 |
| 0.526 | 0.622 | 5.882 |
| 0.533 | 0.643 | 5.882 |
| 0.539 | 0.664 | 5.882 |
| 0.546 | 0.686 | 5.882 |
| 0.553 | 0.707 | 5.882 |
| 0.559 | 0.728 | 5.882 |
| 0.566 | 0.749 | 5.882 |
| 0.572 | 0.770 | 5.882 |
| 0.578 | 0.792 | 5.882 |
| 0.583 | 0.813 | 5.882 |
| 0.589 | 0.835 | 5.882 |
| 0.590 | 0.839 | 5.882 |
| 0.591 | 0.843 | 5.882 |
| 0.592 | 0.847 | 5.882 |
| 0.593 | 0.852 | 5.882 |
| 0.594 | 0.856 | 5.882 |
| 0.596 | 0.860 | 5.882 |
| 0.597 | 0.864 | 5.882 |
| 0.598 | 0.869 | 5.882 |
| 0.599 | 0.873 | 5.882 |
| 0.600 | 0.877 | 5.882 |
| 0.601 | 0.880 | 5.882 |
| 0.601 | 0.883 | 5.882 |
| 0.601 | 0.886 | 5.882 |
| 0.600 | 0.888 | 5.882 |
| 0.599 | 0.891 | 5.882 |
| 0.598 | 0.893 | 5.882 |
| 0.596 | 0.896 | 5.882 |
| 0.594 | 0.898 | 5.882 |
| 0.592 | 0.899 | 5.882 |
| 0.589 | 0.900 | 5.882 |
| 0.586 | 0.901 | 5.882 |
| 0.584 | 0.902 | 5.882 |
| 0.581 | 0.901 | 5.882 |
| 0.578 | 0.901 | 5.882 |
| 0.575 | 0.900 | 5.882 |
| 0.573 | 0.898 | 5.882 |
| 0.571 | 0.897 | 5.882 |
| 0.569 | 0.895 | 5.882 |
| 0.567 | 0.893 | 5.882 |
| 0.565 | 0.890 | 5.882 |
| 0.563 | 0.887 | 5.882 |
| 0.561 | 0.884 | 5.882 |
| 0.559 | 0.881 | 5.882 |
| 0.557 | 0.878 | 5.882 |
| 0.555 | 0.875 | 5.882 |
| 0.554 | 0.872 | 5.882 |
| 0.552 | 0.869 | 5.882 |
| 0.550 | 0.867 | 5.882 |
| 0.548 | 0.864 | 5.882 |
| 0.539 | 0.849 | 5.882 |
| 0.529 | 0.835 | 5.882 |
| 0.520 | 0.820 | 5.882 |
| 0.511 | 0.805 | 5.882 |
| 0.503 | 0.790 | 5.882 |
| 0.494 | 0.775 | 5.882 |
| 0.485 | 0.760 | 5.882 |
| 0.476 | 0.746 | 5.882 |
| 0.468 | 0.731 | 5.882 |
| 0.458 | 0.716 | 5.882 |
| 0.449 | 0.702 | 5.882 |
| 0.440 | 0.687 | 5.882 |
| 0.431 | 0.672 | 5.882 |
| 0.422 | 0.658 | 5.882 |
| 0.412 | 0.643 | 5.882 |
| 0.402 | 0.629 | 5.882 |

TABLE 2-continued

| X | Y | Z |
|---|---|---|
| 0.393 | 0.615 | 5.882 |
| 0.383 | 0.601 | 5.882 |
| 0.373 | 0.587 | 5.882 |
| 0.363 | 0.572 | 5.882 |
| 0.354 | 0.558 | 5.882 |
| 0.344 | 0.544 | 5.882 |
| 0.335 | 0.529 | 5.882 |
| 0.325 | 0.515 | 5.882 |
| 0.316 | 0.500 | 5.882 |
| 0.306 | 0.486 | 5.882 |
| 0.297 | 0.472 | 5.882 |
| 0.287 | 0.457 | 5.882 |
| 0.277 | 0.443 | 5.882 |
| 0.267 | 0.429 | 5.882 |
| 0.258 | 0.415 | 5.882 |
| 0.248 | 0.400 | 5.882 |
| 0.238 | 0.386 | 5.882 |
| 0.228 | 0.372 | 5.882 |
| 0.218 | 0.358 | 5.882 |
| 0.208 | 0.344 | 5.882 |
| 0.198 | 0.330 | 5.882 |
| 0.188 | 0.316 | 5.882 |
| 0.178 | 0.302 | 5.882 |
| 0.168 | 0.288 | 5.882 |
| 0.158 | 0.274 | 5.882 |
| 0.148 | 0.260 | 5.882 |
| 0.138 | 0.246 | 5.882 |
| 0.127 | 0.232 | 5.882 |
| 0.117 | 0.218 | 5.882 |
| 0.107 | 0.205 | 5.882 |
| 0.096 | 0.191 | 5.882 |
| 0.086 | 0.177 | 5.882 |
| 0.075 | 0.164 | 5.882 |
| 0.065 | 0.150 | 5.882 |
| 0.054 | 0.136 | 5.882 |
| 0.043 | 0.123 | 5.882 |
| 0.032 | 0.110 | 5.882 |
| 0.021 | 0.096 | 5.882 |
| 0.010 | 0.083 | 5.882 |
| −0.001 | 0.070 | 5.882 |
| −0.012 | 0.057 | 5.882 |
| −0.023 | 0.044 | 5.882 |
| −0.035 | 0.031 | 5.882 |
| −0.046 | 0.018 | 5.882 |
| −0.058 | 0.005 | 5.882 |
| −0.069 | −0.008 | 5.882 |
| −0.081 | −0.020 | 5.882 |
| −0.093 | −0.033 | 5.882 |
| −0.105 | −0.045 | 5.882 |
| −0.117 | −0.057 | 5.882 |
| −0.130 | −0.069 | 5.882 |
| −0.143 | −0.081 | 5.882 |
| −0.155 | −0.093 | 5.882 |
| −0.168 | −0.104 | 5.882 |
| −0.182 | −0.115 | 5.882 |
| −0.195 | −0.126 | 5.882 |
| −0.209 | −0.137 | 5.882 |
| −0.222 | −0.147 | 5.882 |
| −0.237 | −0.157 | 5.882 |
| −0.251 | −0.166 | 5.882 |
| −0.266 | −0.174 | 5.882 |
| −0.282 | −0.182 | 5.882 |
| −0.298 | −0.188 | 5.882 |
| −0.301 | −0.189 | 5.882 |
| −0.305 | −0.190 | 5.882 |
| −0.308 | −0.191 | 5.882 |
| −0.311 | −0.191 | 5.882 |
| −0.315 | −0.192 | 5.882 |
| −0.318 | −0.193 | 5.882 |
| −0.321 | −0.193 | 5.882 |
| −0.325 | −0.194 | 5.882 |
| −0.328 | −0.194 | 5.882 |
| −0.332 | −0.194 | 5.882 |
| −0.345 | −0.194 | 5.882 |
| −0.358 | −0.195 | 5.882 |
| −0.372 | −0.197 | 5.882 |
| −0.384 | −0.201 | 5.882 |
| −0.397 | −0.206 | 5.882 |

TABLE 2-continued

|  | X | Y | Z |
|---|---|---|---|
|  | −0.408 | −0.214 | 5.882 |
|  | −0.417 | −0.223 | 5.882 |
|  | −0.424 | −0.234 | 5.882 |
|  | −0.429 | −0.247 | 5.882 |
|  | −0.431 | −0.260 | 5.882 |
|  | −0.431 | −0.274 | 5.882 |
|  | −0.429 | −0.287 | 5.882 |
|  | −0.426 | −0.300 | 5.882 |
|  | −0.422 | −0.313 | 5.882 |
|  | −0.417 | −0.325 | 5.882 |
|  | −0.411 | −0.337 | 5.882 |
|  | −0.405 | −0.349 | 5.882 |
|  | −0.398 | −0.360 | 5.882 |
| SECTION 2 | −0.395 | −0.441 | 6.192 |
|  | −0.393 | −0.444 | 6.192 |
|  | −0.390 | −0.448 | 6.192 |
|  | −0.388 | −0.452 | 6.192 |
|  | −0.385 | −0.456 | 6.192 |
|  | −0.382 | −0.459 | 6.192 |
|  | −0.379 | −0.463 | 6.192 |
|  | −0.376 | −0.466 | 6.192 |
|  | −0.373 | −0.470 | 6.192 |
|  | −0.370 | −0.473 | 6.192 |
|  | −0.367 | −0.476 | 6.192 |
|  | −0.351 | −0.492 | 6.192 |
|  | −0.333 | −0.506 | 6.192 |
|  | −0.314 | −0.519 | 6.192 |
|  | −0.293 | −0.529 | 6.192 |
|  | −0.272 | −0.537 | 6.192 |
|  | −0.250 | −0.543 | 6.192 |
|  | −0.227 | −0.546 | 6.192 |
|  | −0.205 | −0.547 | 6.192 |
|  | −0.182 | −0.546 | 6.192 |
|  | −0.159 | −0.542 | 6.192 |
|  | −0.137 | −0.537 | 6.192 |
|  | −0.116 | −0.529 | 6.192 |
|  | −0.095 | −0.520 | 6.192 |
|  | −0.075 | −0.509 | 6.192 |
|  | −0.056 | −0.496 | 6.192 |
|  | −0.038 | −0.482 | 6.192 |
|  | −0.020 | −0.467 | 6.192 |
|  | −0.004 | −0.451 | 6.192 |
|  | 0.012 | −0.435 | 6.192 |
|  | 0.027 | −0.418 | 6.192 |
|  | 0.042 | −0.401 | 6.192 |
|  | 0.057 | −0.383 | 6.192 |
|  | 0.071 | −0.365 | 6.192 |
|  | 0.085 | −0.347 | 6.192 |
|  | 0.098 | −0.329 | 6.192 |
|  | 0.111 | −0.310 | 6.192 |
|  | 0.124 | −0.291 | 6.192 |
|  | 0.137 | −0.272 | 6.192 |
|  | 0.150 | −0.253 | 6.192 |
|  | 0.162 | −0.234 | 6.192 |
|  | 0.174 | −0.215 | 6.192 |
|  | 0.187 | −0.196 | 6.192 |
|  | 0.199 | −0.176 | 6.192 |
|  | 0.211 | −0.157 | 6.192 |
|  | 0.222 | −0.137 | 6.192 |
|  | 0.234 | −0.118 | 6.192 |
|  | 0.245 | −0.098 | 6.192 |
|  | 0.257 | −0.078 | 6.192 |
|  | 0.268 | −0.058 | 6.192 |
|  | 0.279 | −0.038 | 6.192 |
|  | 0.290 | −0.018 | 6.192 |
|  | 0.301 | 0.002 | 6.192 |
|  | 0.311 | 0.022 | 6.192 |
|  | 0.322 | 0.042 | 6.192 |
|  | 0.332 | 0.063 | 6.192 |
|  | 0.342 | 0.083 | 6.192 |
|  | 0.352 | 0.104 | 6.192 |
|  | 0.362 | 0.124 | 6.192 |
|  | 0.371 | 0.145 | 6.192 |
|  | 0.381 | 0.166 | 6.192 |
|  | 0.390 | 0.187 | 6.192 |
|  | 0.399 | 0.208 | 6.192 |
|  | 0.408 | 0.229 | 6.192 |
|  | 0.417 | 0.250 | 6.192 |

TABLE 2-continued

| X | Y | Z |
|---|---|---|
| 0.426 | 0.271 | 6.192 |
| 0.434 | 0.292 | 6.192 |
| 0.443 | 0.313 | 6.192 |
| 0.451 | 0.334 | 6.192 |
| 0.459 | 0.356 | 6.192 |
| 0.467 | 0.377 | 6.192 |
| 0.475 | 0.398 | 6.192 |
| 0.483 | 0.420 | 6.192 |
| 0.491 | 0.441 | 6.192 |
| 0.498 | 0.463 | 6.192 |
| 0.505 | 0.485 | 6.192 |
| 0.513 | 0.506 | 6.192 |
| 0.519 | 0.528 | 6.192 |
| 0.526 | 0.550 | 6.192 |
| 0.533 | 0.572 | 6.192 |
| 0.540 | 0.593 | 6.192 |
| 0.547 | 0.615 | 6.192 |
| 0.554 | 0.637 | 6.192 |
| 0.561 | 0.659 | 6.192 |
| 0.568 | 0.680 | 6.192 |
| 0.575 | 0.702 | 6.192 |
| 0.581 | 0.724 | 6.192 |
| 0.588 | 0.746 | 6.192 |
| 0.595 | 0.768 | 6.192 |
| 0.601 | 0.790 | 6.192 |
| 0.602 | 0.794 | 6.192 |
| 0.603 | 0.798 | 6.192 |
| 0.605 | 0.803 | 6.192 |
| 0.606 | 0.807 | 6.192 |
| 0.607 | 0.812 | 6.192 |
| 0.608 | 0.816 | 6.192 |
| 0.610 | 0.820 | 6.192 |
| 0.611 | 0.825 | 6.192 |
| 0.612 | 0.829 | 6.192 |
| 0.613 | 0.833 | 6.192 |
| 0.614 | 0.836 | 6.192 |
| 0.614 | 0.839 | 6.192 |
| 0.614 | 0.842 | 6.192 |
| 0.613 | 0.845 | 6.192 |
| 0.612 | 0.847 | 6.192 |
| 0.611 | 0.849 | 6.192 |
| 0.609 | 0.852 | 6.192 |
| 0.607 | 0.854 | 6.192 |
| 0.604 | 0.855 | 6.192 |
| 0.602 | 0.856 | 6.192 |
| 0.599 | 0.857 | 6.192 |
| 0.596 | 0.858 | 6.192 |
| 0.594 | 0.858 | 6.192 |
| 0.591 | 0.857 | 6.192 |
| 0.588 | 0.856 | 6.192 |
| 0.586 | 0.855 | 6.192 |
| 0.584 | 0.853 | 6.192 |
| 0.582 | 0.851 | 6.192 |
| 0.580 | 0.849 | 6.192 |
| 0.578 | 0.846 | 6.192 |
| 0.576 | 0.843 | 6.192 |
| 0.574 | 0.840 | 6.192 |
| 0.572 | 0.837 | 6.192 |
| 0.570 | 0.834 | 6.192 |
| 0.568 | 0.831 | 6.192 |
| 0.566 | 0.828 | 6.192 |
| 0.565 | 0.825 | 6.192 |
| 0.563 | 0.822 | 6.192 |
| 0.561 | 0.819 | 6.192 |
| 0.551 | 0.805 | 6.192 |
| 0.541 | 0.790 | 6.192 |
| 0.532 | 0.776 | 6.192 |
| 0.522 | 0.761 | 6.192 |
| 0.513 | 0.746 | 6.192 |
| 0.504 | 0.731 | 6.192 |
| 0.495 | 0.716 | 6.192 |
| 0.486 | 0.701 | 6.192 |
| 0.477 | 0.686 | 6.192 |
| 0.467 | 0.671 | 6.192 |
| 0.458 | 0.656 | 6.192 |
| 0.449 | 0.641 | 6.192 |
| 0.439 | 0.627 | 6.192 |
| 0.430 | 0.612 | 6.192 |
| 0.420 | 0.598 | 6.192 |
| 0.410 | 0.583 | 6.192 |
| 0.400 | 0.569 | 6.192 |
| 0.390 | 0.554 | 6.192 |
| 0.380 | 0.540 | 6.192 |
| 0.370 | 0.525 | 6.192 |
| 0.361 | 0.511 | 6.192 |
| 0.351 | 0.496 | 6.192 |
| 0.341 | 0.482 | 6.192 |
| 0.332 | 0.467 | 6.192 |
| 0.322 | 0.452 | 6.192 |
| 0.312 | 0.438 | 6.192 |
| 0.303 | 0.423 | 6.192 |
| 0.293 | 0.408 | 6.192 |
| 0.283 | 0.394 | 6.192 |
| 0.274 | 0.379 | 6.192 |
| 0.264 | 0.365 | 6.192 |
| 0.254 | 0.350 | 6.192 |
| 0.244 | 0.336 | 6.192 |
| 0.235 | 0.321 | 6.192 |
| 0.225 | 0.307 | 6.192 |
| 0.215 | 0.292 | 6.192 |
| 0.205 | 0.278 | 6.192 |
| 0.195 | 0.263 | 6.192 |
| 0.185 | 0.249 | 6.192 |
| 0.175 | 0.235 | 6.192 |
| 0.165 | 0.220 | 6.192 |
| 0.155 | 0.206 | 6.192 |
| 0.145 | 0.192 | 6.192 |
| 0.135 | 0.177 | 6.192 |
| 0.124 | 0.163 | 6.192 |
| 0.114 | 0.149 | 6.192 |
| 0.104 | 0.135 | 6.192 |
| 0.094 | 0.120 | 6.192 |
| 0.083 | 0.106 | 6.192 |
| 0.073 | 0.092 | 6.192 |
| 0.062 | 0.078 | 6.192 |
| 0.052 | 0.064 | 6.192 |
| 0.041 | 0.050 | 6.192 |
| 0.030 | 0.037 | 6.192 |
| 0.019 | 0.023 | 6.192 |
| 0.009 | 0.009 | 6.192 |
| −0.002 | −0.005 | 6.192 |
| −0.013 | −0.018 | 6.192 |
| −0.025 | −0.032 | 6.192 |
| −0.036 | −0.045 | 6.192 |
| −0.047 | −0.059 | 6.192 |
| −0.058 | −0.072 | 6.192 |
| −0.070 | −0.085 | 6.192 |
| −0.082 | −0.098 | 6.192 |
| −0.093 | −0.111 | 6.192 |
| −0.105 | −0.124 | 6.192 |
| −0.117 | −0.137 | 6.192 |
| −0.130 | −0.149 | 6.192 |
| −0.142 | −0.162 | 6.192 |
| −0.155 | −0.174 | 6.192 |
| −0.168 | −0.185 | 6.192 |
| −0.181 | −0.197 | 6.192 |
| −0.194 | −0.208 | 6.192 |
| −0.208 | −0.219 | 6.192 |
| −0.222 | −0.230 | 6.192 |
| −0.236 | −0.240 | 6.192 |
| −0.251 | −0.249 | 6.192 |
| −0.267 | −0.256 | 6.192 |
| −0.284 | −0.262 | 6.192 |
| −0.287 | −0.263 | 6.192 |
| −0.290 | −0.264 | 6.192 |
| −0.294 | −0.265 | 6.192 |
| −0.297 | −0.266 | 6.192 |
| −0.301 | −0.267 | 6.192 |
| −0.304 | −0.267 | 6.192 |
| −0.308 | −0.267 | 6.192 |
| −0.311 | −0.268 | 6.192 |
| −0.315 | −0.268 | 6.192 |
| −0.318 | −0.268 | 6.192 |
| −0.332 | −0.268 | 6.192 |
| −0.345 | −0.268 | 6.192 |
| −0.359 | −0.269 | 6.192 |

TABLE 2-continued

|  | X | Y | Z |
|---|---|---|---|
|  | −0.372 | −0.272 | 6.192 |
|  | −0.385 | −0.276 | 6.192 |
|  | −0.397 | −0.282 | 6.192 |
|  | −0.408 | −0.290 | 6.192 |
|  | −0.417 | −0.300 | 6.192 |
|  | −0.424 | −0.312 | 6.192 |
|  | −0.428 | −0.325 | 6.192 |
|  | −0.430 | −0.339 | 6.192 |
|  | −0.430 | −0.352 | 6.192 |
|  | −0.428 | −0.366 | 6.192 |
|  | −0.425 | −0.379 | 6.192 |
|  | −0.420 | −0.392 | 6.192 |
|  | −0.415 | −0.405 | 6.192 |
|  | −0.409 | −0.417 | 6.192 |
|  | −0.403 | −0.429 | 6.192 |
| SECTION 3 | −0.399 | −0.491 | 6.442 |
|  | −0.396 | −0.495 | 6.442 |
|  | −0.394 | −0.499 | 6.442 |
|  | −0.391 | −0.502 | 6.442 |
|  | −0.388 | −0.506 | 6.442 |
|  | −0.386 | −0.510 | 6.442 |
|  | −0.383 | −0.514 | 6.442 |
|  | −0.380 | −0.517 | 6.442 |
|  | −0.377 | −0.521 | 6.442 |
|  | −0.374 | −0.524 | 6.442 |
|  | −0.371 | −0.528 | 6.442 |
|  | −0.354 | −0.544 | 6.442 |
|  | −0.336 | −0.559 | 6.442 |
|  | −0.316 | −0.571 | 6.442 |
|  | −0.295 | −0.582 | 6.442 |
|  | −0.274 | −0.591 | 6.442 |
|  | −0.251 | −0.597 | 6.442 |
|  | −0.228 | −0.601 | 6.442 |
|  | −0.205 | −0.602 | 6.442 |
|  | −0.182 | −0.601 | 6.442 |
|  | −0.159 | −0.598 | 6.442 |
|  | −0.136 | −0.593 | 6.442 |
|  | −0.113 | −0.587 | 6.442 |
|  | −0.092 | −0.578 | 6.442 |
|  | −0.071 | −0.568 | 6.442 |
|  | −0.051 | −0.556 | 6.442 |
|  | −0.031 | −0.543 | 6.442 |
|  | −0.013 | −0.529 | 6.442 |
|  | 0.005 | −0.514 | 6.442 |
|  | 0.022 | −0.498 | 6.442 |
|  | 0.038 | −0.481 | 6.442 |
|  | 0.054 | −0.464 | 6.442 |
|  | 0.070 | −0.447 | 6.442 |
|  | 0.085 | −0.429 | 6.442 |
|  | 0.099 | −0.410 | 6.442 |
|  | 0.113 | −0.392 | 6.442 |
|  | 0.127 | −0.373 | 6.442 |
|  | 0.141 | −0.354 | 6.442 |
|  | 0.154 | −0.335 | 6.442 |
|  | 0.167 | −0.315 | 6.442 |
|  | 0.179 | −0.296 | 6.442 |
|  | 0.192 | −0.276 | 6.442 |
|  | 0.204 | −0.256 | 6.442 |
|  | 0.216 | −0.236 | 6.442 |
|  | 0.227 | −0.216 | 6.442 |
|  | 0.239 | −0.195 | 6.442 |
|  | 0.250 | −0.175 | 6.442 |
|  | 0.261 | −0.154 | 6.442 |
|  | 0.272 | −0.134 | 6.442 |
|  | 0.283 | −0.113 | 6.442 |
|  | 0.294 | −0.092 | 6.442 |
|  | 0.304 | −0.072 | 6.442 |
|  | 0.315 | −0.051 | 6.442 |
|  | 0.325 | −0.030 | 6.442 |
|  | 0.335 | −0.009 | 6.442 |
|  | 0.344 | 0.013 | 6.442 |
|  | 0.354 | 0.034 | 6.442 |
|  | 0.364 | 0.055 | 6.442 |
|  | 0.373 | 0.076 | 6.442 |
|  | 0.382 | 0.098 | 6.442 |
|  | 0.391 | 0.119 | 6.442 |
|  | 0.400 | 0.141 | 6.442 |
|  | 0.409 | 0.163 | 6.442 |
|  | 0.418 | 0.184 | 6.442 |
|  | 0.426 | 0.206 | 6.442 |
|  | 0.435 | 0.228 | 6.442 |
|  | 0.443 | 0.249 | 6.442 |
|  | 0.451 | 0.271 | 6.442 |
|  | 0.459 | 0.293 | 6.442 |
|  | 0.467 | 0.315 | 6.442 |
|  | 0.475 | 0.337 | 6.442 |
|  | 0.483 | 0.359 | 6.442 |
|  | 0.491 | 0.381 | 6.442 |
|  | 0.498 | 0.403 | 6.442 |
|  | 0.506 | 0.425 | 6.442 |
|  | 0.513 | 0.447 | 6.442 |
|  | 0.520 | 0.470 | 6.442 |
|  | 0.527 | 0.492 | 6.442 |
|  | 0.534 | 0.514 | 6.442 |
|  | 0.541 | 0.536 | 6.442 |
|  | 0.548 | 0.559 | 6.442 |
|  | 0.555 | 0.581 | 6.442 |
|  | 0.562 | 0.603 | 6.442 |
|  | 0.569 | 0.625 | 6.442 |
|  | 0.577 | 0.647 | 6.442 |
|  | 0.584 | 0.670 | 6.442 |
|  | 0.591 | 0.692 | 6.442 |
|  | 0.598 | 0.714 | 6.442 |
|  | 0.604 | 0.737 | 6.442 |
|  | 0.611 | 0.759 | 6.442 |
|  | 0.612 | 0.763 | 6.442 |
|  | 0.614 | 0.768 | 6.442 |
|  | 0.615 | 0.772 | 6.442 |
|  | 0.616 | 0.777 | 6.442 |
|  | 0.618 | 0.781 | 6.442 |
|  | 0.619 | 0.786 | 6.442 |
|  | 0.620 | 0.790 | 6.442 |
|  | 0.622 | 0.795 | 6.442 |
|  | 0.623 | 0.799 | 6.442 |
|  | 0.624 | 0.804 | 6.442 |
|  | 0.625 | 0.806 | 6.442 |
|  | 0.625 | 0.809 | 6.442 |
|  | 0.625 | 0.812 | 6.442 |
|  | 0.624 | 0.815 | 6.442 |
|  | 0.623 | 0.817 | 6.442 |
|  | 0.621 | 0.820 | 6.442 |
|  | 0.620 | 0.822 | 6.442 |
|  | 0.618 | 0.824 | 6.442 |
|  | 0.615 | 0.826 | 6.442 |
|  | 0.613 | 0.827 | 6.442 |
|  | 0.610 | 0.828 | 6.442 |
|  | 0.607 | 0.828 | 6.442 |
|  | 0.605 | 0.828 | 6.442 |
|  | 0.602 | 0.827 | 6.442 |
|  | 0.599 | 0.826 | 6.442 |
|  | 0.597 | 0.825 | 6.442 |
|  | 0.595 | 0.823 | 6.442 |
|  | 0.593 | 0.821 | 6.442 |
|  | 0.591 | 0.819 | 6.442 |
|  | 0.589 | 0.816 | 6.442 |
|  | 0.587 | 0.813 | 6.442 |
|  | 0.585 | 0.810 | 6.442 |
|  | 0.583 | 0.807 | 6.442 |
|  | 0.581 | 0.804 | 6.442 |
|  | 0.579 | 0.801 | 6.442 |
|  | 0.577 | 0.798 | 6.442 |
|  | 0.575 | 0.795 | 6.442 |
|  | 0.573 | 0.792 | 6.442 |
|  | 0.571 | 0.789 | 6.442 |
|  | 0.561 | 0.775 | 6.442 |
|  | 0.551 | 0.760 | 6.442 |
|  | 0.541 | 0.745 | 6.442 |
|  | 0.532 | 0.730 | 6.442 |
|  | 0.523 | 0.715 | 6.442 |
|  | 0.514 | 0.700 | 6.442 |
|  | 0.504 | 0.685 | 6.442 |
|  | 0.495 | 0.670 | 6.442 |
|  | 0.485 | 0.655 | 6.442 |
|  | 0.476 | 0.640 | 6.442 |
|  | 0.467 | 0.625 | 6.442 |
|  | 0.457 | 0.610 | 6.442 |

TABLE 2-continued

| X | Y | Z |
|---|---|---|
| 0.447 | 0.595 | 6.442 |
| 0.438 | 0.580 | 6.442 |
| 0.428 | 0.565 | 6.442 |
| 0.418 | 0.551 | 6.442 |
| 0.408 | 0.536 | 6.442 |
| 0.398 | 0.521 | 6.442 |
| 0.388 | 0.507 | 6.442 |
| 0.378 | 0.492 | 6.442 |
| 0.368 | 0.477 | 6.442 |
| 0.358 | 0.462 | 6.442 |
| 0.349 | 0.447 | 6.442 |
| 0.339 | 0.433 | 6.442 |
| 0.329 | 0.418 | 6.442 |
| 0.320 | 0.403 | 6.442 |
| 0.310 | 0.388 | 6.442 |
| 0.300 | 0.373 | 6.442 |
| 0.290 | 0.358 | 6.442 |
| 0.281 | 0.343 | 6.442 |
| 0.271 | 0.329 | 6.442 |
| 0.261 | 0.314 | 6.442 |
| 0.251 | 0.299 | 6.442 |
| 0.241 | 0.284 | 6.442 |
| 0.232 | 0.270 | 6.442 |
| 0.222 | 0.255 | 6.442 |
| 0.212 | 0.240 | 6.442 |
| 0.202 | 0.225 | 6.442 |
| 0.192 | 0.211 | 6.442 |
| 0.182 | 0.196 | 6.442 |
| 0.172 | 0.181 | 6.442 |
| 0.162 | 0.167 | 6.442 |
| 0.152 | 0.152 | 6.442 |
| 0.142 | 0.137 | 6.442 |
| 0.132 | 0.123 | 6.442 |
| 0.121 | 0.108 | 6.442 |
| 0.111 | 0.094 | 6.442 |
| 0.101 | 0.079 | 6.442 |
| 0.091 | 0.065 | 6.442 |
| 0.080 | 0.051 | 6.442 |
| 0.070 | 0.036 | 6.442 |
| 0.059 | 0.022 | 6.442 |
| 0.049 | 0.008 | 6.442 |
| 0.038 | −0.007 | 6.442 |
| 0.028 | −0.021 | 6.442 |
| 0.017 | −0.035 | 6.442 |
| 0.006 | −0.049 | 6.442 |
| −0.005 | −0.063 | 6.442 |
| −0.016 | −0.077 | 6.442 |
| −0.027 | −0.091 | 6.442 |
| −0.038 | −0.104 | 6.442 |
| −0.050 | −0.118 | 6.442 |
| −0.061 | −0.132 | 6.442 |
| −0.072 | −0.145 | 6.442 |
| −0.084 | −0.159 | 6.442 |
| −0.096 | −0.172 | 6.442 |
| −0.108 | −0.185 | 6.442 |
| −0.120 | −0.198 | 6.442 |
| −0.132 | −0.211 | 6.442 |
| −0.145 | −0.223 | 6.442 |
| −0.158 | −0.236 | 6.442 |
| −0.171 | −0.248 | 6.442 |
| −0.184 | −0.259 | 6.442 |
| −0.198 | −0.271 | 6.442 |
| −0.212 | −0.282 | 6.442 |
| −0.226 | −0.292 | 6.442 |
| −0.241 | −0.301 | 6.442 |
| −0.257 | −0.309 | 6.442 |
| −0.274 | −0.315 | 6.442 |
| −0.277 | −0.316 | 6.442 |
| −0.281 | −0.317 | 6.442 |
| −0.284 | −0.318 | 6.442 |
| −0.288 | −0.318 | 6.442 |
| −0.291 | −0.319 | 6.442 |
| −0.295 | −0.320 | 6.442 |
| −0.298 | −0.320 | 6.442 |
| −0.302 | −0.320 | 6.442 |
| −0.305 | −0.320 | 6.442 |
| −0.309 | −0.320 | 6.442 |
| −0.323 | −0.320 | 6.442 |
| −0.336 | −0.319 | 6.442 |
| −0.350 | −0.320 | 6.442 |
| −0.364 | −0.323 | 6.442 |
| −0.377 | −0.327 | 6.442 |
| −0.390 | −0.332 | 6.442 |
| −0.402 | −0.340 | 6.442 |
| −0.412 | −0.349 | 6.442 |
| −0.420 | −0.360 | 6.442 |
| −0.425 | −0.373 | 6.442 |
| −0.429 | −0.386 | 6.442 |
| −0.430 | −0.400 | 6.442 |
| −0.429 | −0.414 | 6.442 |
| −0.426 | −0.427 | 6.442 |
| −0.422 | −0.441 | 6.442 |
| −0.418 | −0.454 | 6.442 |
| −0.412 | −0.466 | 6.442 |
| −0.406 | −0.479 | 6.442 |

SECTION 4

| X | Y | Z |
|---|---|---|
| −0.401 | −0.532 | 6.672 |
| −0.398 | −0.536 | 6.672 |
| −0.396 | −0.540 | 6.672 |
| −0.393 | −0.544 | 6.672 |
| −0.390 | −0.548 | 6.672 |
| −0.387 | −0.552 | 6.672 |
| −0.385 | −0.555 | 6.672 |
| −0.382 | −0.559 | 6.672 |
| −0.379 | −0.563 | 6.672 |
| −0.375 | −0.566 | 6.672 |
| −0.372 | −0.570 | 6.672 |
| −0.355 | −0.586 | 6.672 |
| −0.337 | −0.601 | 6.672 |
| −0.317 | −0.614 | 6.672 |
| −0.296 | −0.625 | 6.672 |
| −0.273 | −0.633 | 6.672 |
| −0.250 | −0.640 | 6.672 |
| −0.227 | −0.644 | 6.672 |
| −0.203 | −0.645 | 6.672 |
| −0.180 | −0.645 | 6.672 |
| −0.156 | −0.642 | 6.672 |
| −0.133 | −0.638 | 6.672 |
| −0.110 | −0.632 | 6.672 |
| −0.087 | −0.624 | 6.672 |
| −0.066 | −0.614 | 6.672 |
| −0.045 | −0.603 | 6.672 |
| −0.024 | −0.591 | 6.672 |
| −0.005 | −0.577 | 6.672 |
| 0.014 | −0.563 | 6.672 |
| 0.032 | −0.548 | 6.672 |
| 0.050 | −0.531 | 6.672 |
| 0.067 | −0.515 | 6.672 |
| 0.083 | −0.497 | 6.672 |
| 0.099 | −0.480 | 6.672 |
| 0.114 | −0.461 | 6.672 |
| 0.129 | −0.443 | 6.672 |
| 0.143 | −0.424 | 6.672 |
| 0.157 | −0.404 | 6.672 |
| 0.170 | −0.385 | 6.672 |
| 0.183 | −0.365 | 6.672 |
| 0.196 | −0.345 | 6.672 |
| 0.208 | −0.325 | 6.672 |
| 0.220 | −0.304 | 6.672 |
| 0.232 | −0.284 | 6.672 |
| 0.244 | −0.263 | 6.672 |
| 0.255 | −0.242 | 6.672 |
| 0.266 | −0.221 | 6.672 |
| 0.277 | −0.200 | 6.672 |
| 0.288 | −0.179 | 6.672 |
| 0.298 | −0.158 | 6.672 |
| 0.309 | −0.136 | 6.672 |
| 0.319 | −0.115 | 6.672 |
| 0.329 | −0.093 | 6.672 |
| 0.339 | −0.071 | 6.672 |
| 0.348 | −0.050 | 6.672 |
| 0.358 | −0.028 | 6.672 |
| 0.367 | −0.006 | 6.672 |
| 0.376 | 0.016 | 6.672 |
| 0.385 | 0.038 | 6.672 |
| 0.394 | 0.060 | 6.672 |
| 0.403 | 0.082 | 6.672 |

TABLE 2-continued

| X | Y | Z |
|---|---|---|
| 0.411 | 0.104 | 6.672 |
| 0.420 | 0.126 | 6.672 |
| 0.428 | 0.148 | 6.672 |
| 0.437 | 0.171 | 6.672 |
| 0.445 | 0.193 | 6.672 |
| 0.453 | 0.215 | 6.672 |
| 0.461 | 0.238 | 6.672 |
| 0.469 | 0.260 | 6.672 |
| 0.477 | 0.283 | 6.672 |
| 0.485 | 0.305 | 6.672 |
| 0.492 | 0.327 | 6.672 |
| 0.500 | 0.350 | 6.672 |
| 0.508 | 0.372 | 6.672 |
| 0.515 | 0.395 | 6.672 |
| 0.522 | 0.418 | 6.672 |
| 0.529 | 0.440 | 6.672 |
| 0.536 | 0.463 | 6.672 |
| 0.543 | 0.486 | 6.672 |
| 0.550 | 0.508 | 6.672 |
| 0.557 | 0.531 | 6.672 |
| 0.564 | 0.554 | 6.672 |
| 0.571 | 0.576 | 6.672 |
| 0.579 | 0.599 | 6.672 |
| 0.586 | 0.622 | 6.672 |
| 0.593 | 0.644 | 6.672 |
| 0.600 | 0.667 | 6.672 |
| 0.607 | 0.690 | 6.672 |
| 0.614 | 0.712 | 6.672 |
| 0.621 | 0.735 | 6.672 |
| 0.622 | 0.740 | 6.672 |
| 0.624 | 0.744 | 6.672 |
| 0.625 | 0.749 | 6.672 |
| 0.626 | 0.753 | 6.672 |
| 0.628 | 0.758 | 6.672 |
| 0.629 | 0.763 | 6.672 |
| 0.630 | 0.767 | 6.672 |
| 0.632 | 0.772 | 6.672 |
| 0.633 | 0.776 | 6.672 |
| 0.634 | 0.781 | 6.672 |
| 0.635 | 0.784 | 6.672 |
| 0.635 | 0.786 | 6.672 |
| 0.635 | 0.789 | 6.672 |
| 0.634 | 0.792 | 6.672 |
| 0.633 | 0.795 | 6.672 |
| 0.632 | 0.797 | 6.672 |
| 0.630 | 0.799 | 6.672 |
| 0.628 | 0.801 | 6.672 |
| 0.625 | 0.803 | 6.672 |
| 0.623 | 0.804 | 6.672 |
| 0.620 | 0.805 | 6.672 |
| 0.617 | 0.805 | 6.672 |
| 0.615 | 0.805 | 6.672 |
| 0.612 | 0.804 | 6.672 |
| 0.609 | 0.803 | 6.672 |
| 0.607 | 0.802 | 6.672 |
| 0.605 | 0.800 | 6.672 |
| 0.603 | 0.798 | 6.672 |
| 0.601 | 0.796 | 6.672 |
| 0.599 | 0.793 | 6.672 |
| 0.597 | 0.790 | 6.672 |
| 0.595 | 0.787 | 6.672 |
| 0.593 | 0.784 | 6.672 |
| 0.591 | 0.781 | 6.672 |
| 0.589 | 0.778 | 6.672 |
| 0.587 | 0.775 | 6.672 |
| 0.585 | 0.772 | 6.672 |
| 0.583 | 0.769 | 6.672 |
| 0.581 | 0.766 | 6.672 |
| 0.571 | 0.751 | 6.672 |
| 0.561 | 0.736 | 6.672 |
| 0.551 | 0.721 | 6.672 |
| 0.542 | 0.706 | 6.672 |
| 0.532 | 0.691 | 6.672 |
| 0.523 | 0.675 | 6.672 |
| 0.514 | 0.660 | 6.672 |
| 0.504 | 0.645 | 6.672 |
| 0.495 | 0.629 | 6.672 |
| 0.485 | 0.614 | 6.672 |

TABLE 2-continued

| X | Y | Z |
|---|---|---|
| 0.476 | 0.599 | 6.672 |
| 0.466 | 0.584 | 6.672 |
| 0.456 | 0.569 | 6.672 |
| 0.446 | 0.554 | 6.672 |
| 0.436 | 0.539 | 6.672 |
| 0.426 | 0.524 | 6.672 |
| 0.416 | 0.509 | 6.672 |
| 0.406 | 0.494 | 6.672 |
| 0.396 | 0.479 | 6.672 |
| 0.386 | 0.465 | 6.672 |
| 0.376 | 0.450 | 6.672 |
| 0.367 | 0.434 | 6.672 |
| 0.357 | 0.419 | 6.672 |
| 0.347 | 0.404 | 6.672 |
| 0.337 | 0.389 | 6.672 |
| 0.328 | 0.374 | 6.672 |
| 0.318 | 0.359 | 6.672 |
| 0.308 | 0.344 | 6.672 |
| 0.298 | 0.329 | 6.672 |
| 0.288 | 0.314 | 6.672 |
| 0.279 | 0.299 | 6.672 |
| 0.269 | 0.284 | 6.672 |
| 0.259 | 0.269 | 6.672 |
| 0.249 | 0.254 | 6.672 |
| 0.239 | 0.239 | 6.672 |
| 0.229 | 0.224 | 6.672 |
| 0.219 | 0.209 | 6.672 |
| 0.209 | 0.194 | 6.672 |
| 0.200 | 0.179 | 6.672 |
| 0.190 | 0.164 | 6.672 |
| 0.180 | 0.149 | 6.672 |
| 0.170 | 0.134 | 6.672 |
| 0.159 | 0.119 | 6.672 |
| 0.149 | 0.105 | 6.672 |
| 0.139 | 0.090 | 6.672 |
| 0.129 | 0.075 | 6.672 |
| 0.119 | 0.060 | 6.672 |
| 0.109 | 0.045 | 6.672 |
| 0.098 | 0.031 | 6.672 |
| 0.088 | 0.016 | 6.672 |
| 0.078 | 0.001 | 6.672 |
| 0.067 | −0.013 | 6.672 |
| 0.057 | −0.028 | 6.672 |
| 0.046 | −0.042 | 6.672 |
| 0.035 | −0.057 | 6.672 |
| 0.025 | −0.071 | 6.672 |
| 0.014 | −0.085 | 6.672 |
| 0.003 | −0.100 | 6.672 |
| −0.008 | −0.114 | 6.672 |
| −0.019 | −0.128 | 6.672 |
| −0.030 | −0.142 | 6.672 |
| −0.041 | −0.156 | 6.672 |
| −0.053 | −0.170 | 6.672 |
| −0.064 | −0.184 | 6.672 |
| −0.076 | −0.198 | 6.672 |
| −0.088 | −0.211 | 6.672 |
| −0.099 | −0.225 | 6.672 |
| −0.112 | −0.238 | 6.672 |
| −0.124 | −0.251 | 6.672 |
| −0.136 | −0.264 | 6.672 |
| −0.149 | −0.276 | 6.672 |
| −0.162 | −0.289 | 6.672 |
| −0.176 | −0.301 | 6.672 |
| −0.189 | −0.312 | 6.672 |
| −0.203 | −0.323 | 6.672 |
| −0.218 | −0.334 | 6.672 |
| −0.233 | −0.343 | 6.672 |
| −0.249 | −0.351 | 6.672 |
| −0.266 | −0.357 | 6.672 |
| −0.270 | −0.358 | 6.672 |
| −0.273 | −0.359 | 6.672 |
| −0.277 | −0.360 | 6.672 |
| −0.280 | −0.361 | 6.672 |
| −0.284 | −0.361 | 6.672 |
| −0.287 | −0.362 | 6.672 |
| −0.291 | −0.362 | 6.672 |
| −0.294 | −0.362 | 6.672 |
| −0.298 | −0.363 | 6.672 |

TABLE 2-continued

|  | X | Y | Z |
|---|---|---|---|
|  | −0.302 | −0.362 | 6.672 |
|  | −0.316 | −0.362 | 6.672 |
|  | −0.330 | −0.362 | 6.672 |
|  | −0.344 | −0.363 | 6.672 |
|  | −0.357 | −0.365 | 6.672 |
|  | −0.371 | −0.369 | 6.672 |
|  | −0.384 | −0.374 | 6.672 |
|  | −0.396 | −0.381 | 6.672 |
|  | −0.407 | −0.389 | 6.672 |
|  | −0.416 | −0.400 | 6.672 |
|  | −0.423 | −0.412 | 6.672 |
|  | −0.427 | −0.426 | 6.672 |
|  | −0.429 | −0.440 | 6.672 |
|  | −0.429 | −0.454 | 6.672 |
|  | −0.427 | −0.467 | 6.672 |
|  | −0.424 | −0.481 | 6.672 |
|  | −0.419 | −0.494 | 6.672 |
|  | −0.414 | −0.507 | 6.672 |
|  | −0.408 | −0.520 | 6.672 |
| SECTION 5 | −0.395 | −0.559 | 6.917 |
|  | −0.392 | −0.563 | 6.917 |
|  | −0.390 | −0.567 | 6.917 |
|  | −0.387 | −0.571 | 6.917 |
|  | −0.384 | −0.574 | 6.917 |
|  | −0.381 | −0.578 | 6.917 |
|  | −0.378 | −0.582 | 6.917 |
|  | −0.375 | −0.585 | 6.917 |
|  | −0.371 | −0.589 | 6.917 |
|  | −0.368 | −0.592 | 6.917 |
|  | −0.365 | −0.596 | 6.917 |
|  | −0.347 | −0.612 | 6.917 |
|  | −0.327 | −0.626 | 6.917 |
|  | −0.307 | −0.638 | 6.917 |
|  | −0.285 | −0.648 | 6.917 |
|  | −0.262 | −0.656 | 6.917 |
|  | −0.239 | −0.662 | 6.917 |
|  | −0.216 | −0.666 | 6.917 |
|  | −0.192 | −0.668 | 6.917 |
|  | −0.168 | −0.668 | 6.917 |
|  | −0.144 | −0.666 | 6.917 |
|  | −0.120 | −0.662 | 6.917 |
|  | −0.097 | −0.656 | 6.917 |
|  | −0.074 | −0.649 | 6.917 |
|  | −0.052 | −0.640 | 6.917 |
|  | −0.030 | −0.630 | 6.917 |
|  | −0.009 | −0.619 | 6.917 |
|  | 0.012 | −0.607 | 6.917 |
|  | 0.032 | −0.593 | 6.917 |
|  | 0.051 | −0.579 | 6.917 |
|  | 0.069 | −0.563 | 6.917 |
|  | 0.087 | −0.547 | 6.917 |
|  | 0.104 | −0.531 | 6.917 |
|  | 0.121 | −0.513 | 6.917 |
|  | 0.137 | −0.495 | 6.917 |
|  | 0.152 | −0.477 | 6.917 |
|  | 0.167 | −0.458 | 6.917 |
|  | 0.182 | −0.439 | 6.917 |
|  | 0.196 | −0.420 | 6.917 |
|  | 0.209 | −0.400 | 6.917 |
|  | 0.222 | −0.380 | 6.917 |
|  | 0.235 | −0.359 | 6.917 |
|  | 0.247 | −0.339 | 6.917 |
|  | 0.259 | −0.318 | 6.917 |
|  | 0.271 | −0.297 | 6.917 |
|  | 0.282 | −0.276 | 6.917 |
|  | 0.293 | −0.254 | 6.917 |
|  | 0.304 | −0.233 | 6.917 |
|  | 0.314 | −0.211 | 6.917 |
|  | 0.325 | −0.190 | 6.917 |
|  | 0.335 | −0.168 | 6.917 |
|  | 0.344 | −0.146 | 6.917 |
|  | 0.354 | −0.124 | 6.917 |
|  | 0.363 | −0.102 | 6.917 |
|  | 0.373 | −0.080 | 6.917 |
|  | 0.382 | −0.058 | 6.917 |
|  | 0.391 | −0.035 | 6.917 |
|  | 0.399 | −0.013 | 6.917 |
|  | 0.408 | 0.009 | 6.917 |

TABLE 2-continued

| X | Y | Z |
|---|---|---|
| 0.416 | 0.032 | 6.917 |
| 0.425 | 0.054 | 6.917 |
| 0.433 | 0.077 | 6.917 |
| 0.441 | 0.099 | 6.917 |
| 0.449 | 0.122 | 6.917 |
| 0.457 | 0.145 | 6.917 |
| 0.464 | 0.167 | 6.917 |
| 0.472 | 0.190 | 6.917 |
| 0.480 | 0.213 | 6.917 |
| 0.487 | 0.236 | 6.917 |
| 0.495 | 0.258 | 6.917 |
| 0.502 | 0.281 | 6.917 |
| 0.509 | 0.304 | 6.917 |
| 0.517 | 0.327 | 6.917 |
| 0.524 | 0.350 | 6.917 |
| 0.531 | 0.373 | 6.917 |
| 0.538 | 0.396 | 6.917 |
| 0.544 | 0.419 | 6.917 |
| 0.551 | 0.442 | 6.917 |
| 0.558 | 0.465 | 6.917 |
| 0.564 | 0.488 | 6.917 |
| 0.571 | 0.511 | 6.917 |
| 0.578 | 0.534 | 6.917 |
| 0.585 | 0.557 | 6.917 |
| 0.592 | 0.580 | 6.917 |
| 0.599 | 0.603 | 6.917 |
| 0.606 | 0.626 | 6.917 |
| 0.613 | 0.649 | 6.917 |
| 0.619 | 0.672 | 6.917 |
| 0.626 | 0.695 | 6.917 |
| 0.633 | 0.718 | 6.917 |
| 0.634 | 0.722 | 6.917 |
| 0.635 | 0.727 | 6.917 |
| 0.636 | 0.732 | 6.917 |
| 0.638 | 0.736 | 6.917 |
| 0.639 | 0.741 | 6.917 |
| 0.640 | 0.745 | 6.917 |
| 0.642 | 0.750 | 6.917 |
| 0.643 | 0.755 | 6.917 |
| 0.644 | 0.759 | 6.917 |
| 0.646 | 0.764 | 6.917 |
| 0.646 | 0.767 | 6.917 |
| 0.646 | 0.769 | 6.917 |
| 0.646 | 0.772 | 6.917 |
| 0.645 | 0.775 | 6.917 |
| 0.644 | 0.778 | 6.917 |
| 0.643 | 0.780 | 6.917 |
| 0.641 | 0.782 | 6.917 |
| 0.639 | 0.784 | 6.917 |
| 0.636 | 0.786 | 6.917 |
| 0.634 | 0.787 | 6.917 |
| 0.631 | 0.788 | 6.917 |
| 0.628 | 0.788 | 6.917 |
| 0.626 | 0.788 | 6.917 |
| 0.623 | 0.787 | 6.917 |
| 0.620 | 0.786 | 6.917 |
| 0.618 | 0.785 | 6.917 |
| 0.616 | 0.783 | 6.917 |
| 0.614 | 0.781 | 6.917 |
| 0.612 | 0.778 | 6.917 |
| 0.610 | 0.775 | 6.917 |
| 0.608 | 0.772 | 6.917 |
| 0.606 | 0.769 | 6.917 |
| 0.604 | 0.766 | 6.917 |
| 0.602 | 0.763 | 6.917 |
| 0.600 | 0.760 | 6.917 |
| 0.598 | 0.757 | 6.917 |
| 0.596 | 0.754 | 6.917 |
| 0.594 | 0.751 | 6.917 |
| 0.592 | 0.748 | 6.917 |
| 0.582 | 0.733 | 6.917 |
| 0.573 | 0.718 | 6.917 |
| 0.563 | 0.702 | 6.917 |
| 0.554 | 0.687 | 6.917 |
| 0.544 | 0.671 | 6.917 |
| 0.535 | 0.655 | 6.917 |
| 0.526 | 0.640 | 6.917 |
| 0.517 | 0.624 | 6.917 |

TABLE 2-continued

| X | Y | Z |
|---|---|---|
| 0.508 | 0.609 | 6.917 |
| 0.498 | 0.593 | 6.917 |
| 0.489 | 0.578 | 6.917 |
| 0.479 | 0.562 | 6.917 |
| 0.470 | 0.547 | 6.917 |
| 0.460 | 0.531 | 6.917 |
| 0.450 | 0.516 | 6.917 |
| 0.440 | 0.501 | 6.917 |
| 0.430 | 0.486 | 6.917 |
| 0.420 | 0.471 | 6.917 |
| 0.410 | 0.456 | 6.917 |
| 0.400 | 0.440 | 6.917 |
| 0.391 | 0.425 | 6.917 |
| 0.381 | 0.410 | 6.917 |
| 0.371 | 0.394 | 6.917 |
| 0.361 | 0.379 | 6.917 |
| 0.352 | 0.364 | 6.917 |
| 0.342 | 0.348 | 6.917 |
| 0.332 | 0.333 | 6.917 |
| 0.323 | 0.318 | 6.917 |
| 0.313 | 0.303 | 6.917 |
| 0.303 | 0.287 | 6.917 |
| 0.293 | 0.272 | 6.917 |
| 0.283 | 0.257 | 6.917 |
| 0.274 | 0.242 | 6.917 |
| 0.264 | 0.226 | 6.917 |
| 0.254 | 0.211 | 6.917 |
| 0.244 | 0.196 | 6.917 |
| 0.234 | 0.181 | 6.917 |
| 0.224 | 0.166 | 6.917 |
| 0.214 | 0.151 | 6.917 |
| 0.204 | 0.136 | 6.917 |
| 0.194 | 0.121 | 6.917 |
| 0.184 | 0.105 | 6.917 |
| 0.173 | 0.091 | 6.917 |
| 0.163 | 0.076 | 6.917 |
| 0.153 | 0.061 | 6.917 |
| 0.142 | 0.046 | 6.917 |
| 0.132 | 0.031 | 6.917 |
| 0.122 | 0.016 | 6.917 |
| 0.111 | 0.001 | 6.917 |
| 0.100 | −0.013 | 6.917 |
| 0.090 | −0.028 | 6.917 |
| 0.079 | −0.043 | 6.917 |
| 0.068 | −0.057 | 6.917 |
| 0.057 | −0.072 | 6.917 |
| 0.046 | −0.086 | 6.917 |
| 0.035 | −0.101 | 6.917 |
| 0.024 | −0.115 | 6.917 |
| 0.013 | −0.129 | 6.917 |
| 0.001 | −0.143 | 6.917 |
| −0.010 | −0.157 | 6.917 |
| −0.022 | −0.171 | 6.917 |
| −0.034 | −0.185 | 6.917 |
| −0.046 | −0.198 | 6.917 |
| −0.058 | −0.212 | 6.917 |
| −0.070 | −0.225 | 6.917 |
| −0.082 | −0.239 | 6.917 |
| −0.095 | −0.252 | 6.917 |
| −0.108 | −0.264 | 6.917 |
| −0.121 | −0.277 | 6.917 |
| −0.134 | −0.289 | 6.917 |
| −0.148 | −0.301 | 6.917 |
| −0.162 | −0.313 | 6.917 |
| −0.176 | −0.324 | 6.917 |
| −0.190 | −0.335 | 6.917 |
| −0.205 | −0.345 | 6.917 |
| −0.221 | −0.354 | 6.917 |
| −0.237 | −0.363 | 6.917 |
| −0.254 | −0.370 | 6.917 |
| −0.271 | −0.376 | 6.917 |
| −0.275 | −0.376 | 6.917 |
| −0.278 | −0.377 | 6.917 |
| −0.282 | −0.378 | 6.917 |
| −0.285 | −0.379 | 6.917 |
| −0.289 | −0.379 | 6.917 |
| −0.292 | −0.380 | 6.917 |
| −0.296 | −0.380 | 6.917 |
| −0.300 | −0.380 | 6.917 |
| −0.303 | −0.380 | 6.917 |
| −0.307 | −0.380 | 6.917 |
| −0.321 | −0.380 | 6.917 |
| −0.335 | −0.381 | 6.917 |
| −0.349 | −0.383 | 6.917 |
| −0.363 | −0.386 | 6.917 |
| −0.376 | −0.390 | 6.917 |
| −0.389 | −0.397 | 6.917 |
| −0.401 | −0.405 | 6.917 |
| −0.411 | −0.414 | 6.917 |
| −0.419 | −0.426 | 6.917 |
| −0.425 | −0.439 | 6.917 |
| −0.428 | −0.453 | 6.917 |
| −0.429 | −0.467 | 6.917 |
| −0.428 | −0.481 | 6.917 |
| −0.425 | −0.495 | 6.917 |
| −0.421 | −0.508 | 6.917 |
| −0.415 | −0.522 | 6.917 |
| −0.409 | −0.534 | 6.917 |
| −0.402 | −0.547 | 6.917 |

SECTION 6

| X | Y | Z |
|---|---|---|
| −0.388 | −0.560 | 7.142 |
| −0.385 | −0.564 | 7.142 |
| −0.382 | −0.568 | 7.142 |
| −0.379 | −0.571 | 7.142 |
| −0.376 | −0.575 | 7.142 |
| −0.372 | −0.579 | 7.142 |
| −0.369 | −0.582 | 7.142 |
| −0.366 | −0.586 | 7.142 |
| −0.362 | −0.589 | 7.142 |
| −0.359 | −0.592 | 7.142 |
| −0.355 | −0.596 | 7.142 |
| −0.337 | −0.611 | 7.142 |
| −0.317 | −0.624 | 7.142 |
| −0.296 | −0.636 | 7.142 |
| −0.273 | −0.646 | 7.142 |
| −0.251 | −0.653 | 7.142 |
| −0.227 | −0.659 | 7.142 |
| −0.203 | −0.663 | 7.142 |
| −0.179 | −0.665 | 7.142 |
| −0.155 | −0.665 | 7.142 |
| −0.131 | −0.664 | 7.142 |
| −0.107 | −0.660 | 7.142 |
| −0.084 | −0.656 | 7.142 |
| −0.061 | −0.649 | 7.142 |
| −0.038 | −0.641 | 7.142 |
| −0.016 | −0.632 | 7.142 |
| 0.006 | −0.622 | 7.142 |
| 0.027 | −0.610 | 7.142 |
| 0.048 | −0.597 | 7.142 |
| 0.067 | −0.583 | 7.142 |
| 0.087 | −0.569 | 7.142 |
| 0.105 | −0.553 | 7.142 |
| 0.123 | −0.537 | 7.142 |
| 0.140 | −0.520 | 7.142 |
| 0.157 | −0.503 | 7.142 |
| 0.173 | −0.485 | 7.142 |
| 0.188 | −0.466 | 7.142 |
| 0.203 | −0.447 | 7.142 |
| 0.217 | −0.428 | 7.142 |
| 0.231 | −0.408 | 7.142 |
| 0.245 | −0.388 | 7.142 |
| 0.258 | −0.368 | 7.142 |
| 0.270 | −0.347 | 7.142 |
| 0.283 | −0.327 | 7.142 |
| 0.294 | −0.306 | 7.142 |
| 0.306 | −0.284 | 7.142 |
| 0.317 | −0.263 | 7.142 |
| 0.328 | −0.241 | 7.142 |
| 0.339 | −0.220 | 7.142 |
| 0.349 | −0.198 | 7.142 |
| 0.359 | −0.176 | 7.142 |
| 0.369 | −0.154 | 7.142 |
| 0.378 | −0.132 | 7.142 |
| 0.387 | −0.110 | 7.142 |
| 0.396 | −0.087 | 7.142 |
| 0.405 | −0.065 | 7.142 |
| 0.414 | −0.042 | 7.142 |

TABLE 2-continued

| X | Y | Z |
|---|---|---|
| 0.422 | −0.020 | 7.142 |
| 0.431 | 0.003 | 7.142 |
| 0.439 | 0.025 | 7.142 |
| 0.447 | 0.048 | 7.142 |
| 0.455 | 0.071 | 7.142 |
| 0.463 | 0.094 | 7.142 |
| 0.470 | 0.117 | 7.142 |
| 0.478 | 0.140 | 7.142 |
| 0.485 | 0.162 | 7.142 |
| 0.493 | 0.185 | 7.142 |
| 0.500 | 0.208 | 7.142 |
| 0.507 | 0.231 | 7.142 |
| 0.514 | 0.254 | 7.142 |
| 0.521 | 0.277 | 7.142 |
| 0.528 | 0.301 | 7.142 |
| 0.535 | 0.324 | 7.142 |
| 0.542 | 0.347 | 7.142 |
| 0.549 | 0.370 | 7.142 |
| 0.555 | 0.393 | 7.142 |
| 0.562 | 0.416 | 7.142 |
| 0.568 | 0.440 | 7.142 |
| 0.574 | 0.463 | 7.142 |
| 0.581 | 0.486 | 7.142 |
| 0.587 | 0.509 | 7.142 |
| 0.593 | 0.533 | 7.142 |
| 0.600 | 0.556 | 7.142 |
| 0.606 | 0.579 | 7.142 |
| 0.613 | 0.602 | 7.142 |
| 0.620 | 0.625 | 7.142 |
| 0.626 | 0.649 | 7.142 |
| 0.632 | 0.672 | 7.142 |
| 0.639 | 0.695 | 7.142 |
| 0.645 | 0.718 | 7.142 |
| 0.646 | 0.723 | 7.142 |
| 0.647 | 0.728 | 7.142 |
| 0.648 | 0.732 | 7.142 |
| 0.650 | 0.737 | 7.142 |
| 0.651 | 0.742 | 7.142 |
| 0.652 | 0.746 | 7.142 |
| 0.653 | 0.751 | 7.142 |
| 0.654 | 0.756 | 7.142 |
| 0.656 | 0.760 | 7.142 |
| 0.657 | 0.765 | 7.142 |
| 0.657 | 0.768 | 7.142 |
| 0.657 | 0.771 | 7.142 |
| 0.657 | 0.774 | 7.142 |
| 0.656 | 0.776 | 7.142 |
| 0.655 | 0.779 | 7.142 |
| 0.654 | 0.781 | 7.142 |
| 0.652 | 0.783 | 7.142 |
| 0.650 | 0.785 | 7.142 |
| 0.647 | 0.787 | 7.142 |
| 0.645 | 0.788 | 7.142 |
| 0.642 | 0.789 | 7.142 |
| 0.639 | 0.789 | 7.142 |
| 0.636 | 0.789 | 7.142 |
| 0.634 | 0.788 | 7.142 |
| 0.631 | 0.787 | 7.142 |
| 0.629 | 0.785 | 7.142 |
| 0.627 | 0.784 | 7.142 |
| 0.625 | 0.781 | 7.142 |
| 0.623 | 0.779 | 7.142 |
| 0.621 | 0.776 | 7.142 |
| 0.619 | 0.773 | 7.142 |
| 0.617 | 0.770 | 7.142 |
| 0.615 | 0.767 | 7.142 |
| 0.614 | 0.763 | 7.142 |
| 0.612 | 0.760 | 7.142 |
| 0.610 | 0.757 | 7.142 |
| 0.608 | 0.754 | 7.142 |
| 0.606 | 0.751 | 7.142 |
| 0.604 | 0.748 | 7.142 |
| 0.594 | 0.732 | 7.142 |
| 0.585 | 0.717 | 7.142 |
| 0.575 | 0.701 | 7.142 |
| 0.566 | 0.685 | 7.142 |
| 0.557 | 0.669 | 7.142 |
| 0.549 | 0.653 | 7.142 |

TABLE 2-continued

| X | Y | Z |
|---|---|---|
| 0.540 | 0.637 | 7.142 |
| 0.531 | 0.621 | 7.142 |
| 0.521 | 0.605 | 7.142 |
| 0.512 | 0.590 | 7.142 |
| 0.503 | 0.574 | 7.142 |
| 0.494 | 0.558 | 7.142 |
| 0.484 | 0.542 | 7.142 |
| 0.475 | 0.527 | 7.142 |
| 0.465 | 0.511 | 7.142 |
| 0.455 | 0.496 | 7.142 |
| 0.445 | 0.480 | 7.142 |
| 0.436 | 0.465 | 7.142 |
| 0.426 | 0.449 | 7.142 |
| 0.416 | 0.434 | 7.142 |
| 0.406 | 0.418 | 7.142 |
| 0.397 | 0.403 | 7.142 |
| 0.387 | 0.387 | 7.142 |
| 0.378 | 0.372 | 7.142 |
| 0.368 | 0.356 | 7.142 |
| 0.358 | 0.341 | 7.142 |
| 0.349 | 0.325 | 7.142 |
| 0.339 | 0.310 | 7.142 |
| 0.329 | 0.294 | 7.142 |
| 0.319 | 0.279 | 7.142 |
| 0.310 | 0.263 | 7.142 |
| 0.300 | 0.248 | 7.142 |
| 0.290 | 0.232 | 7.142 |
| 0.280 | 0.217 | 7.142 |
| 0.270 | 0.202 | 7.142 |
| 0.260 | 0.186 | 7.142 |
| 0.250 | 0.171 | 7.142 |
| 0.240 | 0.156 | 7.142 |
| 0.230 | 0.141 | 7.142 |
| 0.219 | 0.125 | 7.142 |
| 0.209 | 0.110 | 7.142 |
| 0.199 | 0.095 | 7.142 |
| 0.188 | 0.080 | 7.142 |
| 0.178 | 0.065 | 7.142 |
| 0.167 | 0.050 | 7.142 |
| 0.157 | 0.035 | 7.142 |
| 0.146 | 0.020 | 7.142 |
| 0.135 | 0.006 | 7.142 |
| 0.125 | −0.009 | 7.142 |
| 0.114 | −0.024 | 7.142 |
| 0.103 | −0.038 | 7.142 |
| 0.091 | −0.053 | 7.142 |
| 0.080 | −0.067 | 7.142 |
| 0.069 | −0.082 | 7.142 |
| 0.057 | −0.096 | 7.142 |
| 0.046 | −0.110 | 7.142 |
| 0.034 | −0.124 | 7.142 |
| 0.022 | −0.138 | 7.142 |
| 0.010 | −0.152 | 7.142 |
| −0.002 | −0.165 | 7.142 |
| −0.014 | −0.179 | 7.142 |
| −0.027 | −0.192 | 7.142 |
| −0.040 | −0.206 | 7.142 |
| −0.052 | −0.219 | 7.142 |
| −0.065 | −0.231 | 7.142 |
| −0.079 | −0.244 | 7.142 |
| −0.092 | −0.256 | 7.142 |
| −0.106 | −0.268 | 7.142 |
| −0.120 | −0.280 | 7.142 |
| −0.134 | −0.292 | 7.142 |
| −0.149 | −0.303 | 7.142 |
| −0.164 | −0.313 | 7.142 |
| −0.179 | −0.323 | 7.142 |
| −0.195 | −0.333 | 7.142 |
| −0.211 | −0.341 | 7.142 |
| −0.227 | −0.349 | 7.142 |
| −0.244 | −0.356 | 7.142 |
| −0.262 | −0.362 | 7.142 |
| −0.279 | −0.367 | 7.142 |
| −0.283 | −0.368 | 7.142 |
| −0.287 | −0.368 | 7.142 |
| −0.290 | −0.369 | 7.142 |
| −0.294 | −0.369 | 7.142 |
| −0.297 | −0.370 | 7.142 |

TABLE 2-continued

| | X | Y | Z |
|---|---|---|---|
| | −0.301 | −0.370 | 7.142 |
| | −0.305 | −0.371 | 7.142 |
| | −0.308 | −0.371 | 7.142 |
| | −0.312 | −0.371 | 7.142 |
| | −0.316 | −0.371 | 7.142 |
| | −0.330 | −0.372 | 7.142 |
| | −0.344 | −0.374 | 7.142 |
| | −0.358 | −0.377 | 7.142 |
| | −0.372 | −0.381 | 7.142 |
| | −0.385 | −0.387 | 7.142 |
| | −0.397 | −0.394 | 7.142 |
| | −0.408 | −0.404 | 7.142 |
| | −0.417 | −0.415 | 7.142 |
| | −0.423 | −0.427 | 7.142 |
| | −0.427 | −0.441 | 7.142 |
| | −0.429 | −0.455 | 7.142 |
| | −0.428 | −0.470 | 7.142 |
| | −0.426 | −0.484 | 7.142 |
| | −0.422 | −0.498 | 7.142 |
| | −0.417 | −0.511 | 7.142 |
| | −0.411 | −0.524 | 7.142 |
| | −0.404 | −0.536 | 7.142 |
| | −0.396 | −0.548 | 7.142 |
| SECTION 7 | −0.389 | −0.540 | 7.347 |
| | −0.386 | −0.544 | 7.347 |
| | −0.383 | −0.548 | 7.347 |
| | −0.380 | −0.552 | 7.347 |
| | −0.377 | −0.555 | 7.347 |
| | −0.373 | −0.559 | 7.347 |
| | −0.370 | −0.563 | 7.347 |
| | −0.367 | −0.566 | 7.347 |
| | −0.363 | −0.569 | 7.347 |
| | −0.360 | −0.573 | 7.347 |
| | −0.356 | −0.576 | 7.347 |
| | −0.337 | −0.592 | 7.347 |
| | −0.318 | −0.606 | 7.347 |
| | −0.296 | −0.618 | 7.347 |
| | −0.274 | −0.628 | 7.347 |
| | −0.252 | −0.637 | 7.347 |
| | −0.228 | −0.643 | 7.347 |
| | −0.204 | −0.648 | 7.347 |
| | −0.180 | −0.650 | 7.347 |
| | −0.156 | −0.651 | 7.347 |
| | −0.131 | −0.650 | 7.347 |
| | −0.107 | −0.647 | 7.347 |
| | −0.083 | −0.643 | 7.347 |
| | −0.060 | −0.636 | 7.347 |
| | −0.036 | −0.629 | 7.347 |
| | −0.014 | −0.620 | 7.347 |
| | 0.008 | −0.609 | 7.347 |
| | 0.030 | −0.598 | 7.347 |
| | 0.050 | −0.585 | 7.347 |
| | 0.070 | −0.571 | 7.347 |
| | 0.090 | −0.556 | 7.347 |
| | 0.108 | −0.541 | 7.347 |
| | 0.126 | −0.524 | 7.347 |
| | 0.144 | −0.507 | 7.347 |
| | 0.161 | −0.490 | 7.347 |
| | 0.177 | −0.472 | 7.347 |
| | 0.193 | −0.453 | 7.347 |
| | 0.208 | −0.434 | 7.347 |
| | 0.223 | −0.415 | 7.347 |
| | 0.237 | −0.395 | 7.347 |
| | 0.251 | −0.375 | 7.347 |
| | 0.264 | −0.354 | 7.347 |
| | 0.277 | −0.334 | 7.347 |
| | 0.290 | −0.313 | 7.347 |
| | 0.302 | −0.292 | 7.347 |
| | 0.314 | −0.271 | 7.347 |
| | 0.325 | −0.249 | 7.347 |
| | 0.336 | −0.227 | 7.347 |
| | 0.347 | −0.206 | 7.347 |
| | 0.358 | −0.184 | 7.347 |
| | 0.368 | −0.162 | 7.347 |
| | 0.378 | −0.139 | 7.347 |
| | 0.388 | −0.117 | 7.347 |
| | 0.398 | −0.095 | 7.347 |
| | 0.407 | −0.072 | 7.347 |

TABLE 2-continued

| X | Y | Z |
|---|---|---|
| 0.416 | −0.050 | 7.347 |
| 0.425 | −0.027 | 7.347 |
| 0.434 | −0.004 | 7.347 |
| 0.442 | 0.019 | 7.347 |
| 0.451 | 0.041 | 7.347 |
| 0.459 | 0.064 | 7.347 |
| 0.467 | 0.087 | 7.347 |
| 0.475 | 0.110 | 7.347 |
| 0.483 | 0.133 | 7.347 |
| 0.490 | 0.157 | 7.347 |
| 0.498 | 0.180 | 7.347 |
| 0.506 | 0.203 | 7.347 |
| 0.513 | 0.226 | 7.347 |
| 0.520 | 0.249 | 7.347 |
| 0.527 | 0.273 | 7.347 |
| 0.535 | 0.296 | 7.347 |
| 0.542 | 0.319 | 7.347 |
| 0.549 | 0.343 | 7.347 |
| 0.555 | 0.366 | 7.347 |
| 0.562 | 0.389 | 7.347 |
| 0.569 | 0.413 | 7.347 |
| 0.575 | 0.436 | 7.347 |
| 0.581 | 0.460 | 7.347 |
| 0.588 | 0.483 | 7.347 |
| 0.594 | 0.507 | 7.347 |
| 0.600 | 0.530 | 7.347 |
| 0.607 | 0.554 | 7.347 |
| 0.613 | 0.577 | 7.347 |
| 0.620 | 0.601 | 7.347 |
| 0.626 | 0.624 | 7.347 |
| 0.632 | 0.648 | 7.347 |
| 0.639 | 0.671 | 7.347 |
| 0.645 | 0.695 | 7.347 |
| 0.651 | 0.719 | 7.347 |
| 0.657 | 0.742 | 7.347 |
| 0.658 | 0.747 | 7.347 |
| 0.659 | 0.752 | 7.347 |
| 0.660 | 0.756 | 7.347 |
| 0.661 | 0.761 | 7.347 |
| 0.663 | 0.766 | 7.347 |
| 0.664 | 0.771 | 7.347 |
| 0.665 | 0.775 | 7.347 |
| 0.666 | 0.780 | 7.347 |
| 0.667 | 0.785 | 7.347 |
| 0.668 | 0.790 | 7.347 |
| 0.669 | 0.792 | 7.347 |
| 0.669 | 0.795 | 7.347 |
| 0.669 | 0.798 | 7.347 |
| 0.668 | 0.801 | 7.347 |
| 0.667 | 0.803 | 7.347 |
| 0.665 | 0.806 | 7.347 |
| 0.663 | 0.808 | 7.347 |
| 0.661 | 0.810 | 7.347 |
| 0.659 | 0.812 | 7.347 |
| 0.656 | 0.813 | 7.347 |
| 0.653 | 0.813 | 7.347 |
| 0.651 | 0.814 | 7.347 |
| 0.648 | 0.813 | 7.347 |
| 0.645 | 0.813 | 7.347 |
| 0.642 | 0.811 | 7.347 |
| 0.640 | 0.810 | 7.347 |
| 0.638 | 0.808 | 7.347 |
| 0.636 | 0.806 | 7.347 |
| 0.634 | 0.803 | 7.347 |
| 0.633 | 0.800 | 7.347 |
| 0.631 | 0.797 | 7.347 |
| 0.629 | 0.794 | 7.347 |
| 0.627 | 0.791 | 7.347 |
| 0.625 | 0.787 | 7.347 |
| 0.623 | 0.784 | 7.347 |
| 0.621 | 0.781 | 7.347 |
| 0.619 | 0.778 | 7.347 |
| 0.617 | 0.775 | 7.347 |
| 0.616 | 0.772 | 7.347 |
| 0.606 | 0.756 | 7.347 |
| 0.597 | 0.740 | 7.347 |
| 0.588 | 0.724 | 7.347 |
| 0.578 | 0.708 | 7.347 |

TABLE 2-continued

| X | Y | Z |
|---|---|---|
| 0.570 | 0.692 | 7.347 |
| 0.561 | 0.675 | 7.347 |
| 0.552 | 0.659 | 7.347 |
| 0.543 | 0.643 | 7.347 |
| 0.534 | 0.627 | 7.347 |
| 0.525 | 0.611 | 7.347 |
| 0.516 | 0.595 | 7.347 |
| 0.506 | 0.579 | 7.347 |
| 0.497 | 0.563 | 7.347 |
| 0.487 | 0.548 | 7.347 |
| 0.478 | 0.532 | 7.347 |
| 0.468 | 0.516 | 7.347 |
| 0.458 | 0.501 | 7.347 |
| 0.448 | 0.485 | 7.347 |
| 0.438 | 0.469 | 7.347 |
| 0.429 | 0.454 | 7.347 |
| 0.419 | 0.438 | 7.347 |
| 0.409 | 0.422 | 7.347 |
| 0.400 | 0.407 | 7.347 |
| 0.390 | 0.391 | 7.347 |
| 0.380 | 0.375 | 7.347 |
| 0.371 | 0.360 | 7.347 |
| 0.361 | 0.344 | 7.347 |
| 0.351 | 0.328 | 7.347 |
| 0.341 | 0.313 | 7.347 |
| 0.331 | 0.297 | 7.347 |
| 0.322 | 0.281 | 7.347 |
| 0.312 | 0.266 | 7.347 |
| 0.302 | 0.250 | 7.347 |
| 0.292 | 0.235 | 7.347 |
| 0.282 | 0.219 | 7.347 |
| 0.272 | 0.204 | 7.347 |
| 0.261 | 0.189 | 7.347 |
| 0.251 | 0.173 | 7.347 |
| 0.241 | 0.158 | 7.347 |
| 0.231 | 0.143 | 7.347 |
| 0.220 | 0.127 | 7.347 |
| 0.210 | 0.112 | 7.347 |
| 0.199 | 0.097 | 7.347 |
| 0.189 | 0.082 | 7.347 |
| 0.178 | 0.067 | 7.347 |
| 0.167 | 0.052 | 7.347 |
| 0.156 | 0.037 | 7.347 |
| 0.146 | 0.022 | 7.347 |
| 0.135 | 0.007 | 7.347 |
| 0.124 | −0.008 | 7.347 |
| 0.112 | −0.022 | 7.347 |
| 0.101 | −0.037 | 7.347 |
| 0.090 | −0.051 | 7.347 |
| 0.078 | −0.066 | 7.347 |
| 0.067 | −0.080 | 7.347 |
| 0.055 | −0.094 | 7.347 |
| 0.043 | −0.108 | 7.347 |
| 0.031 | −0.122 | 7.347 |
| 0.019 | −0.136 | 7.347 |
| 0.006 | −0.150 | 7.347 |
| −0.006 | −0.163 | 7.347 |
| −0.019 | −0.177 | 7.347 |
| −0.032 | −0.190 | 7.347 |
| −0.045 | −0.203 | 7.347 |
| −0.058 | −0.216 | 7.347 |
| −0.071 | −0.229 | 7.347 |
| −0.085 | −0.241 | 7.347 |
| −0.099 | −0.253 | 7.347 |
| −0.113 | −0.265 | 7.347 |
| −0.128 | −0.276 | 7.347 |
| −0.143 | −0.287 | 7.347 |
| −0.158 | −0.297 | 7.347 |
| −0.174 | −0.307 | 7.347 |
| −0.190 | −0.316 | 7.347 |
| −0.206 | −0.325 | 7.347 |
| −0.223 | −0.332 | 7.347 |
| −0.240 | −0.339 | 7.347 |
| −0.257 | −0.345 | 7.347 |
| −0.275 | −0.349 | 7.347 |
| −0.279 | −0.350 | 7.347 |
| −0.283 | −0.350 | 7.347 |
| −0.286 | −0.351 | 7.347 |

TABLE 2-continued

| | X | Y | Z |
|---|---|---|---|
| | −0.290 | −0.352 | 7.347 |
| | −0.294 | −0.352 | 7.347 |
| | −0.297 | −0.352 | 7.347 |
| | −0.301 | −0.353 | 7.347 |
| | −0.305 | −0.353 | 7.347 |
| | −0.308 | −0.353 | 7.347 |
| | −0.312 | −0.353 | 7.347 |
| | −0.326 | −0.354 | 7.347 |
| | −0.341 | −0.356 | 7.347 |
| | −0.355 | −0.359 | 7.347 |
| | −0.368 | −0.363 | 7.347 |
| | −0.382 | −0.368 | 7.347 |
| | −0.394 | −0.375 | 7.347 |
| | −0.405 | −0.384 | 7.347 |
| | −0.415 | −0.395 | 7.347 |
| | −0.422 | −0.407 | 7.347 |
| | −0.427 | −0.421 | 7.347 |
| | −0.429 | −0.435 | 7.347 |
| | −0.429 | −0.449 | 7.347 |
| | −0.427 | −0.464 | 7.347 |
| | −0.423 | −0.478 | 7.347 |
| | −0.418 | −0.491 | 7.347 |
| | −0.412 | −0.504 | 7.347 |
| | −0.405 | −0.516 | 7.347 |
| | −0.397 | −0.529 | 7.347 |
| SECTION 8 | −0.391 | −0.506 | 7.547 |
| | −0.388 | −0.510 | 7.547 |
| | −0.385 | −0.514 | 7.547 |
| | −0.382 | −0.518 | 7.547 |
| | −0.379 | −0.521 | 7.547 |
| | −0.376 | −0.525 | 7.547 |
| | −0.372 | −0.529 | 7.547 |
| | −0.369 | −0.532 | 7.547 |
| | −0.365 | −0.536 | 7.547 |
| | −0.362 | −0.539 | 7.547 |
| | −0.358 | −0.543 | 7.547 |
| | −0.340 | −0.559 | 7.547 |
| | −0.320 | −0.573 | 7.547 |
| | −0.299 | −0.586 | 7.547 |
| | −0.277 | −0.597 | 7.547 |
| | −0.254 | −0.606 | 7.547 |
| | −0.230 | −0.613 | 7.547 |
| | −0.206 | −0.619 | 7.547 |
| | −0.182 | −0.622 | 7.547 |
| | −0.158 | −0.623 | 7.547 |
| | −0.133 | −0.623 | 7.547 |
| | −0.108 | −0.620 | 7.547 |
| | −0.084 | −0.616 | 7.547 |
| | −0.060 | −0.611 | 7.547 |
| | −0.037 | −0.603 | 7.547 |
| | −0.014 | −0.594 | 7.547 |
| | 0.008 | −0.584 | 7.547 |
| | 0.030 | −0.572 | 7.547 |
| | 0.051 | −0.559 | 7.547 |
| | 0.071 | −0.545 | 7.547 |
| | 0.091 | −0.530 | 7.547 |
| | 0.109 | −0.514 | 7.547 |
| | 0.128 | −0.498 | 7.547 |
| | 0.145 | −0.480 | 7.547 |
| | 0.162 | −0.463 | 7.547 |
| | 0.179 | −0.445 | 7.547 |
| | 0.195 | −0.426 | 7.547 |
| | 0.210 | −0.407 | 7.547 |
| | 0.225 | −0.387 | 7.547 |
| | 0.240 | −0.367 | 7.547 |
| | 0.254 | −0.347 | 7.547 |
| | 0.268 | −0.327 | 7.547 |
| | 0.281 | −0.306 | 7.547 |
| | 0.294 | −0.285 | 7.547 |
| | 0.306 | −0.264 | 7.547 |
| | 0.318 | −0.242 | 7.547 |
| | 0.330 | −0.221 | 7.547 |
| | 0.342 | −0.199 | 7.547 |
| | 0.353 | −0.177 | 7.547 |
| | 0.364 | −0.155 | 7.547 |
| | 0.375 | −0.133 | 7.547 |
| | 0.385 | −0.111 | 7.547 |
| | 0.395 | −0.088 | 7.547 |

TABLE 2-continued

| X | Y | Z |
|---|---|---|
| 0.405 | −0.066 | 7.547 |
| 0.415 | −0.043 | 7.547 |
| 0.424 | −0.021 | 7.547 |
| 0.433 | 0.002 | 7.547 |
| 0.443 | 0.025 | 7.547 |
| 0.451 | 0.048 | 7.547 |
| 0.460 | 0.071 | 7.547 |
| 0.469 | 0.094 | 7.547 |
| 0.477 | 0.117 | 7.547 |
| 0.485 | 0.140 | 7.547 |
| 0.493 | 0.164 | 7.547 |
| 0.501 | 0.187 | 7.547 |
| 0.509 | 0.210 | 7.547 |
| 0.517 | 0.234 | 7.547 |
| 0.524 | 0.257 | 7.547 |
| 0.532 | 0.281 | 7.547 |
| 0.539 | 0.304 | 7.547 |
| 0.547 | 0.327 | 7.547 |
| 0.554 | 0.351 | 7.547 |
| 0.561 | 0.375 | 7.547 |
| 0.568 | 0.398 | 7.547 |
| 0.574 | 0.422 | 7.547 |
| 0.581 | 0.446 | 7.547 |
| 0.587 | 0.469 | 7.547 |
| 0.594 | 0.493 | 7.547 |
| 0.600 | 0.517 | 7.547 |
| 0.606 | 0.541 | 7.547 |
| 0.612 | 0.565 | 7.547 |
| 0.619 | 0.588 | 7.547 |
| 0.625 | 0.612 | 7.547 |
| 0.631 | 0.636 | 7.547 |
| 0.637 | 0.660 | 7.547 |
| 0.644 | 0.684 | 7.547 |
| 0.650 | 0.707 | 7.547 |
| 0.655 | 0.731 | 7.547 |
| 0.661 | 0.755 | 7.547 |
| 0.667 | 0.779 | 7.547 |
| 0.668 | 0.784 | 7.547 |
| 0.669 | 0.789 | 7.547 |
| 0.670 | 0.794 | 7.547 |
| 0.671 | 0.798 | 7.547 |
| 0.672 | 0.803 | 7.547 |
| 0.673 | 0.808 | 7.547 |
| 0.674 | 0.813 | 7.547 |
| 0.675 | 0.818 | 7.547 |
| 0.677 | 0.822 | 7.547 |
| 0.678 | 0.827 | 7.547 |
| 0.678 | 0.830 | 7.547 |
| 0.678 | 0.833 | 7.547 |
| 0.678 | 0.836 | 7.547 |
| 0.677 | 0.838 | 7.547 |
| 0.676 | 0.841 | 7.547 |
| 0.674 | 0.843 | 7.547 |
| 0.672 | 0.846 | 7.547 |
| 0.670 | 0.848 | 7.547 |
| 0.668 | 0.849 | 7.547 |
| 0.665 | 0.850 | 7.547 |
| 0.662 | 0.851 | 7.547 |
| 0.659 | 0.851 | 7.547 |
| 0.657 | 0.851 | 7.547 |
| 0.654 | 0.850 | 7.547 |
| 0.651 | 0.849 | 7.547 |
| 0.649 | 0.847 | 7.547 |
| 0.647 | 0.845 | 7.547 |
| 0.645 | 0.843 | 7.547 |
| 0.643 | 0.840 | 7.547 |
| 0.642 | 0.837 | 7.547 |
| 0.640 | 0.834 | 7.547 |
| 0.638 | 0.831 | 7.547 |
| 0.636 | 0.828 | 7.547 |
| 0.634 | 0.824 | 7.547 |
| 0.633 | 0.821 | 7.547 |
| 0.631 | 0.818 | 7.547 |
| 0.629 | 0.815 | 7.547 |
| 0.627 | 0.811 | 7.547 |
| 0.625 | 0.808 | 7.547 |
| 0.616 | 0.792 | 7.547 |
| 0.607 | 0.776 | 7.547 |
| 0.598 | 0.760 | 7.547 |
| 0.589 | 0.744 | 7.547 |
| 0.580 | 0.727 | 7.547 |
| 0.571 | 0.711 | 7.547 |
| 0.563 | 0.695 | 7.547 |
| 0.554 | 0.678 | 7.547 |
| 0.545 | 0.662 | 7.547 |
| 0.536 | 0.646 | 7.547 |
| 0.527 | 0.630 | 7.547 |
| 0.518 | 0.614 | 7.547 |
| 0.508 | 0.598 | 7.547 |
| 0.499 | 0.582 | 7.547 |
| 0.489 | 0.566 | 7.547 |
| 0.479 | 0.550 | 7.547 |
| 0.470 | 0.534 | 7.547 |
| 0.460 | 0.519 | 7.547 |
| 0.450 | 0.503 | 7.547 |
| 0.440 | 0.487 | 7.547 |
| 0.430 | 0.472 | 7.547 |
| 0.421 | 0.456 | 7.547 |
| 0.411 | 0.440 | 7.547 |
| 0.401 | 0.424 | 7.547 |
| 0.392 | 0.408 | 7.547 |
| 0.382 | 0.393 | 7.547 |
| 0.372 | 0.377 | 7.547 |
| 0.362 | 0.361 | 7.547 |
| 0.352 | 0.346 | 7.547 |
| 0.342 | 0.330 | 7.547 |
| 0.332 | 0.314 | 7.547 |
| 0.322 | 0.299 | 7.547 |
| 0.312 | 0.283 | 7.547 |
| 0.302 | 0.268 | 7.547 |
| 0.292 | 0.252 | 7.547 |
| 0.282 | 0.237 | 7.547 |
| 0.272 | 0.221 | 7.547 |
| 0.261 | 0.206 | 7.547 |
| 0.251 | 0.190 | 7.547 |
| 0.241 | 0.175 | 7.547 |
| 0.230 | 0.160 | 7.547 |
| 0.220 | 0.145 | 7.547 |
| 0.209 | 0.129 | 7.547 |
| 0.198 | 0.114 | 7.547 |
| 0.188 | 0.099 | 7.547 |
| 0.177 | 0.084 | 7.547 |
| 0.166 | 0.069 | 7.547 |
| 0.155 | 0.054 | 7.547 |
| 0.144 | 0.039 | 7.547 |
| 0.133 | 0.025 | 7.547 |
| 0.121 | 0.010 | 7.547 |
| 0.110 | −0.005 | 7.547 |
| 0.098 | −0.019 | 7.547 |
| 0.087 | −0.034 | 7.547 |
| 0.075 | −0.048 | 7.547 |
| 0.063 | −0.062 | 7.547 |
| 0.051 | −0.076 | 7.547 |
| 0.039 | −0.090 | 7.547 |
| 0.027 | −0.104 | 7.547 |
| 0.015 | −0.118 | 7.547 |
| 0.002 | −0.132 | 7.547 |
| −0.011 | −0.145 | 7.547 |
| −0.024 | −0.158 | 7.547 |
| −0.037 | −0.172 | 7.547 |
| −0.050 | −0.184 | 7.547 |
| −0.064 | −0.197 | 7.547 |
| −0.077 | −0.209 | 7.547 |
| −0.091 | −0.222 | 7.547 |
| −0.106 | −0.233 | 7.547 |
| −0.120 | −0.245 | 7.547 |
| −0.135 | −0.256 | 7.547 |
| −0.150 | −0.266 | 7.547 |
| −0.166 | −0.276 | 7.547 |
| −0.182 | −0.286 | 7.547 |
| −0.198 | −0.294 | 7.547 |
| −0.215 | −0.302 | 7.547 |
| −0.232 | −0.309 | 7.547 |
| −0.250 | −0.315 | 7.547 |
| −0.268 | −0.320 | 7.547 |
| −0.271 | −0.321 | 7.547 |

TABLE 2-continued

|  | X | Y | Z |
|---|---|---|---|
|  | −0.275 | −0.321 | 7.547 |
|  | −0.279 | −0.322 | 7.547 |
|  | −0.282 | −0.323 | 7.547 |
|  | −0.286 | −0.323 | 7.547 |
|  | −0.290 | −0.324 | 7.547 |
|  | −0.293 | −0.324 | 7.547 |
|  | −0.297 | −0.324 | 7.547 |
|  | −0.301 | −0.324 | 7.547 |
|  | −0.304 | −0.325 | 7.547 |
|  | −0.319 | −0.326 | 7.547 |
|  | −0.333 | −0.327 | 7.547 |
|  | −0.347 | −0.330 | 7.547 |
|  | −0.361 | −0.334 | 7.547 |
|  | −0.374 | −0.339 | 7.547 |
|  | −0.387 | −0.345 | 7.547 |
|  | −0.399 | −0.353 | 7.547 |
|  | −0.410 | −0.363 | 7.547 |
|  | −0.418 | −0.374 | 7.547 |
|  | −0.425 | −0.387 | 7.547 |
|  | −0.428 | −0.401 | 7.547 |
|  | −0.429 | −0.415 | 7.547 |
|  | −0.428 | −0.429 | 7.547 |
|  | −0.425 | −0.443 | 7.547 |
|  | −0.421 | −0.457 | 7.547 |
|  | −0.415 | −0.470 | 7.547 |
|  | −0.408 | −0.483 | 7.547 |
|  | −0.400 | −0.495 | 7.547 |
| SECTION 9 | −0.383 | −0.466 | 7.747 |
|  | −0.380 | −0.470 | 7.747 |
|  | −0.377 | −0.473 | 7.747 |
|  | −0.373 | −0.477 | 7.747 |
|  | −0.369 | −0.480 | 7.747 |
|  | −0.366 | −0.483 | 7.747 |
|  | −0.362 | −0.487 | 7.747 |
|  | −0.358 | −0.490 | 7.747 |
|  | −0.355 | −0.493 | 7.747 |
|  | −0.351 | −0.496 | 7.747 |
|  | −0.347 | −0.499 | 7.747 |
|  | −0.327 | −0.514 | 7.747 |
|  | −0.307 | −0.527 | 7.747 |
|  | −0.285 | −0.539 | 7.747 |
|  | −0.263 | −0.549 | 7.747 |
|  | −0.240 | −0.558 | 7.747 |
|  | −0.216 | −0.565 | 7.747 |
|  | −0.192 | −0.570 | 7.747 |
|  | −0.168 | −0.574 | 7.747 |
|  | −0.144 | −0.576 | 7.747 |
|  | −0.119 | −0.576 | 7.747 |
|  | −0.095 | −0.575 | 7.747 |
|  | −0.070 | −0.571 | 7.747 |
|  | −0.046 | −0.567 | 7.747 |
|  | −0.022 | −0.560 | 7.747 |
|  | 0.001 | −0.552 | 7.747 |
|  | 0.023 | −0.543 | 7.747 |
|  | 0.046 | −0.532 | 7.747 |
|  | 0.067 | −0.520 | 7.747 |
|  | 0.088 | −0.507 | 7.747 |
|  | 0.108 | −0.493 | 7.747 |
|  | 0.127 | −0.478 | 7.747 |
|  | 0.146 | −0.462 | 7.747 |
|  | 0.164 | −0.445 | 7.747 |
|  | 0.182 | −0.428 | 7.747 |
|  | 0.199 | −0.410 | 7.747 |
|  | 0.215 | −0.392 | 7.747 |
|  | 0.231 | −0.373 | 7.747 |
|  | 0.246 | −0.354 | 7.747 |
|  | 0.261 | −0.334 | 7.747 |
|  | 0.275 | −0.314 | 7.747 |
|  | 0.289 | −0.294 | 7.747 |
|  | 0.303 | −0.273 | 7.747 |
|  | 0.316 | −0.253 | 7.747 |
|  | 0.328 | −0.232 | 7.747 |
|  | 0.341 | −0.210 | 7.747 |
|  | 0.352 | −0.189 | 7.747 |
|  | 0.364 | −0.167 | 7.747 |
|  | 0.375 | −0.145 | 7.747 |
|  | 0.386 | −0.123 | 7.747 |
|  | 0.397 | −0.101 | 7.747 |

TABLE 2-continued

| X | Y | Z |
|---|---|---|
| 0.407 | −0.079 | 7.747 |
| 0.417 | −0.056 | 7.747 |
| 0.427 | −0.034 | 7.747 |
| 0.437 | −0.011 | 7.747 |
| 0.446 | 0.011 | 7.747 |
| 0.455 | 0.034 | 7.747 |
| 0.464 | 0.057 | 7.747 |
| 0.473 | 0.080 | 7.747 |
| 0.482 | 0.103 | 7.747 |
| 0.490 | 0.126 | 7.747 |
| 0.498 | 0.149 | 7.747 |
| 0.506 | 0.173 | 7.747 |
| 0.514 | 0.196 | 7.747 |
| 0.522 | 0.219 | 7.747 |
| 0.529 | 0.243 | 7.747 |
| 0.537 | 0.266 | 7.747 |
| 0.544 | 0.290 | 7.747 |
| 0.551 | 0.313 | 7.747 |
| 0.558 | 0.337 | 7.747 |
| 0.565 | 0.360 | 7.747 |
| 0.572 | 0.384 | 7.747 |
| 0.578 | 0.408 | 7.747 |
| 0.585 | 0.431 | 7.747 |
| 0.591 | 0.455 | 7.747 |
| 0.597 | 0.479 | 7.747 |
| 0.603 | 0.503 | 7.747 |
| 0.608 | 0.527 | 7.747 |
| 0.614 | 0.551 | 7.747 |
| 0.619 | 0.575 | 7.747 |
| 0.625 | 0.598 | 7.747 |
| 0.631 | 0.622 | 7.747 |
| 0.636 | 0.646 | 7.747 |
| 0.642 | 0.670 | 7.747 |
| 0.647 | 0.694 | 7.747 |
| 0.652 | 0.718 | 7.747 |
| 0.657 | 0.742 | 7.747 |
| 0.662 | 0.766 | 7.747 |
| 0.667 | 0.790 | 7.747 |
| 0.672 | 0.815 | 7.747 |
| 0.673 | 0.819 | 7.747 |
| 0.674 | 0.824 | 7.747 |
| 0.674 | 0.829 | 7.747 |
| 0.675 | 0.834 | 7.747 |
| 0.676 | 0.839 | 7.747 |
| 0.677 | 0.844 | 7.747 |
| 0.678 | 0.848 | 7.747 |
| 0.679 | 0.853 | 7.747 |
| 0.680 | 0.858 | 7.747 |
| 0.681 | 0.863 | 7.747 |
| 0.681 | 0.866 | 7.747 |
| 0.681 | 0.869 | 7.747 |
| 0.680 | 0.871 | 7.747 |
| 0.679 | 0.874 | 7.747 |
| 0.678 | 0.877 | 7.747 |
| 0.676 | 0.879 | 7.747 |
| 0.674 | 0.881 | 7.747 |
| 0.672 | 0.883 | 7.747 |
| 0.670 | 0.884 | 7.747 |
| 0.667 | 0.885 | 7.747 |
| 0.664 | 0.886 | 7.747 |
| 0.661 | 0.886 | 7.747 |
| 0.658 | 0.886 | 7.747 |
| 0.656 | 0.885 | 7.747 |
| 0.653 | 0.883 | 7.747 |
| 0.651 | 0.881 | 7.747 |
| 0.649 | 0.879 | 7.747 |
| 0.647 | 0.877 | 7.747 |
| 0.646 | 0.875 | 7.747 |
| 0.644 | 0.871 | 7.747 |
| 0.643 | 0.868 | 7.747 |
| 0.641 | 0.865 | 7.747 |
| 0.639 | 0.862 | 7.747 |
| 0.638 | 0.858 | 7.747 |
| 0.636 | 0.855 | 7.747 |
| 0.634 | 0.852 | 7.747 |
| 0.632 | 0.848 | 7.747 |
| 0.631 | 0.845 | 7.747 |
| 0.629 | 0.842 | 7.747 |

TABLE 2-continued

| X | Y | Z |
|---|---|---|
| 0.621 | 0.825 | 7.747 |
| 0.612 | 0.809 | 7.747 |
| 0.604 | 0.792 | 7.747 |
| 0.595 | 0.776 | 7.747 |
| 0.587 | 0.759 | 7.747 |
| 0.579 | 0.743 | 7.747 |
| 0.571 | 0.726 | 7.747 |
| 0.562 | 0.709 | 7.747 |
| 0.554 | 0.693 | 7.747 |
| 0.545 | 0.677 | 7.747 |
| 0.537 | 0.660 | 7.747 |
| 0.528 | 0.644 | 7.747 |
| 0.519 | 0.628 | 7.747 |
| 0.510 | 0.612 | 7.747 |
| 0.501 | 0.595 | 7.747 |
| 0.491 | 0.580 | 7.747 |
| 0.482 | 0.564 | 7.747 |
| 0.472 | 0.548 | 7.747 |
| 0.462 | 0.532 | 7.747 |
| 0.453 | 0.516 | 7.747 |
| 0.443 | 0.500 | 7.747 |
| 0.434 | 0.484 | 7.747 |
| 0.425 | 0.468 | 7.747 |
| 0.415 | 0.452 | 7.747 |
| 0.405 | 0.437 | 7.747 |
| 0.396 | 0.421 | 7.747 |
| 0.386 | 0.405 | 7.747 |
| 0.376 | 0.389 | 7.747 |
| 0.367 | 0.374 | 7.747 |
| 0.357 | 0.358 | 7.747 |
| 0.347 | 0.342 | 7.747 |
| 0.337 | 0.327 | 7.747 |
| 0.327 | 0.311 | 7.747 |
| 0.317 | 0.296 | 7.747 |
| 0.306 | 0.280 | 7.747 |
| 0.296 | 0.265 | 7.747 |
| 0.286 | 0.249 | 7.747 |
| 0.275 | 0.234 | 7.747 |
| 0.265 | 0.219 | 7.747 |
| 0.254 | 0.204 | 7.747 |
| 0.244 | 0.188 | 7.747 |
| 0.233 | 0.173 | 7.747 |
| 0.222 | 0.158 | 7.747 |
| 0.211 | 0.143 | 7.747 |
| 0.200 | 0.129 | 7.747 |
| 0.189 | 0.114 | 7.747 |
| 0.178 | 0.099 | 7.747 |
| 0.166 | 0.084 | 7.747 |
| 0.155 | 0.070 | 7.747 |
| 0.143 | 0.055 | 7.747 |
| 0.132 | 0.041 | 7.747 |
| 0.120 | 0.027 | 7.747 |
| 0.108 | 0.013 | 7.747 |
| 0.096 | −0.001 | 7.747 |
| 0.083 | −0.015 | 7.747 |
| 0.071 | −0.029 | 7.747 |
| 0.058 | −0.042 | 7.747 |
| 0.046 | −0.056 | 7.747 |
| 0.033 | −0.069 | 7.747 |
| 0.020 | −0.082 | 7.747 |
| 0.006 | −0.095 | 7.747 |
| −0.007 | −0.108 | 7.747 |
| −0.021 | −0.120 | 7.747 |
| −0.035 | −0.133 | 7.747 |
| −0.049 | −0.145 | 7.747 |
| −0.063 | −0.156 | 7.747 |
| −0.078 | −0.168 | 7.747 |
| −0.092 | −0.179 | 7.747 |
| −0.107 | −0.190 | 7.747 |
| −0.123 | −0.200 | 7.747 |
| −0.138 | −0.211 | 7.747 |
| −0.154 | −0.220 | 7.747 |
| −0.170 | −0.229 | 7.747 |
| −0.186 | −0.238 | 7.747 |
| −0.203 | −0.246 | 7.747 |
| −0.220 | −0.253 | 7.747 |
| −0.237 | −0.260 | 7.747 |
| −0.255 | −0.266 | 7.747 |

TABLE 2-continued

| Section | X | Y | Z |
|---|---|---|---|
| | −0.273 | −0.271 | 7.747 |
| | −0.276 | −0.272 | 7.747 |
| | −0.280 | −0.273 | 7.747 |
| | −0.284 | −0.274 | 7.747 |
| | −0.287 | −0.274 | 7.747 |
| | −0.291 | −0.275 | 7.747 |
| | −0.294 | −0.276 | 7.747 |
| | −0.298 | −0.276 | 7.747 |
| | −0.302 | −0.277 | 7.747 |
| | −0.305 | −0.278 | 7.747 |
| | −0.309 | −0.278 | 7.747 |
| | −0.323 | −0.280 | 7.747 |
| | −0.337 | −0.284 | 7.747 |
| | −0.351 | −0.288 | 7.747 |
| | −0.365 | −0.293 | 7.747 |
| | −0.378 | −0.299 | 7.747 |
| | −0.390 | −0.306 | 7.747 |
| | −0.402 | −0.315 | 7.747 |
| | −0.412 | −0.325 | 7.747 |
| | −0.420 | −0.337 | 7.747 |
| | −0.426 | −0.350 | 7.747 |
| | −0.429 | −0.364 | 7.747 |
| | −0.429 | −0.379 | 7.747 |
| | −0.427 | −0.393 | 7.747 |
| | −0.423 | −0.407 | 7.747 |
| | −0.417 | −0.420 | 7.747 |
| | −0.410 | −0.432 | 7.747 |
| | −0.402 | −0.444 | 7.747 |
| | −0.393 | −0.456 | 7.747 |
| SECTION 10 | −0.368 | −0.425 | 7.942 |
| | −0.364 | −0.428 | 7.942 |
| | −0.360 | −0.430 | 7.942 |
| | −0.356 | −0.433 | 7.942 |
| | −0.352 | −0.436 | 7.942 |
| | −0.348 | −0.439 | 7.942 |
| | −0.344 | −0.441 | 7.942 |
| | −0.340 | −0.444 | 7.942 |
| | −0.336 | −0.447 | 7.942 |
| | −0.332 | −0.449 | 7.942 |
| | −0.327 | −0.452 | 7.942 |
| | −0.306 | −0.464 | 7.942 |
| | −0.284 | −0.475 | 7.942 |
| | −0.262 | −0.485 | 7.942 |
| | −0.239 | −0.493 | 7.942 |
| | −0.216 | −0.501 | 7.942 |
| | −0.192 | −0.507 | 7.942 |
| | −0.168 | −0.512 | 7.942 |
| | −0.144 | −0.515 | 7.942 |
| | −0.120 | −0.518 | 7.942 |
| | −0.096 | −0.519 | 7.942 |
| | −0.071 | −0.518 | 7.942 |
| | −0.047 | −0.516 | 7.942 |
| | −0.023 | −0.513 | 7.942 |
| | 0.001 | −0.508 | 7.942 |
| | 0.025 | −0.502 | 7.942 |
| | 0.048 | −0.494 | 7.942 |
| | 0.071 | −0.486 | 7.942 |
| | 0.093 | −0.475 | 7.942 |
| | 0.115 | −0.464 | 7.942 |
| | 0.136 | −0.452 | 7.942 |
| | 0.156 | −0.438 | 7.942 |
| | 0.176 | −0.424 | 7.942 |
| | 0.195 | −0.408 | 7.942 |
| | 0.213 | −0.392 | 7.942 |
| | 0.231 | −0.375 | 7.942 |
| | 0.248 | −0.358 | 7.942 |
| | 0.264 | −0.340 | 7.942 |
| | 0.280 | −0.321 | 7.942 |
| | 0.295 | −0.302 | 7.942 |
| | 0.310 | −0.282 | 7.942 |
| | 0.324 | −0.263 | 7.942 |
| | 0.337 | −0.242 | 7.942 |
| | 0.350 | −0.222 | 7.942 |
| | 0.363 | −0.201 | 7.942 |
| | 0.375 | −0.180 | 7.942 |
| | 0.387 | −0.158 | 7.942 |
| | 0.398 | −0.137 | 7.942 |
| | 0.410 | −0.115 | 7.942 |

TABLE 2-continued

| X | Y | Z |
|---|---|---|
| 0.420 | −0.093 | 7.942 |
| 0.431 | −0.071 | 7.942 |
| 0.441 | −0.049 | 7.942 |
| 0.451 | −0.027 | 7.942 |
| 0.460 | −0.004 | 7.942 |
| 0.470 | 0.019 | 7.942 |
| 0.479 | 0.041 | 7.942 |
| 0.487 | 0.064 | 7.942 |
| 0.496 | 0.087 | 7.942 |
| 0.504 | 0.110 | 7.942 |
| 0.512 | 0.133 | 7.942 |
| 0.520 | 0.156 | 7.942 |
| 0.528 | 0.179 | 7.942 |
| 0.535 | 0.202 | 7.942 |
| 0.542 | 0.226 | 7.942 |
| 0.549 | 0.249 | 7.942 |
| 0.556 | 0.273 | 7.942 |
| 0.563 | 0.296 | 7.942 |
| 0.569 | 0.320 | 7.942 |
| 0.575 | 0.343 | 7.942 |
| 0.582 | 0.367 | 7.942 |
| 0.588 | 0.390 | 7.942 |
| 0.593 | 0.414 | 7.942 |
| 0.599 | 0.438 | 7.942 |
| 0.605 | 0.462 | 7.942 |
| 0.610 | 0.486 | 7.942 |
| 0.615 | 0.509 | 7.942 |
| 0.620 | 0.533 | 7.942 |
| 0.624 | 0.557 | 7.942 |
| 0.629 | 0.581 | 7.942 |
| 0.633 | 0.605 | 7.942 |
| 0.638 | 0.629 | 7.942 |
| 0.642 | 0.653 | 7.942 |
| 0.646 | 0.677 | 7.942 |
| 0.651 | 0.701 | 7.942 |
| 0.655 | 0.725 | 7.942 |
| 0.659 | 0.750 | 7.942 |
| 0.663 | 0.774 | 7.942 |
| 0.666 | 0.798 | 7.942 |
| 0.670 | 0.822 | 7.942 |
| 0.673 | 0.846 | 7.942 |
| 0.674 | 0.851 | 7.942 |
| 0.674 | 0.856 | 7.942 |
| 0.675 | 0.861 | 7.942 |
| 0.675 | 0.866 | 7.942 |
| 0.676 | 0.870 | 7.942 |
| 0.677 | 0.875 | 7.942 |
| 0.677 | 0.880 | 7.942 |
| 0.678 | 0.885 | 7.942 |
| 0.678 | 0.890 | 7.942 |
| 0.679 | 0.895 | 7.942 |
| 0.679 | 0.897 | 7.942 |
| 0.679 | 0.900 | 7.942 |
| 0.678 | 0.903 | 7.942 |
| 0.677 | 0.906 | 7.942 |
| 0.675 | 0.908 | 7.942 |
| 0.674 | 0.910 | 7.942 |
| 0.672 | 0.912 | 7.942 |
| 0.669 | 0.914 | 7.942 |
| 0.667 | 0.915 | 7.942 |
| 0.664 | 0.916 | 7.942 |
| 0.661 | 0.917 | 7.942 |
| 0.658 | 0.916 | 7.942 |
| 0.656 | 0.916 | 7.942 |
| 0.653 | 0.915 | 7.942 |
| 0.650 | 0.913 | 7.942 |
| 0.648 | 0.911 | 7.942 |
| 0.646 | 0.909 | 7.942 |
| 0.645 | 0.907 | 7.942 |
| 0.644 | 0.904 | 7.942 |
| 0.642 | 0.901 | 7.942 |
| 0.641 | 0.898 | 7.942 |
| 0.639 | 0.894 | 7.942 |
| 0.638 | 0.891 | 7.942 |
| 0.636 | 0.887 | 7.942 |
| 0.635 | 0.884 | 7.942 |
| 0.633 | 0.881 | 7.942 |
| 0.632 | 0.877 | 7.942 |
| 0.630 | 0.874 | 7.942 |
| 0.629 | 0.870 | 7.942 |
| 0.621 | 0.854 | 7.942 |
| 0.614 | 0.837 | 7.942 |
| 0.606 | 0.820 | 7.942 |
| 0.599 | 0.803 | 7.942 |
| 0.591 | 0.786 | 7.942 |
| 0.584 | 0.769 | 7.942 |
| 0.577 | 0.752 | 7.942 |
| 0.569 | 0.735 | 7.942 |
| 0.561 | 0.718 | 7.942 |
| 0.553 | 0.701 | 7.942 |
| 0.545 | 0.685 | 7.942 |
| 0.537 | 0.668 | 7.942 |
| 0.529 | 0.652 | 7.942 |
| 0.521 | 0.635 | 7.942 |
| 0.512 | 0.619 | 7.942 |
| 0.503 | 0.603 | 7.942 |
| 0.494 | 0.586 | 7.942 |
| 0.485 | 0.570 | 7.942 |
| 0.476 | 0.554 | 7.942 |
| 0.467 | 0.538 | 7.942 |
| 0.458 | 0.522 | 7.942 |
| 0.449 | 0.506 | 7.942 |
| 0.439 | 0.490 | 7.942 |
| 0.430 | 0.474 | 7.942 |
| 0.421 | 0.458 | 7.942 |
| 0.412 | 0.442 | 7.942 |
| 0.402 | 0.426 | 7.942 |
| 0.393 | 0.410 | 7.942 |
| 0.383 | 0.394 | 7.942 |
| 0.373 | 0.378 | 7.942 |
| 0.363 | 0.363 | 7.942 |
| 0.353 | 0.347 | 7.942 |
| 0.343 | 0.332 | 7.942 |
| 0.333 | 0.316 | 7.942 |
| 0.323 | 0.301 | 7.942 |
| 0.313 | 0.285 | 7.942 |
| 0.302 | 0.270 | 7.942 |
| 0.292 | 0.255 | 7.942 |
| 0.281 | 0.240 | 7.942 |
| 0.270 | 0.225 | 7.942 |
| 0.259 | 0.210 | 7.942 |
| 0.248 | 0.195 | 7.942 |
| 0.237 | 0.181 | 7.942 |
| 0.225 | 0.166 | 7.942 |
| 0.214 | 0.151 | 7.942 |
| 0.202 | 0.137 | 7.942 |
| 0.190 | 0.123 | 7.942 |
| 0.178 | 0.109 | 7.942 |
| 0.166 | 0.095 | 7.942 |
| 0.154 | 0.081 | 7.942 |
| 0.142 | 0.067 | 7.942 |
| 0.129 | 0.054 | 7.942 |
| 0.116 | 0.040 | 7.942 |
| 0.103 | 0.027 | 7.942 |
| 0.090 | 0.014 | 7.942 |
| 0.077 | 0.001 | 7.942 |
| 0.063 | −0.011 | 7.942 |
| 0.049 | −0.024 | 7.942 |
| 0.035 | −0.036 | 7.942 |
| 0.021 | −0.048 | 7.942 |
| 0.007 | −0.059 | 7.942 |
| −0.008 | −0.071 | 7.942 |
| −0.023 | −0.082 | 7.942 |
| −0.038 | −0.092 | 7.942 |
| −0.053 | −0.103 | 7.942 |
| −0.068 | −0.113 | 7.942 |
| −0.084 | −0.123 | 7.942 |
| −0.100 | −0.132 | 7.942 |
| −0.116 | −0.141 | 7.942 |
| −0.133 | −0.150 | 7.942 |
| −0.149 | −0.158 | 7.942 |
| −0.166 | −0.166 | 7.942 |
| −0.183 | −0.173 | 7.942 |
| −0.200 | −0.180 | 7.942 |
| −0.217 | −0.187 | 7.942 |
| −0.235 | −0.194 | 7.942 |

TABLE 2-continued

| | X | Y | Z |
|---|---|---|---|
| | −0.252 | −0.200 | 7.942 |
| | −0.270 | −0.205 | 7.942 |
| | −0.287 | −0.211 | 7.942 |
| | −0.291 | −0.212 | 7.942 |
| | −0.294 | −0.213 | 7.942 |
| | −0.298 | −0.214 | 7.942 |
| | −0.301 | −0.215 | 7.942 |
| | −0.305 | −0.216 | 7.942 |
| | −0.308 | −0.217 | 7.942 |
| | −0.312 | −0.219 | 7.942 |
| | −0.316 | −0.220 | 7.942 |
| | −0.319 | −0.221 | 7.942 |
| | −0.323 | −0.222 | 7.942 |
| | −0.337 | −0.226 | 7.942 |
| | −0.351 | −0.232 | 7.942 |
| | −0.364 | −0.238 | 7.942 |
| | −0.377 | −0.245 | 7.942 |
| | −0.389 | −0.254 | 7.942 |
| | −0.401 | −0.263 | 7.942 |
| | −0.411 | −0.274 | 7.942 |
| | −0.420 | −0.286 | 7.942 |
| | −0.426 | −0.299 | 7.942 |
| | −0.430 | −0.314 | 7.942 |
| | −0.431 | −0.329 | 7.942 |
| | −0.429 | −0.343 | 7.942 |
| | −0.425 | −0.358 | 7.942 |
| | −0.419 | −0.371 | 7.942 |
| | −0.411 | −0.383 | 7.942 |
| | −0.401 | −0.395 | 7.942 |
| | −0.391 | −0.406 | 7.942 |
| | −0.380 | −0.416 | 7.942 |
| SECTION 11 | −0.348 | −0.369 | 8.192 |
| | −0.343 | −0.371 | 8.192 |
| | −0.339 | −0.373 | 8.192 |
| | −0.334 | −0.375 | 8.192 |
| | −0.330 | −0.377 | 8.192 |
| | −0.325 | −0.379 | 8.192 |
| | −0.321 | −0.381 | 8.192 |
| | −0.316 | −0.383 | 8.192 |
| | −0.312 | −0.384 | 8.192 |
| | −0.307 | −0.386 | 8.192 |
| | −0.303 | −0.388 | 8.192 |
| | −0.280 | −0.396 | 8.192 |
| | −0.257 | −0.404 | 8.192 |
| | −0.233 | −0.410 | 8.192 |
| | −0.210 | −0.417 | 8.192 |
| | −0.186 | −0.422 | 8.192 |
| | −0.163 | −0.427 | 8.192 |
| | −0.139 | −0.431 | 8.192 |
| | −0.115 | −0.435 | 8.192 |
| | −0.090 | −0.437 | 8.192 |
| | −0.066 | −0.439 | 8.192 |
| | −0.042 | −0.440 | 8.192 |
| | −0.018 | −0.440 | 8.192 |
| | 0.007 | −0.439 | 8.192 |
| | 0.031 | −0.437 | 8.192 |
| | 0.055 | −0.433 | 8.192 |
| | 0.079 | −0.428 | 8.192 |
| | 0.102 | −0.422 | 8.192 |
| | 0.126 | −0.415 | 8.192 |
| | 0.148 | −0.407 | 8.192 |
| | 0.171 | −0.397 | 8.192 |
| | 0.192 | −0.386 | 8.192 |
| | 0.213 | −0.374 | 8.192 |
| | 0.234 | −0.360 | 8.192 |
| | 0.253 | −0.346 | 8.192 |
| | 0.272 | −0.331 | 8.192 |
| | 0.291 | −0.315 | 8.192 |
| | 0.308 | −0.298 | 8.192 |
| | 0.325 | −0.280 | 8.192 |
| | 0.341 | −0.262 | 8.192 |
| | 0.356 | −0.243 | 8.192 |
| | 0.371 | −0.224 | 8.192 |
| | 0.385 | −0.204 | 8.192 |
| | 0.399 | −0.184 | 8.192 |
| | 0.412 | −0.163 | 8.192 |
| | 0.424 | −0.143 | 8.192 |
| | 0.436 | −0.121 | 8.192 |

TABLE 2-continued

| X | Y | Z |
|---|---|---|
| 0.448 | −0.100 | 8.192 |
| 0.459 | −0.078 | 8.192 |
| 0.469 | −0.057 | 8.192 |
| 0.480 | −0.035 | 8.192 |
| 0.490 | −0.012 | 8.192 |
| 0.499 | 0.010 | 8.192 |
| 0.508 | 0.032 | 8.192 |
| 0.517 | 0.055 | 8.192 |
| 0.526 | 0.078 | 8.192 |
| 0.534 | 0.101 | 8.192 |
| 0.542 | 0.124 | 8.192 |
| 0.549 | 0.147 | 8.192 |
| 0.556 | 0.170 | 8.192 |
| 0.563 | 0.193 | 8.192 |
| 0.570 | 0.217 | 8.192 |
| 0.576 | 0.240 | 8.192 |
| 0.583 | 0.264 | 8.192 |
| 0.589 | 0.287 | 8.192 |
| 0.594 | 0.311 | 8.192 |
| 0.600 | 0.335 | 8.192 |
| 0.605 | 0.358 | 8.192 |
| 0.610 | 0.382 | 8.192 |
| 0.615 | 0.406 | 8.192 |
| 0.620 | 0.430 | 8.192 |
| 0.624 | 0.454 | 8.192 |
| 0.628 | 0.478 | 8.192 |
| 0.632 | 0.502 | 8.192 |
| 0.636 | 0.526 | 8.192 |
| 0.639 | 0.550 | 8.192 |
| 0.643 | 0.574 | 8.192 |
| 0.646 | 0.598 | 8.192 |
| 0.649 | 0.622 | 8.192 |
| 0.651 | 0.646 | 8.192 |
| 0.654 | 0.670 | 8.192 |
| 0.657 | 0.695 | 8.192 |
| 0.660 | 0.719 | 8.192 |
| 0.662 | 0.743 | 8.192 |
| 0.664 | 0.767 | 8.192 |
| 0.666 | 0.791 | 8.192 |
| 0.668 | 0.816 | 8.192 |
| 0.670 | 0.840 | 8.192 |
| 0.672 | 0.864 | 8.192 |
| 0.673 | 0.888 | 8.192 |
| 0.673 | 0.893 | 8.192 |
| 0.673 | 0.898 | 8.192 |
| 0.673 | 0.903 | 8.192 |
| 0.674 | 0.908 | 8.192 |
| 0.674 | 0.913 | 8.192 |
| 0.674 | 0.917 | 8.192 |
| 0.674 | 0.922 | 8.192 |
| 0.674 | 0.927 | 8.192 |
| 0.675 | 0.932 | 8.192 |
| 0.675 | 0.937 | 8.192 |
| 0.675 | 0.940 | 8.192 |
| 0.674 | 0.943 | 8.192 |
| 0.673 | 0.945 | 8.192 |
| 0.672 | 0.948 | 8.192 |
| 0.670 | 0.950 | 8.192 |
| 0.668 | 0.952 | 8.192 |
| 0.666 | 0.954 | 8.192 |
| 0.664 | 0.956 | 8.192 |
| 0.661 | 0.957 | 8.192 |
| 0.658 | 0.958 | 8.192 |
| 0.655 | 0.958 | 8.192 |
| 0.652 | 0.957 | 8.192 |
| 0.650 | 0.956 | 8.192 |
| 0.647 | 0.955 | 8.192 |
| 0.645 | 0.953 | 8.192 |
| 0.643 | 0.951 | 8.192 |
| 0.641 | 0.949 | 8.192 |
| 0.640 | 0.946 | 8.192 |
| 0.638 | 0.944 | 8.192 |
| 0.637 | 0.940 | 8.192 |
| 0.636 | 0.937 | 8.192 |
| 0.635 | 0.933 | 8.192 |
| 0.634 | 0.930 | 8.192 |
| 0.633 | 0.926 | 8.192 |
| 0.631 | 0.923 | 8.192 |

TABLE 2-continued

| X | Y | Z |
|---|---|---|
| 0.630 | 0.919 | 8.192 |
| 0.629 | 0.916 | 8.192 |
| 0.628 | 0.912 | 8.192 |
| 0.627 | 0.909 | 8.192 |
| 0.620 | 0.891 | 8.192 |
| 0.614 | 0.874 | 8.192 |
| 0.608 | 0.856 | 8.192 |
| 0.602 | 0.839 | 8.192 |
| 0.596 | 0.821 | 8.192 |
| 0.590 | 0.803 | 8.192 |
| 0.584 | 0.786 | 8.192 |
| 0.577 | 0.769 | 8.192 |
| 0.570 | 0.751 | 8.192 |
| 0.564 | 0.734 | 8.192 |
| 0.557 | 0.717 | 8.192 |
| 0.549 | 0.700 | 8.192 |
| 0.542 | 0.682 | 8.192 |
| 0.534 | 0.666 | 8.192 |
| 0.527 | 0.649 | 8.192 |
| 0.519 | 0.632 | 8.192 |
| 0.510 | 0.615 | 8.192 |
| 0.502 | 0.599 | 8.192 |
| 0.494 | 0.582 | 8.192 |
| 0.485 | 0.566 | 8.192 |
| 0.477 | 0.549 | 8.192 |
| 0.468 | 0.533 | 8.192 |
| 0.459 | 0.516 | 8.192 |
| 0.451 | 0.500 | 8.192 |
| 0.442 | 0.483 | 8.192 |
| 0.433 | 0.467 | 8.192 |
| 0.424 | 0.451 | 8.192 |
| 0.414 | 0.435 | 8.192 |
| 0.405 | 0.419 | 8.192 |
| 0.395 | 0.403 | 8.192 |
| 0.386 | 0.387 | 8.192 |
| 0.376 | 0.372 | 8.192 |
| 0.366 | 0.356 | 8.192 |
| 0.355 | 0.341 | 8.192 |
| 0.345 | 0.325 | 8.192 |
| 0.334 | 0.310 | 8.192 |
| 0.324 | 0.295 | 8.192 |
| 0.313 | 0.280 | 8.192 |
| 0.301 | 0.265 | 8.192 |
| 0.290 | 0.250 | 8.192 |
| 0.279 | 0.236 | 8.192 |
| 0.267 | 0.221 | 8.192 |
| 0.255 | 0.207 | 8.192 |
| 0.243 | 0.193 | 8.192 |
| 0.231 | 0.179 | 8.192 |
| 0.218 | 0.165 | 8.192 |
| 0.205 | 0.152 | 8.192 |
| 0.193 | 0.138 | 8.192 |
| 0.179 | 0.125 | 8.192 |
| 0.166 | 0.112 | 8.192 |
| 0.152 | 0.100 | 8.192 |
| 0.139 | 0.087 | 8.192 |
| 0.125 | 0.075 | 8.192 |
| 0.110 | 0.063 | 8.192 |
| 0.096 | 0.052 | 8.192 |
| 0.081 | 0.040 | 8.192 |
| 0.066 | 0.029 | 8.192 |
| 0.051 | 0.019 | 8.192 |
| 0.035 | 0.008 | 8.192 |
| 0.020 | −0.002 | 8.192 |
| 0.004 | −0.011 | 8.192 |
| −0.012 | −0.021 | 8.192 |
| −0.029 | −0.029 | 8.192 |
| −0.045 | −0.038 | 8.192 |
| −0.062 | −0.046 | 8.192 |
| −0.079 | −0.054 | 8.192 |
| −0.096 | −0.061 | 8.192 |
| −0.113 | −0.068 | 8.192 |
| −0.130 | −0.074 | 8.192 |
| −0.148 | −0.080 | 8.192 |
| −0.166 | −0.086 | 8.192 |
| −0.183 | −0.091 | 8.192 |
| −0.201 | −0.097 | 8.192 |
| −0.219 | −0.102 | 8.192 |

TABLE 2-continued

|  | X | Y | Z |
|---|---|---|---|
| | −0.237 | −0.107 | 8.192 |
| | −0.255 | −0.112 | 8.192 |
| | −0.273 | −0.117 | 8.192 |
| | −0.290 | −0.123 | 8.192 |
| | −0.308 | −0.130 | 8.192 |
| | −0.311 | −0.131 | 8.192 |
| | −0.315 | −0.133 | 8.192 |
| | −0.318 | −0.134 | 8.192 |
| | −0.321 | −0.136 | 8.192 |
| | −0.325 | −0.137 | 8.192 |
| | −0.328 | −0.139 | 8.192 |
| | −0.331 | −0.140 | 8.192 |
| | −0.335 | −0.142 | 8.192 |
| | −0.338 | −0.144 | 8.192 |
| | −0.341 | −0.146 | 8.192 |
| | −0.355 | −0.154 | 8.192 |
| | −0.369 | −0.162 | 8.192 |
| | −0.382 | −0.172 | 8.192 |
| | −0.394 | −0.182 | 8.192 |
| | −0.405 | −0.194 | 8.192 |
| | −0.416 | −0.206 | 8.192 |
| | −0.424 | −0.220 | 8.192 |
| | −0.431 | −0.234 | 8.192 |
| | −0.436 | −0.250 | 8.192 |
| | −0.438 | −0.266 | 8.192 |
| | −0.436 | −0.281 | 8.192 |
| | −0.431 | −0.297 | 8.192 |
| | −0.423 | −0.311 | 8.192 |
| | −0.413 | −0.324 | 8.192 |
| | −0.402 | −0.335 | 8.192 |
| | −0.390 | −0.345 | 8.192 |
| | −0.376 | −0.354 | 8.192 |
| | −0.362 | −0.362 | 8.192 |
| SECTION 12 | −0.330 | −0.322 | 8.397 |
| | −0.325 | −0.323 | 8.397 |
| | −0.321 | −0.324 | 8.397 |
| | −0.316 | −0.325 | 8.397 |
| | −0.311 | −0.327 | 8.397 |
| | −0.307 | −0.328 | 8.397 |
| | −0.302 | −0.329 | 8.397 |
| | −0.297 | −0.330 | 8.397 |
| | −0.292 | −0.331 | 8.397 |
| | −0.288 | −0.332 | 8.397 |
| | −0.283 | −0.333 | 8.397 |
| | −0.259 | −0.338 | 8.397 |
| | −0.235 | −0.343 | 8.397 |
| | −0.211 | −0.347 | 8.397 |
| | −0.187 | −0.351 | 8.397 |
| | −0.163 | −0.354 | 8.397 |
| | −0.139 | −0.358 | 8.397 |
| | −0.115 | −0.361 | 8.397 |
| | −0.091 | −0.365 | 8.397 |
| | −0.067 | −0.367 | 8.397 |
| | −0.042 | −0.370 | 8.397 |
| | −0.018 | −0.372 | 8.397 |
| | 0.006 | −0.373 | 8.397 |
| | 0.031 | −0.374 | 8.397 |
| | 0.055 | −0.374 | 8.397 |
| | 0.079 | −0.373 | 8.397 |
| | 0.103 | −0.370 | 8.397 |
| | 0.127 | −0.367 | 8.397 |
| | 0.151 | −0.363 | 8.397 |
| | 0.175 | −0.357 | 8.397 |
| | 0.198 | −0.350 | 8.397 |
| | 0.221 | −0.341 | 8.397 |
| | 0.243 | −0.331 | 8.397 |
| | 0.265 | −0.320 | 8.397 |
| | 0.286 | −0.308 | 8.397 |
| | 0.306 | −0.295 | 8.397 |
| | 0.326 | −0.280 | 8.397 |
| | 0.345 | −0.265 | 8.397 |
| | 0.362 | −0.248 | 8.397 |
| | 0.380 | −0.231 | 8.397 |
| | 0.396 | −0.213 | 8.397 |
| | 0.411 | −0.194 | 8.397 |
| | 0.426 | −0.175 | 8.397 |
| | 0.440 | −0.155 | 8.397 |
| | 0.454 | −0.135 | 8.397 |

TABLE 2-continued

| X | Y | Z |
|---|---|---|
| 0.467 | −0.114 | 8.397 |
| 0.479 | −0.093 | 8.397 |
| 0.490 | −0.071 | 8.397 |
| 0.502 | −0.050 | 8.397 |
| 0.512 | −0.028 | 8.397 |
| 0.523 | −0.006 | 8.397 |
| 0.532 | 0.016 | 8.397 |
| 0.542 | 0.039 | 8.397 |
| 0.551 | 0.061 | 8.397 |
| 0.559 | 0.084 | 8.397 |
| 0.567 | 0.107 | 8.397 |
| 0.575 | 0.130 | 8.397 |
| 0.582 | 0.154 | 8.397 |
| 0.589 | 0.177 | 8.397 |
| 0.595 | 0.200 | 8.397 |
| 0.602 | 0.224 | 8.397 |
| 0.607 | 0.247 | 8.397 |
| 0.613 | 0.271 | 8.397 |
| 0.618 | 0.295 | 8.397 |
| 0.623 | 0.319 | 8.397 |
| 0.628 | 0.343 | 8.397 |
| 0.632 | 0.367 | 8.397 |
| 0.636 | 0.391 | 8.397 |
| 0.640 | 0.415 | 8.397 |
| 0.644 | 0.439 | 8.397 |
| 0.647 | 0.463 | 8.397 |
| 0.650 | 0.487 | 8.397 |
| 0.653 | 0.511 | 8.397 |
| 0.656 | 0.535 | 8.397 |
| 0.658 | 0.559 | 8.397 |
| 0.660 | 0.584 | 8.397 |
| 0.662 | 0.608 | 8.397 |
| 0.663 | 0.632 | 8.397 |
| 0.665 | 0.657 | 8.397 |
| 0.666 | 0.681 | 8.397 |
| 0.667 | 0.705 | 8.397 |
| 0.669 | 0.729 | 8.397 |
| 0.670 | 0.754 | 8.397 |
| 0.670 | 0.778 | 8.397 |
| 0.671 | 0.802 | 8.397 |
| 0.672 | 0.827 | 8.397 |
| 0.672 | 0.851 | 8.397 |
| 0.672 | 0.875 | 8.397 |
| 0.671 | 0.900 | 8.397 |
| 0.671 | 0.924 | 8.397 |
| 0.671 | 0.929 | 8.397 |
| 0.671 | 0.934 | 8.397 |
| 0.671 | 0.939 | 8.397 |
| 0.670 | 0.943 | 8.397 |
| 0.670 | 0.948 | 8.397 |
| 0.670 | 0.953 | 8.397 |
| 0.670 | 0.958 | 8.397 |
| 0.670 | 0.963 | 8.397 |
| 0.669 | 0.968 | 8.397 |
| 0.669 | 0.973 | 8.397 |
| 0.669 | 0.976 | 8.397 |
| 0.668 | 0.978 | 8.397 |
| 0.667 | 0.981 | 8.397 |
| 0.666 | 0.984 | 8.397 |
| 0.664 | 0.986 | 8.397 |
| 0.662 | 0.988 | 8.397 |
| 0.659 | 0.990 | 8.397 |
| 0.657 | 0.991 | 8.397 |
| 0.654 | 0.992 | 8.397 |
| 0.651 | 0.992 | 8.397 |
| 0.648 | 0.992 | 8.397 |
| 0.645 | 0.991 | 8.397 |
| 0.643 | 0.990 | 8.397 |
| 0.640 | 0.989 | 8.397 |
| 0.638 | 0.987 | 8.397 |
| 0.636 | 0.985 | 8.397 |
| 0.635 | 0.982 | 8.397 |
| 0.633 | 0.980 | 8.397 |
| 0.632 | 0.977 | 8.397 |
| 0.632 | 0.973 | 8.397 |
| 0.631 | 0.970 | 8.397 |
| 0.630 | 0.966 | 8.397 |
| 0.629 | 0.962 | 8.397 |
| 0.628 | 0.959 | 8.397 |
| 0.627 | 0.955 | 8.397 |
| 0.626 | 0.952 | 8.397 |
| 0.625 | 0.948 | 8.397 |
| 0.624 | 0.944 | 8.397 |
| 0.623 | 0.941 | 8.397 |
| 0.618 | 0.923 | 8.397 |
| 0.613 | 0.905 | 8.397 |
| 0.608 | 0.887 | 8.397 |
| 0.603 | 0.869 | 8.397 |
| 0.598 | 0.850 | 8.397 |
| 0.593 | 0.832 | 8.397 |
| 0.588 | 0.814 | 8.397 |
| 0.582 | 0.797 | 8.397 |
| 0.577 | 0.779 | 8.397 |
| 0.571 | 0.761 | 8.397 |
| 0.565 | 0.743 | 8.397 |
| 0.559 | 0.726 | 8.397 |
| 0.552 | 0.708 | 8.397 |
| 0.545 | 0.691 | 8.397 |
| 0.538 | 0.673 | 8.397 |
| 0.531 | 0.656 | 8.397 |
| 0.523 | 0.639 | 8.397 |
| 0.516 | 0.622 | 8.397 |
| 0.508 | 0.605 | 8.397 |
| 0.500 | 0.588 | 8.397 |
| 0.492 | 0.571 | 8.397 |
| 0.484 | 0.554 | 8.397 |
| 0.476 | 0.537 | 8.397 |
| 0.467 | 0.520 | 8.397 |
| 0.459 | 0.504 | 8.397 |
| 0.450 | 0.487 | 8.397 |
| 0.441 | 0.471 | 8.397 |
| 0.432 | 0.454 | 8.397 |
| 0.422 | 0.438 | 8.397 |
| 0.413 | 0.422 | 8.397 |
| 0.403 | 0.406 | 8.397 |
| 0.393 | 0.390 | 8.397 |
| 0.383 | 0.375 | 8.397 |
| 0.373 | 0.359 | 8.397 |
| 0.362 | 0.344 | 8.397 |
| 0.351 | 0.328 | 8.397 |
| 0.340 | 0.313 | 8.397 |
| 0.328 | 0.299 | 8.397 |
| 0.317 | 0.284 | 8.397 |
| 0.305 | 0.269 | 8.397 |
| 0.293 | 0.255 | 8.397 |
| 0.281 | 0.241 | 8.397 |
| 0.268 | 0.227 | 8.397 |
| 0.255 | 0.214 | 8.397 |
| 0.242 | 0.200 | 8.397 |
| 0.229 | 0.187 | 8.397 |
| 0.215 | 0.174 | 8.397 |
| 0.201 | 0.162 | 8.387 |
| 0.187 | 0.150 | 8.397 |
| 0.172 | 0.138 | 8.397 |
| 0.158 | 0.126 | 8.397 |
| 0.143 | 0.115 | 8.397 |
| 0.128 | 0.104 | 8.397 |
| 0.112 | 0.093 | 8.397 |
| 0.096 | 0.083 | 8.397 |
| 0.080 | 0.073 | 8.397 |
| 0.064 | 0.064 | 8.397 |
| 0.048 | 0.055 | 8.397 |
| 0.031 | 0.046 | 8.397 |
| 0.014 | 0.038 | 8.397 |
| −0.003 | 0.030 | 8.397 |
| −0.020 | 0.023 | 8.397 |
| −0.037 | 0.016 | 8.397 |
| −0.055 | 0.010 | 8.397 |
| −0.073 | 0.004 | 8.397 |
| −0.091 | −0.001 | 8.397 |
| −0.109 | −0.006 | 8.397 |
| −0.127 | −0.011 | 8.397 |
| −0.145 | −0.015 | 8.397 |
| −0.163 | −0.019 | 8.397 |
| −0.182 | −0.023 | 8.397 |
| −0.200 | −0.026 | 8.397 |

TABLE 2-continued

| X | Y | Z |
|---|---|---|
| −0.219 | −0.029 | 8.397 |
| −0.237 | −0.033 | 8.397 |
| −0.255 | −0.036 | 8.397 |
| −0.274 | −0.040 | 8.397 |
| −0.292 | −0.045 | 8.397 |
| −0.309 | −0.052 | 8.397 |
| −0.326 | −0.059 | 8.397 |
| −0.330 | −0.061 | 8.397 |
| −0.333 | −0.063 | 8.397 |
| −0.336 | −0.065 | 8.397 |
| −0.340 | −0.067 | 8.397 |
| −0.343 | −0.069 | 8.397 |
| −0.346 | −0.071 | 8.397 |
| −0.349 | −0.073 | 8.397 |
| −0.352 | −0.075 | 8.397 |
| −0.355 | −0.077 | 8.397 |
| −0.358 | −0.080 | 8.397 |
| −0.371 | −0.091 | 8.397 |
| −0.385 | −0.102 | 8.397 |
| −0.398 | −0.114 | 8.397 |
| −0.409 | −0.128 | 8.397 |
| −0.420 | −0.142 | 8.397 |
| −0.429 | −0.157 | 8.397 |
| −0.437 | −0.173 | 8.397 |
| −0.442 | −0.190 | 8.397 |
| −0.445 | −0.207 | 8.397 |
| −0.445 | −0.225 | 8.397 |
| −0.441 | −0.242 | 8.397 |
| −0.433 | −0.258 | 8.397 |
| −0.422 | −0.272 | 8.397 |
| −0.409 | −0.284 | 8.397 |
| −0.395 | −0.294 | 8.397 |
| −0.380 | −0.303 | 8.397 |
| −0.364 | −0.311 | 8.397 |
| −0.347 | −0.317 | 8.397 |

It should be understood that the finished second stage HPT vane 40b does not necessarily include all the sections defined in Table 2. The portion of the airfoil 54 proximal to the platforms 60 and 62 may not be defined by a profile section 66. It should be considered that the vane 40b airfoil profile proximal to the platforms 60 and 62 may vary due to several imposed constraints. However, the HPT vane 40b has an intermediate airfoil portion 54 defined between the inner and outer vane platforms 60 and 62 thereof and which has a profile defined on the basis of at least the intermediate Sections of the various vane profile sections 66 defined in Table 2.

It should be appreciated that the intermediate airfoil portion 54 of the HPT stage vane 40b is defined between the inner and outer gaspath walls 28 and 30 which are partially defined by the inner and outer vane platforms 60 and 62. More specifically, the Z values defining the gaspath 27 in the region of the stacking line 48 fall within the range of about 6.31 to about 8.07 which generally correspond to the z values around the stacking line 48 (x=2.728). The airfoil profile physically appearing on HPT vane 40b and fully contained in the gaspath includes Sections 4 to 10 of Table 2. The remaining sections are either only partially located in the gaspath 27 or fully outside the gaspath and are provided, in part, to fully define the airfoil surface and, in part, to improve curve-fitting of the airfoil at its radially distal portions. The skilled reader will appreciate that a suitable fillet radius is to be applied between the platforms 60 and 62 and the airfoil portion of the vane. The vane inner diameter and outside diameter endwall fillets are in the range of about 0.070" to about 0.090".

Figure 4A:
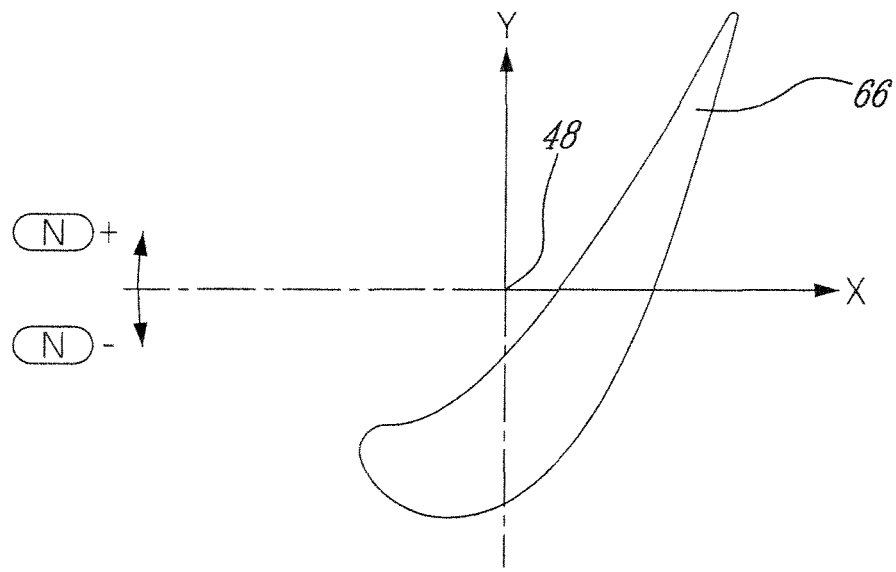
FIGS. 4a and 4b are simplified 2D HP turbine vane airfoil cross-sections illustrating the angular twist and restagger tolerances.
Figure 4B:
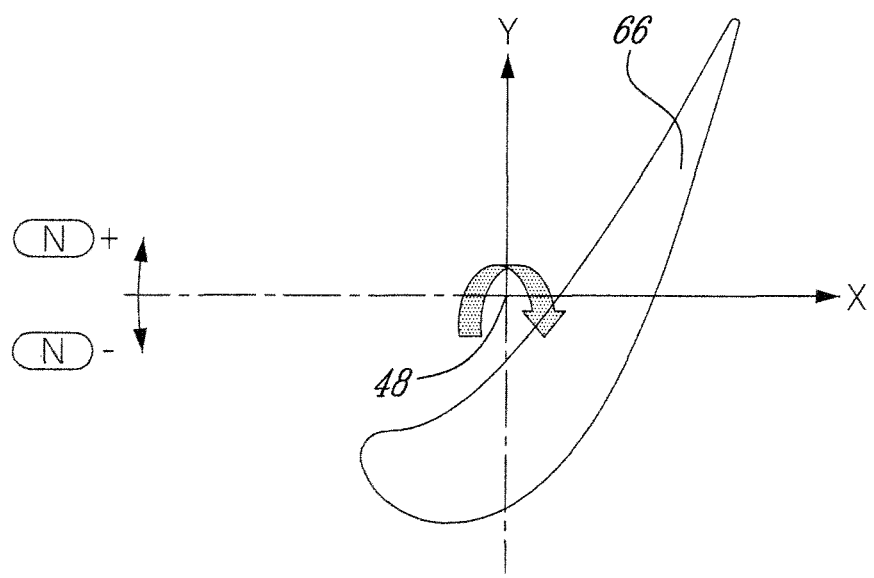

FIGS. 4a and 4b illustrate the tolerances on twist and restagger angles. The twist "N" is an angular variation at each vane section, whereas restagger is the angular reposition of the entire airfoil. Both the twist and the restagger angles are about the stacking line 48. The section twist "N" (section restagger) tolerance with respect to the stacking line is +/−0.75 degrees. The global restagger capability for the airfoil with respect to the stacking line or Z axis is +/−1.0 degrees.

Figure 5:
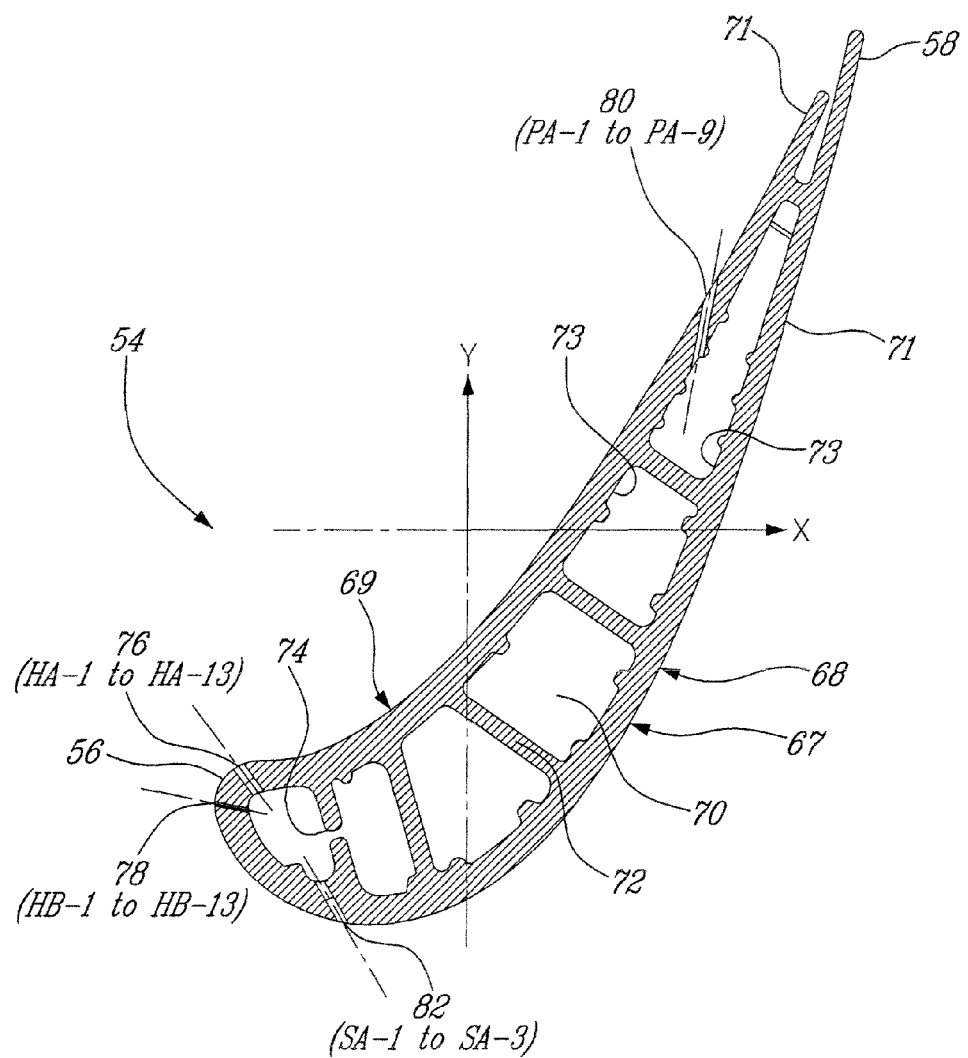
FIG. 5 is a schematic cross-sectional view of a HPT stage vane such as shown in FIG. 3 having cooling holes defined in accordance with an embodiment of the present invention.

Referring to FIG. 5, the airfoil portion 54 of the HPT stage vane 40b is hollow, and as such its profile is defined by a perimeter wall 68 surrounding a central enclosure or cooling cavity 70. In the illustrated embodiment, a plurality of ribs 72 are shown extending across the enclosure 70 to interconnect opposed sides of the wall 68, the ribs 72 including apertures 74 defined therethrough (only one of which is shown) to allow fluid circulation within the enclosure 70. However, it is understood that the configuration of the vane 40b within the enclosure 70 may vary. The perimeter wall 68 includes a plurality of cooling holes defined therethrough which provide fluid communication between the central enclosure 70 and the gaspath 27, such that a cooling fluid circulated through the hollow airfoil 54 can exit into the gaspath 27 through the cooling holes.

Figure 6:
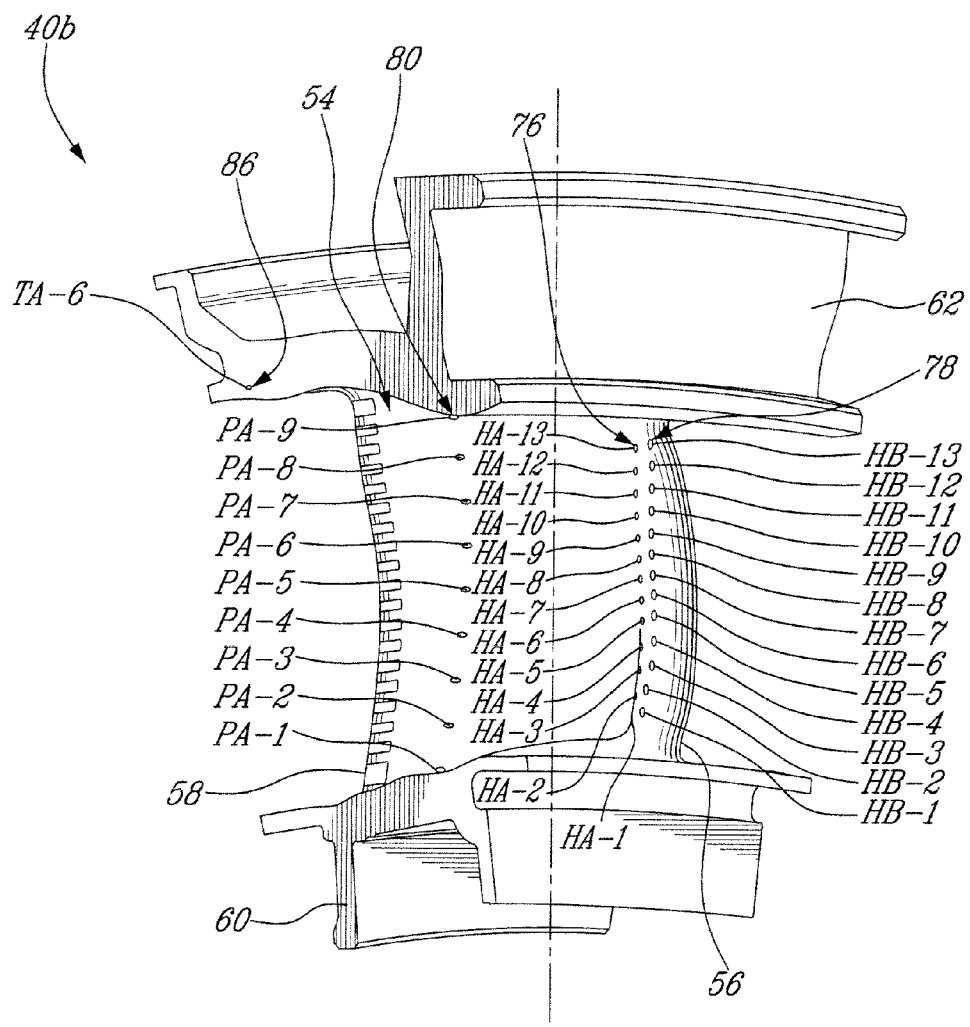
FIG. 6 is a schematic front perspective view of the vane of FIG. 5.

Referring to FIGS. 5-6, the cooling holes include first and second spaced apart sets 76, 78 of cooling holes HA-1 to HA-13 and HB-1 to HB-13, in the form of at least substantially radially extending rows and defined through the perimeter wall 68 at or near the leading edge 56 of the airfoil 54. The two leading edge sets 76, 78 generally extend along the height of the airfoil 54, with the radially outermost holes HA-13, HB-13 being defined in proximity of the outer platform 62, and the radially innermost holes HA-1, HB-1 being defined in proximity of the inner platform 60. The cooling holes also include a third set 80 of cooling holes PA-1 to PA-9 in the form of an at least substantially radially extending row and defined through the perimeter wall 68 in the lower surface 69 of the airfoil 54, near the trailing edge 58 but spaced apart therefrom. This third set 80 generally extends along the height of the airfoil portion, with the radially outermost hole PA-9 being defined in proximity of the outer platform 62, and the radially innermost hole PA-1 being defined in proximity of the inner platform 60.

Figure 8:
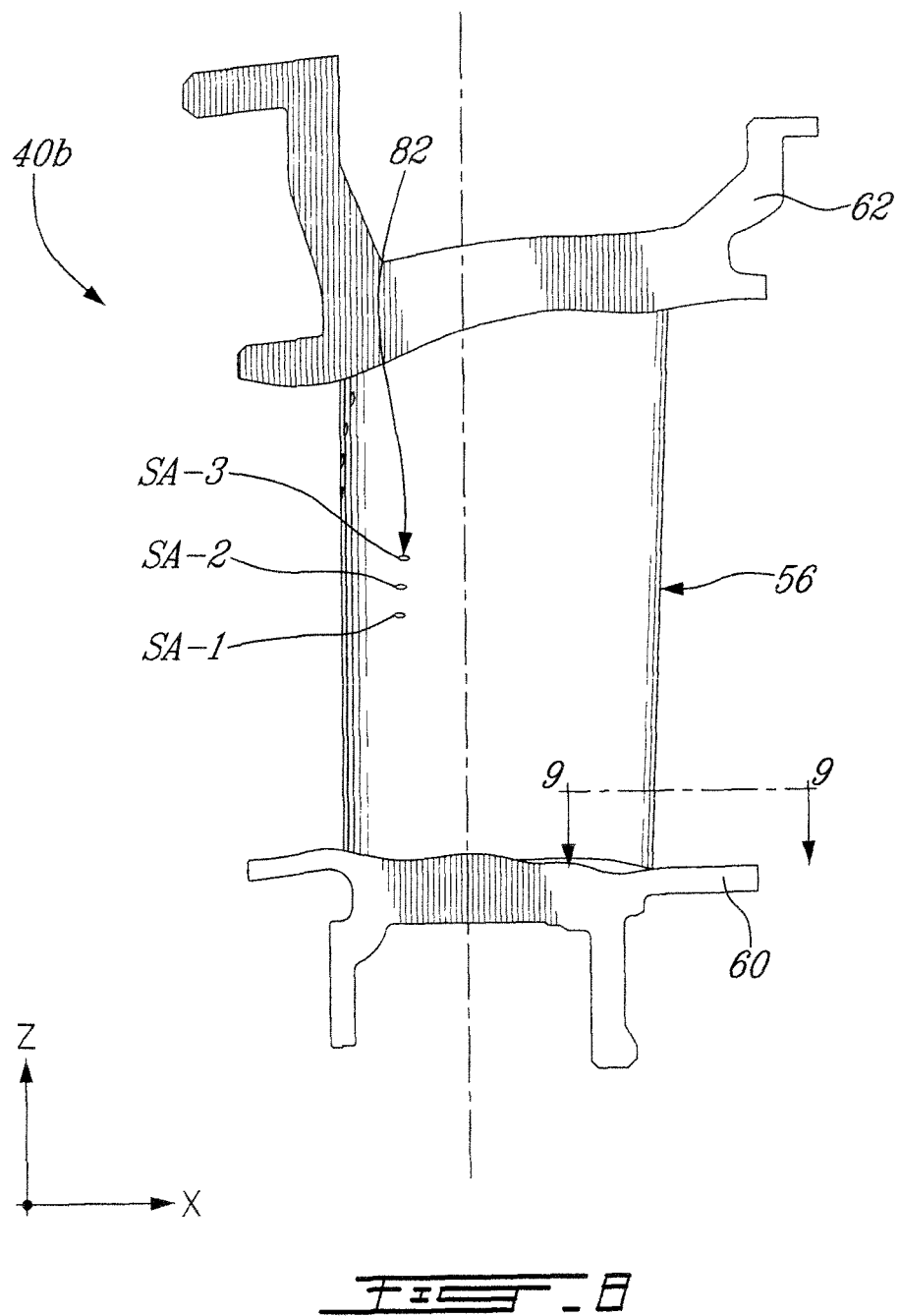
FIG. 8 is a schematic side view of the vane of FIG. 5.

Referring to FIGS. 5 and 8, the cooling holes further include a fourth set 82 of three holes SA-1, SA-2, SA-3 in the form of an at least substantially radially extending row and defined through the perimeter wall 68 in the upper surface 67 of the airfoil 54, i.e. on the side of the airfoil 54 opposite that of the third set 80 of holes PA-1 to PA-9. The holes SA-1, SA-2 and SA-3 are located near the leading edge 56 but spaced apart therefrom, at an intermediate height between the inner and outer platforms 60, 62 and spaced apart therefrom.

The central axis of each airfoil cooling hole extends through respective points 1 and 2, with the nominal coordinates of point 1 and point 2 for each hole being set out in Table 3, in units of inches, in the vane coordinate system X, Y, Z described above. Table 3 also lists the nominal diameter of each of the cooling holes, also in unit of inches.

The Table 3 values are generated and shown to three decimal places for determining the location of the central axis of the airfoil cooling holes. However, as mentioned above, there are manufacturing tolerance issues to be addressed and, accordingly, the values for the points defining the central axis of each hole given in Table 3 are for a theoretical airfoil. The tolerance envelope of point 1 and point 2 for the airfoil holes is ±0.030 in. of the nominal position with respect to the X, Y, and Z axes, and the tolerance on the hole diameters is ±0.004 in. As the coordinates are set out in the vane coordinate system, their value applies regardless of the restagger of the vane.

In a particular embodiment, point 1 corresponds to the intersection of the cooling hole's central axis with the outer surface 71 (see FIG. 5) of the airfoil perimeter wall 68, the outer surface 71 being in a "cold" non-operating coated condition. In another particular embodiment, point 1 and point 2 correspond to the intersection of the cooling hole's central axis with the outer and inner surfaces 71, 73, respectively, of the airfoil perimeter wall 68. The tolerance on the position of the central axis of the cooling holes on the outer surface accounts for airfoil profile casting, coating and ceramic coating tolerances, as well as machining tolerances, and is given with respect to the cold or room temperature profile (including coating) for manufacturing purposes. As mentioned above, it is understood that the airfoil may deform, within acceptable limits, once entering service.

The coordinate values given in Table 3 below thus provide two nominal points defined along the preferred central axis of cooling holes formed in the airfoil portion of the second stage HPT vane.

TABLE 3

| | POINT 1 | | | POINT 2 | | | |
|---|---|---|---|---|---|---|---|
| HOLE | X | Y | Z | X | Y | Z | DIA |
| HA-1 | −0.337 | −0.344 | 6.564 | −0.314 | −0.391 | 6.479 | 0.021 |
| HA-2 | −0.360 | −0.366 | 6.675 | −0.327 | −0.414 | 6.585 | 0.021 |
| HA-3 | −0.376 | −0.385 | 6.791 | −0.334 | −0.433 | 6.684 | 0.021 |
| HA-4 | −0.383 | −0.393 | 6.905 | −0.337 | −0.447 | 6.795 | 0.021 |
| HA-5 | −0.384 | −0.393 | 7.017 | −0.337 | −0.454 | 6.917 | 0.021 |
| HA-6 | −0.385 | −0.389 | 7.109 | −0.333 | −0.448 | 7.030 | 0.021 |
| HA-7 | −0.386 | −0.383 | 7.208 | −0.333 | −0.442 | 7.115 | 0.021 |
| HA-8 | −0.388 | −0.379 | 7.267 | −0.339 | −0.428 | 7.350 | 0.021 |
| HA-9 | −0.393 | −0.374 | 7.359 | −0.342 | −0.419 | 7.459 | 0.021 |
| HA-10 | −0.403 | −0.369 | 7.458 | −0.349 | −0.403 | 7.592 | 0.021 |
| HA-11 | −0.415 | −0.366 | 7.562 | −0.353 | −0.387 | 7.705 | 0.021 |
| HA-12 | −0.426 | −0.369 | 7.668 | −0.353 | −0.370 | 7.815 | 0.021 |
| HA-13 | −0.429 | −0.374 | 7.776 | −0.351 | −0.353 | 7.906 | 0.021 |
| HB-1 | −0.415 | −0.386 | 6.603 | −0.344 | −0.392 | 6.428 | 0.019 |
| HB-2 | −0.425 | −0.426 | 6.714 | −0.348 | −0.417 | 6.529 | 0.019 |
| HB-3 | −0.428 | −0.452 | 6.828 | −0.352 | −0.443 | 6.639 | 0.019 |
| HB-4 | −0.429 | −0.460 | 6.942 | −0.354 | −0.464 | 6.757 | 0.019 |
| HB-5 | −0.429 | −0.458 | 7.044 | −0.349 | −0.469 | 6.921 | 0.019 |
| HB-6 | −0.429 | −0.454 | 7.143 | −0.345 | −0.462 | 6.993 | 0.019 |
| HB-7 | −0.429 | −0.449 | 7.186 | −0.352 | −0.455 | 7.320 | 0.019 |
| HB-8 | −0.429 | −0.446 | 7.279 | −0.353 | −0.448 | 7.427 | 0.019 |
| HB-9 | −0.429 | −0.447 | 7.367 | −0.354 | −0.439 | 7.547 | 0.019 |
| HB-10 | −0.427 | −0.450 | 7.474 | −0.352 | −0.428 | 7.645 | 0.019 |
| HB-11 | −0.420 | −0.453 | 7.581 | −0.346 | −0.416 | 7.739 | 0.019 |
| HB-12 | −0.405 | −0.455 | 7.689 | −0.336 | −0.403 | 7.826 | 0.019 |
| HB-13 | −0.383 | −0.452 | 7.796 | −0.318 | −0.391 | 7.915 | 0.019 |
| SA-1 | −0.215 | −0.664 | 7.094 | −0.263 | −0.585 | 7.094 | 0.015 |
| SA-2 | −0.209 | −0.660 | 7.190 | −0.257 | −0.581 | 7.190 | 0.015 |
| SA-3 | −0.196 | −0.654 | 7.285 | −0.242 | −0.579 | 7.285 | 0.015 |
| PA-1 | 0.394 | 0.539 | 6.308 | 0.361 | 0.397 | 6.308 | 0.016 |
| PA-2 | 0.394 | 0.504 | 6.514 | 0.361 | 0.358 | 6.514 | 0.016 |
| PA-3 | 0.397 | 0.473 | 6.721 | 0.363 | 0.320 | 6.721 | 0.016 |
| PA-4 | 0.408 | 0.451 | 6.927 | 0.377 | 0.303 | 6.927 | 0.016 |
| PA-5 | 0.417 | 0.436 | 7.134 | 0.387 | 0.287 | 7.134 | 0.016 |
| PA-6 | 0.415 | 0.431 | 7.340 | 0.384 | 0.277 | 7.340 | 0.016 |
| PA-7 | 0.411 | 0.440 | 7.546 | 0.379 | 0.284 | 7.546 | 0.016 |
| PA-8 | 0.421 | 0.463 | 7.753 | 0.391 | 0.305 | 7.753 | 0.016 |
| PA-9 | 0.443 | 0.496 | 7.940 | 0.417 | 0.339 | 7.940 | 0.016 |

Figure 7:
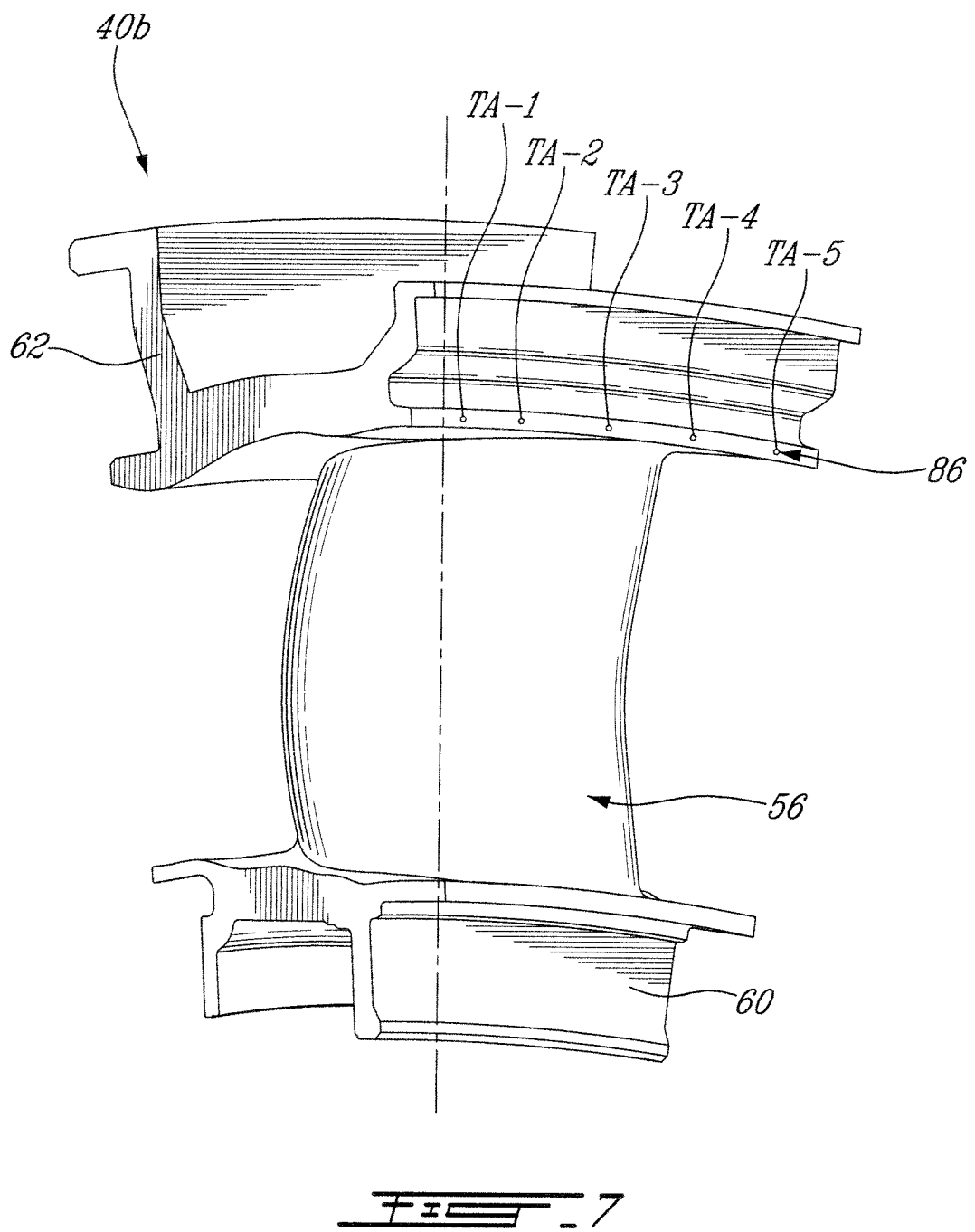
FIG. 7 is a schematic rear perspective view of the vane of FIG. 5.

Referring to FIG. 7, the outer platform 62 includes a fifth set 86 of cooling holes including a row of cooling holes TA-1 to TA-5 defined through the rear end thereof, and another cooling hole TA-6 (see FIG. 6) defined through one side thereof.

Figure 9:
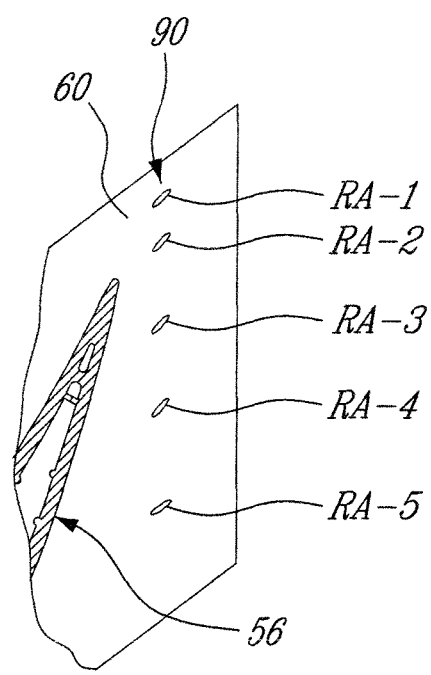
FIG. 9 is a schematic view of the vane of FIG. 8 taken along lines 9-9 thereof.

Referring to FIG. 9, the inner platform 60 includes a sixth set 90 of cooling holes including a row of cooling holes RA-1 to RA-5 defined through the gaspath surface of the platform.

It should be understood that the platforms 60, 62 illustrated in the Figures are only schematic representations and that the actual shape of the platforms 60, 62 may vary depending on the configuration of the stator assembly 34.

Each platform cooling hole TA-1 to TA-6, RA-1 to RA-5 is in fluid communication with the hollow interior of the vane 40b either directly or indirectly, such that a cooling fluid circulated through the hollow vane 40b can also flow through the platform cooling holes.

The central axis of each platform cooling hole extends through respective points 1 and 2, with the nominal coordinates of point 1 and point 2 for each hole being set out in Table 4, in units of inches, in the vane coordinate system X, Y, Z described above. Point 1 and point 2 are located along the central axis and as such define its position, but are not necessarily defined on a surface of the platforms. Table 4 also lists the nominal diameter of each of the platform cooling holes, also in unit of inches.

The Table 4 values are generated and shown to three decimal places for determining the location of the central axis of the platform cooling holes. However, as mentioned above, there are manufacturing tolerance issues to be addressed and, accordingly, the values for the points defining the central axis of each hole given in Table 4 are for a theoretical vane. The tolerance envelope of point 1 and point 2 for the airfoil holes is ±0.030 in. of the nominal position with respect to the X, Y, and Z axes, and the tolerance on the hole diameters is ±0.004 in.

As the coordinates of the platform holes are net out in the vane coordinate system, their value applies to a vane with a nominal restagger. The coordinate values for the platform cooling holes TA-1 to TA-6 in the vane coordinate system for a restaggered vane can be calculated by applying the rotation corresponding to the restagger to the coordinates in Table 4.

The coordinate values given in Table 4 below thus provide two nominal points defined along the preferred central axis of cooling holes formed in the platforms of the second stage HPT vane.

TABLE 4

| | POINT 1 | | | POINT 2 | | | |
|---|---|---|---|---|---|---|---|
| HOLE | X | Y | Z | X | Y | Z | DIA |
| RA-1 | 0.910 | 1.105 | 6.207 | 0.304 | 0.373 | 6.070 | 0.016 |
| RA-2 | 0.974 | 0.956 | 6.259 | 0.377 | 0.235 | 6.100 | 0.016 |
| RA-3 | 0.988 | 0.746 | 6.294 | 0.393 | 0.028 | 6.111 | 0.016 |
| RA-4 | 0.977 | 0.507 | 6.321 | 0.203 | −0.428 | 6.023 | 0.016 |
| RA-5 | 0.892 | 0.085 | 6.279 | 0.107 | −0.394 | 6.041 | 0.016 |
| TA-1 | 1.130 | −0.348 | 8.149 | 0.435 | −0.377 | 8.229 | 0.016 |
| TA-2 | 1.221 | −0.038 | 8.146 | 0.556 | −0.246 | 8.221 | 0.016 |
| TA-3 | 1.241 | 0.380 | 8.135 | 0.624 | 0.060 | 8.217 | 0.016 |
| TA-4 | 1.177 | 0.695 | 8.122 | 0.561 | 0.376 | 8.217 | 0.016 |
| TA-5 | 1.396 | 1.157 | 8.067 | 0.338 | 0.609 | 8.209 | 0.016 |
| TA-6 | 0.719 | 1.274 | 8.050 | 0.416 | 0.440 | 8.201 | 0.016 |

The above description is meant to be exemplary only, and one skilled in the art will recognize that changes may be made to the embodiments described without department from the scope of the invention disclosed. Modifications which fall within the scope of the present invention will be apparent to those skilled in the art, in light of a review of this disclosure, and such modifications are intended to fall within the appended claims.

The invention claimed is:

1. A turbine vane for a gas turbine engine comprising an airfoil portion defined by a perimeter wall surrounding an enclosure, the perimeter wall having a plurality of cooling holes defined therethrough and providing fluid communication between the enclosure and a gaspath of the gas turbine engine, the plurality of cooling holes including first, second, third and fourth rows of holes, the first and second rows of holes extending at least substantially radially adjacent a leading edge of the airfoil portion, the third row of holes extending at least substantially radially on one side of the airfoil in proximity of a trailing edge thereof, and the fourth row of holes extending at least substantially radially on the opposed side of the airfoil in proximity of the leading edge, the first, second, third and fourth rows of holes including the holes numbered HA-1 to HA-13, HB-1 to HB-13, PA-1 to PA-9, and SA-1 to SA-3, respectively, and located such that a central axis thereof extends through the respective point 1 and point 2 having a nominal location in accordance with the X, Y, Z Cartesian coordinate values set forth in Table 3.

2. The turbine vane as defined in claim 1, wherein for each hole, point 1 corresponds to an intersection of the central axis of the hole with an outer surface of the perimeter wall.

3. The turbine vane as defined in claim 2, wherein for each hole, point 2 corresponds to an intersection of the central axis of the hole with an inner surface of the perimeter wall.

4. The turbine vane as defined in claim 1, wherein each hole has a nominal diameter corresponding to the respective diameter value set forth in Table 3 with a tolerance of ±0.004 inches.

5. The turbine vane as defined in claim 1, wherein the X, Y, Z Cartesian coordinate values have a tolerance of ±0.030 inches of the nominal location with respect to the X, Y and Z axes.

6. The turbine vane as defined in claim 1, wherein an outer surface of the perimeter wall is defined by a nominal profile substantially in accordance with Cartesian coordinate values of X, Y, and Z of Sections 4 to 10 set forth in Table 2.

7. The turbine vane as defined in claim 1, wherein the airfoil portion has a nominal restagger and extends between inner and outer platforms having a plurality of platform cooling holes defined therethrough in fluid communication with the enclosure, the plurality of platform cooling holes including a first set of holes defined through a rear end and side of the outer platform, and a second set of holes defined through a gaspath surface of the inner platform, the first and second sets of holes including the holes numbered TA-1 to TA-TA-6 and RA-1 to RA-5, respectively, and located such that a central axis thereof extends through the respective point 1 and point 2 having a nominal location in accordance with the X, Y, Z Cartesian coordinate values set forth in Table 4.

8. The turbine vane as defined in claim 7, wherein the X, Y, Z Cartesian coordinate values have a tolerance of ±0.030 inches of the nominal location with respect to the X, Y and Z axes.

9. The turbine vane as defined in claim 1, wherein each hole of the first and second sets has a nominal diameter corresponding to the respective diameter value set forth in Table 4 with a tolerance of ±0.004 inches.

10. A turbine stator assembly for a gas turbine engine comprising a plurality of vanes, each vane having an airfoil portion defined by a perimeter wall enclosing a cooling cavity, the perimeter wall having a plurality of cooling holes defined therethrough and providing fluid communication between the cooling cavity and a gaspath of the gas turbine engine, the plurality of cooling holes including first, second, third and fourth sets of holes, the first and second sets of holes extending adjacent a leading edge of the airfoil portion, the third set of holes extending on one side of the airfoil in proximity of a trailing edge thereof, and the fourth set of holes extending on the opposed side of the airfoil in proximity of the leading edge, the first, second, third and fourth sets of holes including the holes numbered HA-1 to HA-13, HB-1 to HB-13, PA-1 to PA-9, and SA-1 to SA-3, respectively, each hole having a central axis extending through point 1 and point 2 located at least substantially in accordance with X, Y, Z Cartesian coordinate values set forth in Table 3.

11. The turbine vane as defined in claim 10, wherein for each hole, point 1 corresponds to an intersection of the central axis of the hole with an outer surface of the perimeter wall.

12. The turbine vane as defined in claim 10, wherein each hole has a nominal diameter corresponding to the respective diameter value set forth in Table 3, with a tolerance of ±0.004 inches.

13. The turbine vane as defined in claim 10, wherein the X, Y, Z Cartesian coordinate values have a tolerance of ±0.030 inches.

14. The turbine vane as defined in claim 10, wherein an outer surface of the perimeter wall is defined by a nominal profile substantially in accordance with Cartesian coordinate values of X, Y, and Z of Sections 4 to 10 set forth in Table 2.

15. The turbine vane as defined in claim 10, wherein the airfoil portion has a nominal restagger and extends between platforms defined generally by at least some of the coordinate values given in Table 1, the platforms having a plurality of platform cooling holes defined therethrough in fluid communication with the cooling cavity, the plurality of platform cooling holes including fifth and sixth sets of holes including the holes numbered TA-1 to TA-6 and RA-1 to RA-5, respectively, each having a central axis extending through point 1 and point 2 located at least substantially in accordance with X, Y, Z Cartesian coordinate values set forth in Table 4.

16. The turbine vane as defined in claim 10, wherein each hole of the fifth and sixth sets has a nominal diameter corresponding to the respective diameter value set forth in Table 4 with a tolerance of ±0.004 inches.

17. A high pressure turbine vane comprising an airfoil having a perimeter wall surrounding a cooling cavity, the perimeter wall having an outer surface lying substantially on the points of Table 2, the airfoil extending between platforms defined generally by at least some of the coordinate values given in Table 1, wherein a fillet radius is applied around the airfoil between the airfoil and platforms, the perimeter wall having a plurality of cooling holes defined therethrough in fluid communication with the cooling cavity, the plurality of cooling holes including first, second, third and fourth sets of holes including the holes numbered HA-1 to HA-13, HB-1 to HB-13, PA-1 to PA-9, and SA-1 to SA-3, respectively, and located such that a central axis thereof extends through the respective point 1 and point 2 having a nominal location in accordance with the X, Y, Z Cartesian coordinate values set forth in Table 3.

18. The turbine vane as defined in claim 17, wherein the airfoil portion has a nominal restagger, the platforms including a plurality of platform cooling holes defined therethrough in fluid communication with the cooling cavity, the plurality of platform cooling holes including fifth and sixth sets of holes including the holes numbered TA-1 to TA-6 and RA-1 to RA-5, respectively, and located such that a central axis thereof extends through the respective point 1 and point 2 having a nominal location in accordance with the X, Y, Z Cartesian coordinate values set forth in Table 4.

19. The turbine vane as defined in claim 18, wherein each hole of the first, second, third and fourth sets has a nominal diameter corresponding to the respective diameter value net forth in Table 3, and each hole of the fifth and sixth sets has a nominal diameter corresponding to the respective diameter value set forth in Table 4.

20. The turbine vane as defined in claim 18, wherein the X, Y, Z Cartesian coordinate values have a tolerance of ±0.030 inches of the nominal location with respect to the X, Y and Z axes.

* * * * *

UNITED STATES PATENT AND TRADEMARK OFFICE
CERTIFICATE OF CORRECTION

PATENT NO. : 8,568,085 B2
APPLICATION NO. : 12/838720
DATED : October 29, 2013
INVENTOR(S) : Franco Di Paola, Larry Lebel and François Doyon Page 1 of 1

It is certified that error appears in the above-identified patent and that said Letters Patent is hereby corrected as shown below:

Title Page, Item (54) and in the Specification, at Column 1, lines 1-2, Title should read:

-- HIGH PRESSURE TURBINE VANE COOLING HOLE DISTRIBUTION --

Signed and Sealed this
Twenty-second Day of April, 2014

Michelle K. Lee
*Deputy Director of the United States Patent and Trademark Office*